(12) United States Patent
Ransenberg et al.

(10) Patent No.: US 9,265,675 B2
(45) Date of Patent: Feb. 23, 2016

(54) MOTORIZED VEHICLE

(71) Applicant: Moving Life Ltd., RaAnana (IL)

(72) Inventors: Abraham-Nino Ransenberg, RaAnana (IL); Eyal Artsiely, Moshav Yafit (IL); Arik Bar Erez, Kfar-Sirkin (IL); Mor Michael Brot, Kfar-Saba (IL); Yuval Chomski, Ramat-Gan (IL); Yizhaq Goldman, Holon (IL); Yarom Goren, Savyon (IL)

(73) Assignee: Moving Life Ltd., RaAnana (IL)

( * ) Notice: Subject to any disclaimer, the term of this patent is extended or adjusted under 35 U.S.C. 154(b) by 0 days.

(21) Appl. No.: 14/415,741

(22) PCT Filed: Jul. 16, 2013

(86) PCT No.: PCT/IL2013/050603
§ 371 (c)(1),
(2) Date: Jan. 20, 2015

(87) PCT Pub. No.: WO2014/013486
PCT Pub. Date: Jan. 23, 2014

(65) Prior Publication Data
US 2015/0209205 A1    Jul. 30, 2015

Related U.S. Application Data

(60) Provisional application No. 61/673,300, filed on Jul. 19, 2012.

(51) Int. Cl.
*A61G 5/08* (2006.01)
*B62K 15/00* (2006.01)
*B62K 5/025* (2013.01)

(52) U.S. Cl.
CPC . *A61G 5/08* (2013.01); *B62K 5/025* (2013.01); *B62K 15/008* (2013.01); *A61G 2005/0825* (2013.01); *A61G 2005/0866* (2013.01); *A61G 2005/0883* (2013.01)

(58) Field of Classification Search
CPC . B62K 5/025; A61G 5/08; A61G 2005/0825; A61G 2005/0866; A61G 2005/0883; B62D 21/14; Y10S 180/906; Y10S 180/907; B60G 2300/40
USPC ......................................... 180/208, 209, 907
See application file for complete search history.

(56) References Cited

U.S. PATENT DOCUMENTS 4,834,409 A * 5/1989 Kramer ..................... 180/209
6,183,002 B1   2/2001 Choi et al.
(Continued)

FOREIGN PATENT DOCUMENTS

CN   201756156    3/2011
CN   201907613    7/2011
(Continued)

OTHER PUBLICATIONS

Communication Relating to the Results of the Partial International Search Dated Dec. 3, 2013 from the International Searching Authority Re. Application No. PCT/IL2013/050603.
(Continued)

*Primary Examiner* — John Walters
*Assistant Examiner* — Brian Swenson

(57) ABSTRACT

A motorized vehicle having a wheel retraction apparatus, comprising: a plurality of rear wheels and at least one front wheel; a lower chassis having a foot surface mounted thereon; and a wheel retraction apparatus mechanically connected to said lower chassis and set to extract and retract said plurality of rear wheels from and towards said lower chassis and to fixate said plurality of rear wheels in a plurality of different widths from one another; wherein a distance between an axis passing through the centers of said plurality of rear wheels and said at least one front wheel is reduced when said plurality of rear wheels are retracted towards said lower chassis.

20 Claims, 65 Drawing Sheets

(56) References Cited

U.S. PATENT DOCUMENTS

| | | | |
|---|---|---|---|
| 6,186,252 B1 | 2/2001 | Schaffner et al. | |
| 6,530,445 B1 * | 3/2003 | Flowers et al. | 180/208 |
| 6,854,551 B2 * | 2/2005 | Wisecarver | 180/208 |
| 7,451,848 B2 | 11/2008 | Flowers et al. | |
| 7,717,210 B2 * | 5/2010 | Mahy et al. | 180/209 |
| 7,950,686 B2 * | 5/2011 | Wang | 280/643 |
| 7,967,095 B2 | 6/2011 | Kosco et al. | |
| 8,123,245 B2 * | 2/2012 | Johnson et al. | 280/647 |
| 8,388,014 B2 * | 3/2013 | Wu et al. | 280/638 |
| 2004/0256164 A1 | 12/2004 | Huang | |
| 2006/0243507 A1 | 11/2006 | Huber | |
| 2009/0020350 A1 | 1/2009 | Wu | |
| 2010/0126789 A1 | 5/2010 | Scragg | |

FOREIGN PATENT DOCUMENTS

| | | |
|---|---|---|
| CN | 202243866 | 5/2012 |
| EP | 1522489 | 4/2005 |
| JP | 2007-209731 | 8/2007 |
| TW | 200842055 | 11/2008 |
| WO | WO 2014/013486 | 1/2014 |

OTHER PUBLICATIONS

International Preliminary Report on Patentability Dated Nov. 7, 2014 from the International Preliminary Examining Authority Re. Application No. PCT/IL2013/050603.

International Search Report and the Written Opinion Dated Apr. 3, 2014 from the International Searching Authority Re. Application No. PCT/IL2013/050603.

Invitation to Pay Additional Fees Dated Aug. 18, 2014 from the International Preliminary Examining Authority Re. Application No. PCT/IL2013/050603.

* cited by examiner

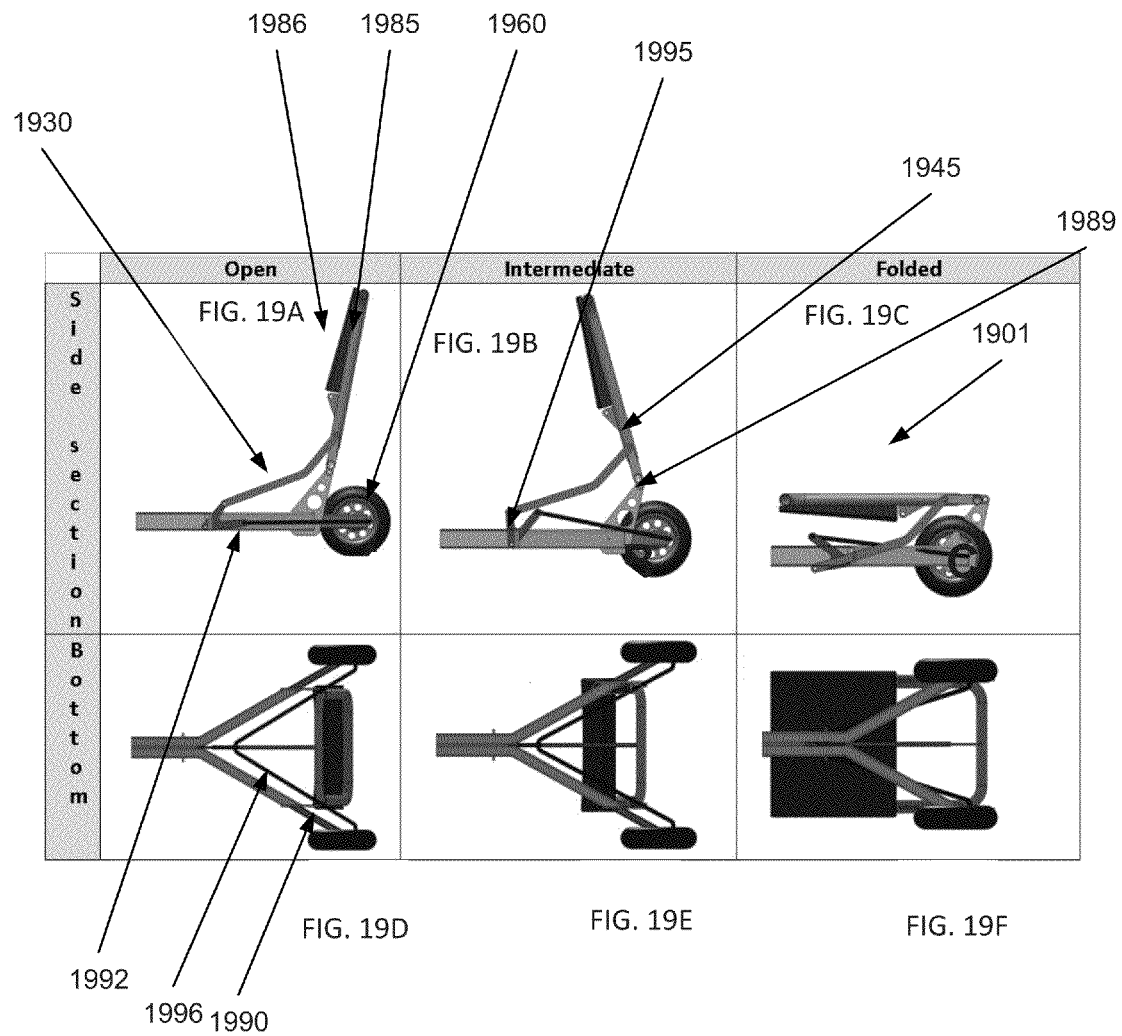

MOTORIZED VEHICLE

RELATED APPLICATIONS

This application is a National Phase of PCT Patent Application No. PCT/IL2013/050603 having International filing date of Jul. 16, 2013, which claims the benefit of priority under 35 USC §119(e) of U.S. Provisional Patent Application No. 61/673,300 filed on Jul. 19, 2012. The contents of the above applications are all incorporated by reference as if fully set forth herein in their entirety.

FIELD AND BACKGROUND OF THE INVENTION

The present invention, in some embodiments thereof, relates to motorized vehicles and, more particularly, but not exclusively, to a foldable motorized vehicle.

The popularity of personal mobility vehicles has dramatically increased over the last several decades. This increase in the popularity of personal mobility vehicles is due to many factors including the advent of new structural material as well as new manufacturing techniques.

Although known personal mobility vehicles provide the desired mobility to the user, the known personal mobility vehicles suffered from certain disadvantages. Firstly, the known personal mobility vehicles are difficult to store during nonuse of the personal mobility vehicle. In general, the size of the known personal mobility vehicles prohibited the storage of the personal mobility vehicle within a closet or a small room. Secondly, the known personal mobility vehicles are difficult to transport in a conventional automobile. In order to transport a personal mobility vehicle of the prior art in a conventional automobile, the personal mobility vehicle had to be dissembled prior to being placed into the luggage compartment of the conventional automobile. Thirdly, the known personal mobility vehicles are difficult to lift in an assembled condition. Known personal mobility vehicles art could be transported in a small truck, small van or a sports utility vehicle in an assembled form. Unfortunately, because of the overall size of the assembled known personal mobility vehicles, a lift, hoist or two individuals were required in order to lift the personal mobility vehicle from the ground to the luggage compartment of the small truck, small van or the sports utility vehicle.

Some in known personal mobility vehicles have attempted to solve the problems of the transportation and storage of a personal mobility vehicle by collapsing or folding the personal mobility vehicle. The following U.S. patents represent several attempts of the prior art to provide a collapsible or foldable personal mobility vehicle.

U.S. Pat. No. 6,183,002 B1 to Choi et al. discloses a wheelchair having a seat and a plurality of wheels for rolling the wheelchair along a ground surface. The seat includes a seat bottom and a seat back pivotally coupled to the seat bottom. The seat back is movable between a folded position and an unfolded position. The seat bottom has a back end formed from a first curved shape, and the seat back has a bottom end formed from a second curved shape. The first curved shape of the seat bottom is sized to mate with the second curved shape of the seat back when the seat back is in the unfolded position. A motor coupled to each rear wheel and a control stick is in communication with each motor for independently operating each of the motors to drive and steer the wheel chair.

U.S. Pat. No. 6,186,252 B1 to Schaffner et al. discloses a power chair comprising a frame transversely foldable between operating and transport positions. A seat is connected to the frame, with a pair of drive wheels also connected to the frame. The drive wheels are rotatable about a transverse axis below a portion of the seat supporting an occupant's thighs. The power chair further includes motors for driving respective drive wheels. Perspective motor drive wheel combinations are pivotally connected to the frame. At least one ground-engaging idler wheel is connected to the frame, located rearward of the drive wheels. At least one anti-tip wheel is positioned above ground, forward of the drive wheels, and connected to the frame for movement relative to the frame upon encountering an obstacle.

U.S. Pat. No. 7,451,848 discloses a foldable personal mobility vehicle is disclosed comprising first and second units having first and second wheels being rotatable about first and second axles. A drive unit rotates the second wheel for moving the foldable personal mobility vehicle. A pivot disposed substantially parallel to the first and second axles pivotally connects the first unit to the second unit for folding the personal mobility vehicle. The foldable personal mobility vehicle may include a folding unit for automatically folding the foldable personal mobility vehicle.

U.S. Pat. No. 7,967,095 discloses a powered vehicle has a rear frame assembly and a front frame assembly that is pivotally attached to one another, and can be pivoted from a normal fully-extended operating position to a folded position in which the frame assemblies are positioned substantially adjacent to one another, effectively reducing overall vehicle length to about half. One or more latch members lock the front and rear frame assemblies in the fully-extended, normal operating position, and they may be used to lock the frame assemblies in the folded position. The seat support structure may be integrated with the front and rear frame assemblies such that pivoting the frame assemblies toward the folded position collapses the seat support. The steering tiller may also be collapsible toward the front frame assembly. The rear wheels may be mounted on a transaxle that is pivotally mounted on the rear frame assembly. An extendable handle may be provided to assist in the folding operation and to tow the collapsed vehicle on its anti-tip rollers.

SUMMARY OF THE INVENTION

According to some embodiments of the present invention, there is provided a motorized vehicle having a wheel retraction apparatus. The motorized vehicle comprises a plurality of rear wheels and at least one front wheel, a lower chassis having a foot surface mounted thereon, and a wheel retraction apparatus mechanically connected to the lower chassis and set to extract and retract the plurality of rear wheels from and towards the lower chassis and to fixate the plurality of rear wheels in a plurality of different widths from one another. A distance between an axis passing through the centers of the plurality of rear wheels and the at least one front wheel does not increase when the plurality of rear wheels are retracted towards the lower chassis.

Optionally, the motorized vehicle further comprises an upper chassis, wherein the upper chassis is connected to the lower chassis.

Optionally, the lower chassis has a longitudinal axis and a distance between each rear wheel and the longitudinal axis is reduced by the retraction.

More optionally, the lower chassis has a latitudinal axis, a distance between each rear wheel and the latitudinal axis and between each rear wheel and the longitudinal axis is simultaneously reduced by the retraction.

More optionally, the plurality of rear wheels are retracted along a plurality of different diagonals which converge towards a point on the longitudinal axis.

Optionally, the wheel retraction apparatus comprises: a plurality of wheel arms each connected to another of the plurality of rear wheels, and at least one actuator, each having at least one retraction link which are connected to the plurality of wheel arms. The lower chassis has a longitudinal axis a linear pulling of the at least one retraction links induces a simultaneous diagonal movement of the plurality of rear wheels in relation to the longitudinal axis.

More optionally, the at least one of retraction links are spread in at least one of a V shaped arrangement and a Y shaped arrangement.

More optionally, the movement of the at least one of retraction links is limited by a Y shaped track.

More optionally, the at least one of retraction links position is at least one of exterior to the lower chassis, interior to the lower chassis and integral within the lower chassis.

Optionally, the plurality of rear wheels remain essentially parallel to one another during the retraction.

Optionally, the motorized vehicle further comprises an upper chassis for supporting a seat, at least one of lever, and a bearing which mechanically connects between the upper chassis and the lower chassis and at least one lever. Each at least one lever mechanically connect between the upper chassis and the wheel retraction apparatus and the bringing of the upper chassis towards the lower chassis pulls the lever and induces a retraction of the plurality of rear wheels by the wheel retraction apparatus.

More optionally, the seat comprises: a seat base, a backrest and a seat bearing connecting between the seat base and the backrest.

More optionally, the lever is a non linear lever having an angle between 100 degrees and 170 degrees.

More optionally, the motorized vehicle further comprises an arm which mechanically connects between the backrest and the lever.

More optionally, a mechanical connection of the arm comprises a multiplicity of arms connected by a multiplicity of hinges.

More optionally, the wheel retraction apparatus comprises an actuator having a tunnel and upon folding of the seat the lever moves along the tunnel and the actuator moves along the lower chassis thereby lowering the seat.

More optionally, the motorized vehicle further comprises a backrest, wherein the upper chassis has at least one upper chassis road and the backrest has at least one backrest channel which encircles the at least one upper chassis road and a folding action pulls the back rest to glide on the upper chassis road to essentially cover the upper chassis road.

More optionally, the motorized vehicle further comprises an upper chassis lock between the upper chassis and the lower chassis; wherein a position of the upper chassis relative to the position of the lower chassis is statically maintained when the upper chassis lock is locked.

Optionally, the lock further comprises an actuator and a thread which connects between the seat and the actuator, wherein moving the thread does at least one of locking and unlocking the upper chassis lock.

Optionally, the lock further comprises an actuator, wherein the rear lower chassis further comprises a plurality of rear lower chassis apertures and the upper chassis lock comprises a disc having at least one pin and the disc is mounted on the actuator and the at least one pin fit into the plurality of rear lower chassis apertures.

Optionally, the lock further comprises a lock between the back rest and the seat base and a release button in the back rest, wherein the release button allows the seat base and the back rest to fold toward each other and the lock is re-engaged when the back rest and the seat base are parallel in a folded position.

Optionally, the lower chassis has a front lower chassis and a rear lower chassis and a lower chassis bearing connects the front lower chassis with the rear lower chassis.

According to some embodiments of the present invention, there is provided a motorized vehicle having a sitting configuration and a standing configuration. The vehicle comprises a steering rod, a lower chassis which is connected to the steering rod and supports at least one rear wheel and at least one front wheel and having a foot surface for supporting feet of a user while the motorized vehicle is driven by the user in a sitting position, an upper chassis having a backrest connected to a seat base by a seat bearing, and at least one bearing which connects between the lower chassis and the upper chassis and allows switching between a sitting configuration and a standing configuration of the motorized vehicle by bringing the backrest from being substantially perpendicular to the foot surface to be in a proximity with and substantially in parallel to the foot surface. The steering rod is substantially perpendicular to the foot surface while the motorized vehicle is driven by the user in any of the sitting configuration and the standing configuration.

Optionally, the seat base has a seat base back side and a seat base seat support side, and the backrest has a backrest back support side and a backrest back side.

More optionally, the motorized vehicle further comprises a wheel retraction apparatus which pushes the at least one rear wheel away from the rear lower chassis when the motorized vehicle is in sitting configuration and retracts the at least one rear wheel when the motorized vehicle is in standing configuration.

More optionally, the motorized vehicle further comprises a locking mechanism wherein the locking mechanism restricts the movement of the seat base when the motorized vehicle is in at least one of the sitting configuration and standing configuration and the locking mechanism allows the movement of the seat base and the backrest when the motorized vehicle is transitioned between the sitting configuration and the standing configuration.

According to some embodiments of the present invention, there is provided a central lock and release mechanism simultaneously operating two locks when folding a motorized vehicle. The lock comprises a lower chassis having a front lower chassis and a rear lower chassis, a steering rod, a steering rod lock connecting the steering rod and the front lower chassis, a lower chassis lock connecting the front lower chassis and the rear lower chassis, a motion transferring element connecting the steering rod lock and the lower chassis lock, a handle; and a puller mounted on the handle. The motorized vehicle is folded by lifting the handle and the handle pulls the puller and the puller opens a first lock of the steering rod lock and the lower chassis lock and the first lock moves the motion transferring element and the motion transferring element opens second lock of the steering rod lock and the lower chassis lock and open the steering rod lock enable folding of the steering rod towards the lower chassis and open the lower chassis lock enables folding of the lower chassis so the front lower chassis and the rear lower chassis are in close proximity.

Optionally, the handle is operated with a single hand.

Optionally, the first lock is the steering rod lock and the second lock is the lower chassis lock.

Optionally, the first lock is the lower chassis lock and the second lock is the steering rod lock.

Optionally, the motorized vehicle is unfolded by the central lock and release mechanism.

According to some embodiments of the present invention, there is provided a central lock and release mechanism of a motorized vehicle that comprises a lower chassis having a front lower chassis and a rear lower chassis, a first rear lower chassis pin mounted on the rear lower chassis, a second rear lower chassis pin mounted on the rear lower chassis, a handle, a puller mounted on the handle, an axis mounted on the front lower chassis, a rocker pivoting around the axis, having a fork hook, a first rear lower chassis hook and a second rear lower chassis hook, a rocker spring connected to the rocker, a fork mounted on the front lower chassis, having a pin fitting the fork hook, a flange mechanically connected to the rear lower chassis, and a flange spring connected to the flange. The central lock and release mechanism is released from locking an operational configuration of a motorized vehicle by lifting the handle and pulling the puller and the puller pivots the rocker against the rocker spring thereby releases the first rear lower chassis hook and the fork hook so that the front lower chassis and the rear lower chassis are free to move from an operative configuration to a folded configuration and the central lock and release mechanism locks a folded configuration of a motorized vehicle by the second rear lower chassis hook hooking to the rear lower chassis and the rocker and the fork geometrically limit the steering rod thereby restricting the steering rod tilting.

Optionally, the central lock and release mechanism is released from locking a folded configuration of a motorized vehicle by lifting the handle and pulling the puller and the puller moves the flange against the flange spring and the flange pulls against the second rear lower chassis hook and pivots the rocker against the rocker spring and releases the first rear lower chassis hook and the geometrical limitation of the steering rod by the fork so that the front lower chassis and the rear lower chassis are free to move from a folded configuration to an operative configuration and the central lock and release mechanism locks an operative configuration of a motorized vehicle by the first rear lower chassis hook hooking to the rear lower chassis and the rocker and the fork hook hooking to the fork.

According to some embodiments of the present invention, there is provided a motorized vehicle in a folded configuration carried as a trolley. The motorized vehicle comprises an upper chassis, a lower chassis having front lower chassis and rear lower chassis connected by a bearing, a steering rod having a steering rod bottom side and a steering rod top side, a front wheel connected to the steering rod bottom side, and two rear wheels mounted on the rear lower chassis. The front wheel is in a close proximity to the two rear wheels and the trolley carried folded motorized vehicle is wheeled by at least one of the front wheel and the two rear wheels.

Optionally, at least one of the front wheel and the two rear wheels is a brushless hub motor wheel and the trolley carried folded motorized vehicle is mobilized by the brushless hub motor wheel in the folded configuration.

Optionally, the front wheel has a front wheel bottom side and a front wheel top side and the two rear wheels each have a rear wheel bottom side and a rear wheel top side and the front wheel bottom side and the rear wheel bottom side are essentially along the same plane.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 19A-19F are rear parts of motorized vehicles with a bearing and a wheel retraction apparatus, according to some embodiments of the present invention;

DESCRIPTION OF EMBODIMENTS OF THE INVENTION

Figure 1:
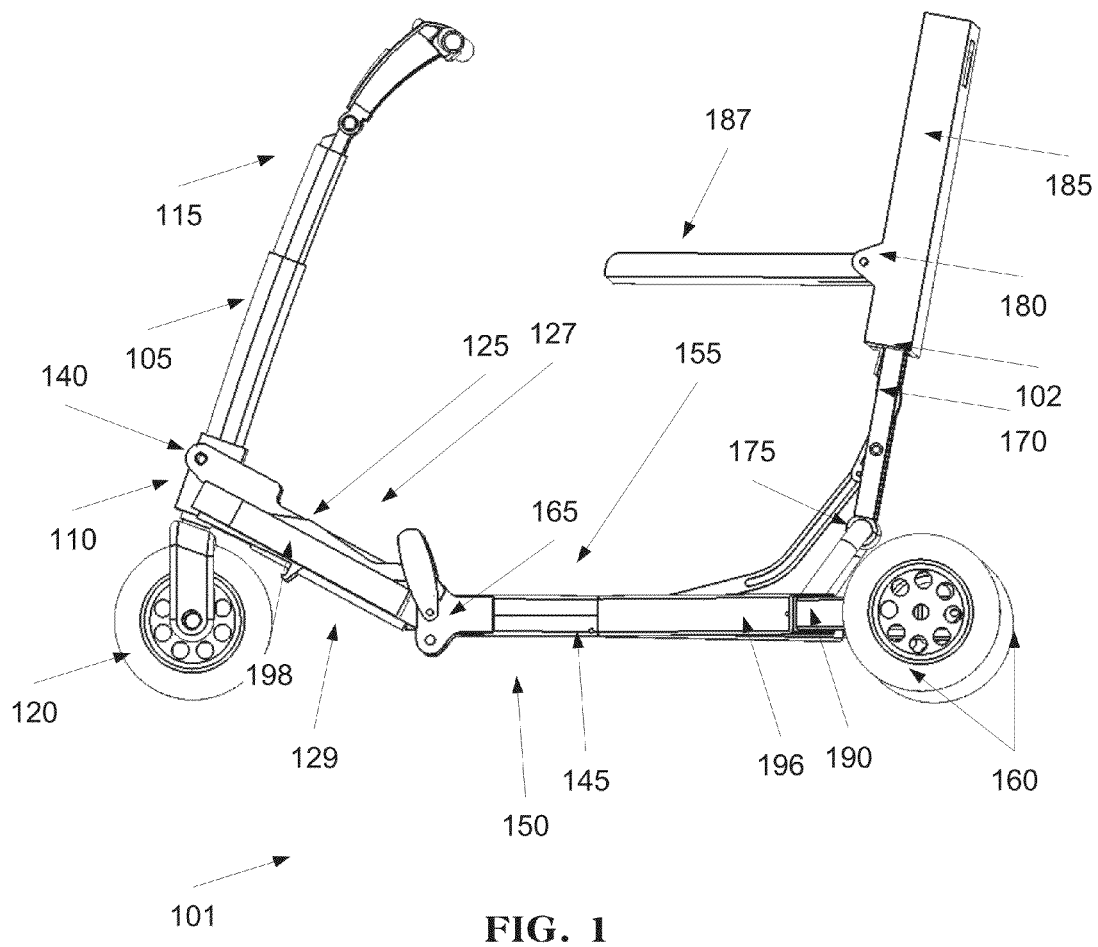
FIG. 1 is a side view of a motorized vehicle in an operational configuration, according to some embodiments of the present invention.

The present invention, in some embodiments thereof, relates to motorized vehicles and, more particularly, but not exclusively, to a foldable motorized vehicle.

The present invention, in some embodiments thereof, relates to a motorized vehicle having a folded trolley shaped configuration wherein the width of the folding mobility scooter is no more than a width of an aircraft trolley and a sitting configuration wherein the distance between the rear wheels provides stability, for example under mobility scooter regulations. Optionally, the motorized vehicle folds in a fan-fold bringing the front wheel and the rear wheels close to one another. Optionally, the motorized vehicle has a standing configuration having the same distance between its rear wheels as the folded configuration.

The present invention, in some embodiments thereof, relates to a mechanism for retracting rear wheels. The rear wheels move diagonally with respect to the chassis. The distance between the rear wheels is and optionally between the rear wheels and the front wheel(s) is maximized when in a sitting configuration, and minimized when in a standing configuration and a folded configuration. The wheel retraction and extraction mechanism allows the user to switch between sitting and standing configurations using a single hand, for example by combining the action of adapting wheel distance to mobility scooter stability requirements with folding the seat and/or the upper chassis. For example, the wheel retraction and extraction mechanism is coupled to the upper chassis folding mechanism that mechanically triggers the wheels retraction, allowing control of the mobility scooter folding from a single handle. The coupling may reduce the number and/or difficulty of human operations required to fold the mobility scooter.

The present invention, in some embodiments thereof, relates to a seat folding mechanism based on a curved lever with a curved channel which allow for the seat to change its position in accordance with the overall sitting and/or standing configuration of the mobility scooter. The curved lever connects on one end to an upper chassis through an arm and/or a set of arms and hinges, and to an actuator on the other end. The seat folding mechanism may enable changing the seat elevation. The back rest of the seat folds on top of the seat base, thereby creating a standing platform.

The present invention, in some embodiments thereof, relates to a central lock and release mechanism for simultaneous operation of two locks. A central handle is used to manually release a central lock. The lock triggers the release of a front lock and a rear lock enabling locking and releasing the front and rear parts of the lower chassis.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a side view of a motorized vehicle 101 in an operational configuration, according to some embodiments of the present invention. The term operational configuration is used herein to comprise a sitting configuration and/or a standing configuration, when the motorized vehicle is open rather folded, and can be used for transportation. The motorized vehicle 101 is composed of a steering rod 105, a front lower chassis 125, a rear lower chassis 145, and an upper chassis 170 which are connected using bearings. For example, three bearings, a front bearing 140, a middle bearing 165 and a rear bearing 175, connect these parts, allowing a compact folding configuration, for instance as described below. A foot surface 198 may be mounted on the lower chassis 125, 145. The motorized vehicle 101 has a steering rod 105. The steering rod 105 has a bottom side 110 and a top side 115. One or more front wheel(s) 120 is connected to the bottom side 110. The front wheel may include a brushless wheel hub motor. The brushless wheel hub motor may be electrically motorized by one or more batteries mounted on the front and/or rear lower chassis. Optionally, the batteries are mounted on two sides of the front lower chassis 125. Optionally, the batteries are mounted on two sides of the back lower chassis. A front lower chassis 125 is hinged to the bottom side 110. The front lower chassis 125 has a front lower chassis upper side 127 and a front lower chassis lower side 129. A front bearing 140 connects the front lower chassis 125 and the bottom side 110 to each other. A rear lower chassis 145 is hinged to the front lower chassis 125. The rear lower chassis 145 has a rear lower chassis lower side 150 and rear lower chassis upper side 155. At least two rear wheels 160 are connected to the rear lower chassis 145. The rear wheels 160 may be dynamically connected to the rear lower chassis 145 by retraction links 196 and wheel arms 190.

Figure 2:
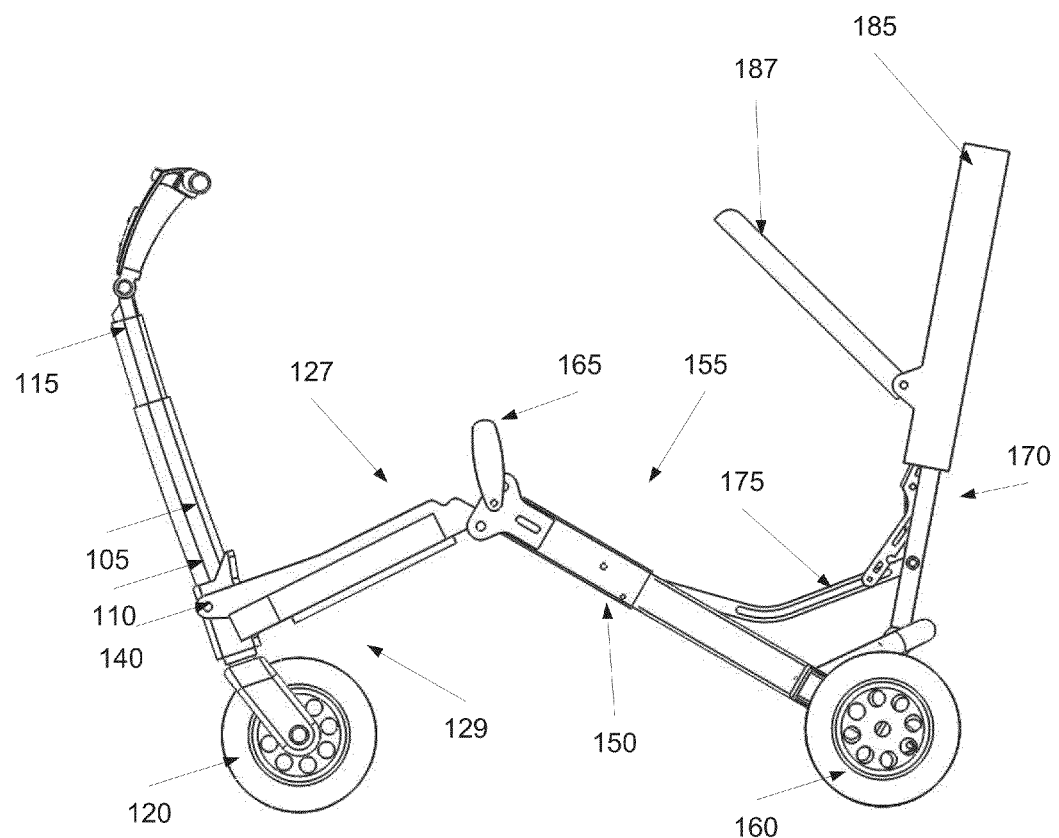
FIG. 2 is a side view of a motorized vehicle in an intermediate configuration between an operational configuration and a folded configuration, according to some embodiments of the present invention.
Figure 3:
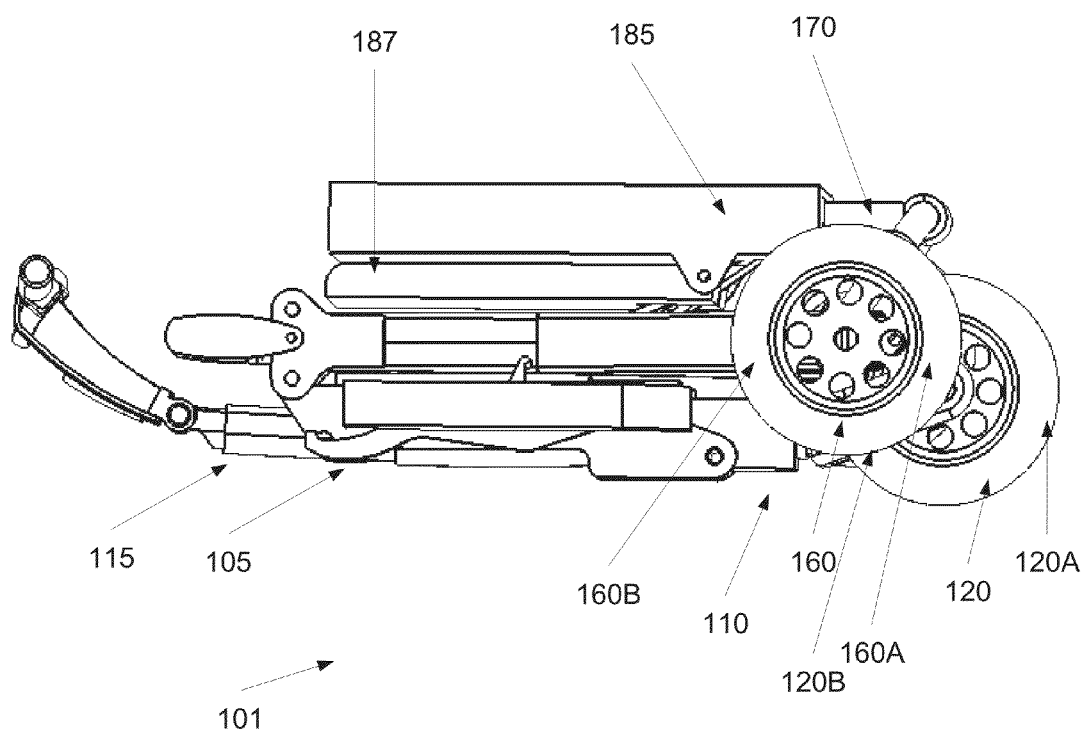
FIG. 3 is a side view of a motorized vehicle in a folded configuration, according to some embodiments of the present invention.

The rear wheels 160 may be motorized by a brushless wheel hub motors. The brushless wheel hub motors may be electrically motorized, for example as the front wheel. The wheel arms 190 may enable a diagonal movement of the rear wheels 160 with respect to the rear lower chassis 145. This movement creates a bigger distance between the rear wheels 160. The distance between an axis passing through the centers of the rear wheels 160 and the front wheel 120 is reduced when the rear wheels 160 are retracted towards said lower chassis 125 in this diagonal movement. The distance between the rear wheel(s) 160 and the front wheel(s) 120 may not be reduced when said rear wheel(s) 160 are retracted towards the lower chassis 145. The bigger rear wheels distance may enable supporting higher weight individuals, by increasing stability. The rear wheels' 160 movement may enable compliance with mobility scooter regulations by having a larger distance between the rear wheels 160. Exemplary motorized vehicle regulations are: EN12184, ANSI/RESNA WC-1 and/or ANSI/RESNA WC-2. A middle bearing 165 connects the front lower chassis 125 and said rear lower chassis 145 to each other. The middle bearing 165 may automatically trigger folding of the front bearing 140 and/or the rear bearing 175. The automatic trigger may enable folding the motorized vehicle 101 with one hand by a human operator. An upper chassis 170 is hinged to the rear lower chassis 145. A rear bearing 175 connects the upper chassis 170 and the rear lower chassis 145 to each other. The motorized vehicle 101 is taken from an operational configuration to a folded configuration by maneuvering the top side 115 of the steering rod 105 towards the front lower chassis upper side 127, the front lower chassis lower side 129 towards the rear lower chassis lower side 150 and the upper chassis 170 towards the rear lower chassis upper side 155. The folding outcome is depicted in FIG. 3 and further described below. FIG. 2 depicts the motorized vehicle 101 in an intermediate state between an operational configuration and a folded configuration, according to some embodiments of the present invention. The folded configuration is easily transported. The folded configuration may be towable as a trolley using the rear wheels, the front wheel and/or a combination thereof. The folded configuration dimensions and weight may comply with air craft luggage regulations. The folded configuration dimensions may fit into a private vehicle luggage compartment. The folded configuration dimensions may fit into passage way of an aircraft, a public bus and/or other transportation means. The motorized vehicle 101 may have a back rest 185 and a seat base 187. Close proximity of the back rest 185 and the seat base 187 is achieved by folding the back rest 185 towards the seat base 187 and/or by folding the seat base 187 towards the back rest 185.

Reference is also made to FIG. 3, which illustrates a side view of a motorized vehicle in a folded configuration, according to some embodiments of the present invention. The motorized vehicle 101 is as depicted in FIG. 1. The elements numbering scheme corresponds to the elements numbering scheme of FIG. 1. The front wheel 120 may be in close proximity to at least two rear wheels 160 when the motorized vehicle 101 is in folded configuration. The front wheel 120 has a front wheel bottom 120A and a front wheel top 120B. The rear wheel 160 has a rear wheel bottom 160A and a rear wheel top 160B.

Figure 4:
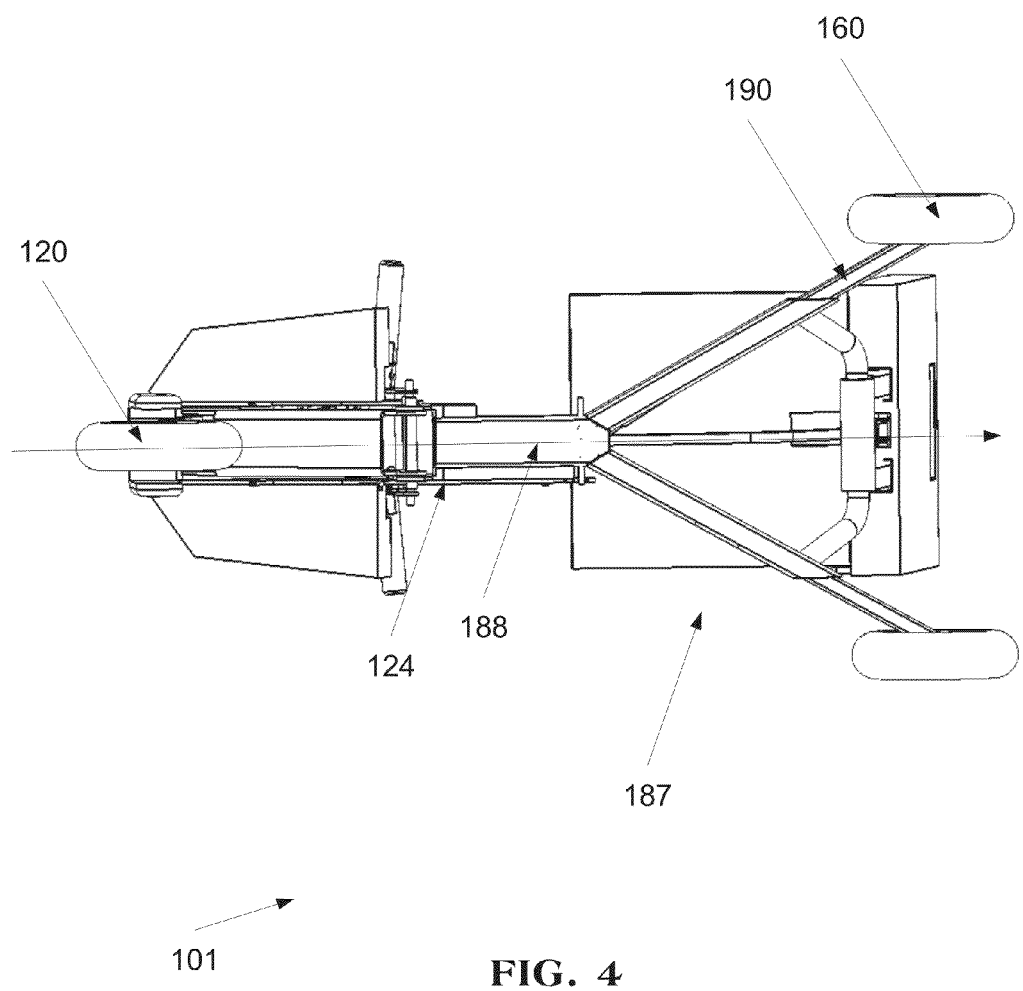
FIG. 4 is a bottom view of a motorized vehicle in an operational configuration, according to some embodiments of the present invention.

Reference is also made to FIG. 4, which illustrates a bottom view of a motorized vehicle in an operational configuration, according to some embodiments of the present invention. The motorized vehicle 101 is as depicted in FIG. 1. The elements numbering scheme corresponds to the elements numbering scheme of FIG. 1. The lower chassis 124 has a longitudinal axis 188. The distance between each rear wheel and the longitudinal axis is reduced by the wheel retraction. The retraction of the rear wheels 160 may be performed simultaneously. The retraction of the rear wheels 160 may be performed symmetrically with respect to the longitudinal axis 188. Optionally, the rear wheels 160 are retracted along a plurality of different diagonals which converge towards a point on the longitudinal axis 188. Optionally, the rear wheels 160 remain essentially parallel to one another during the retraction.

Figure 5:
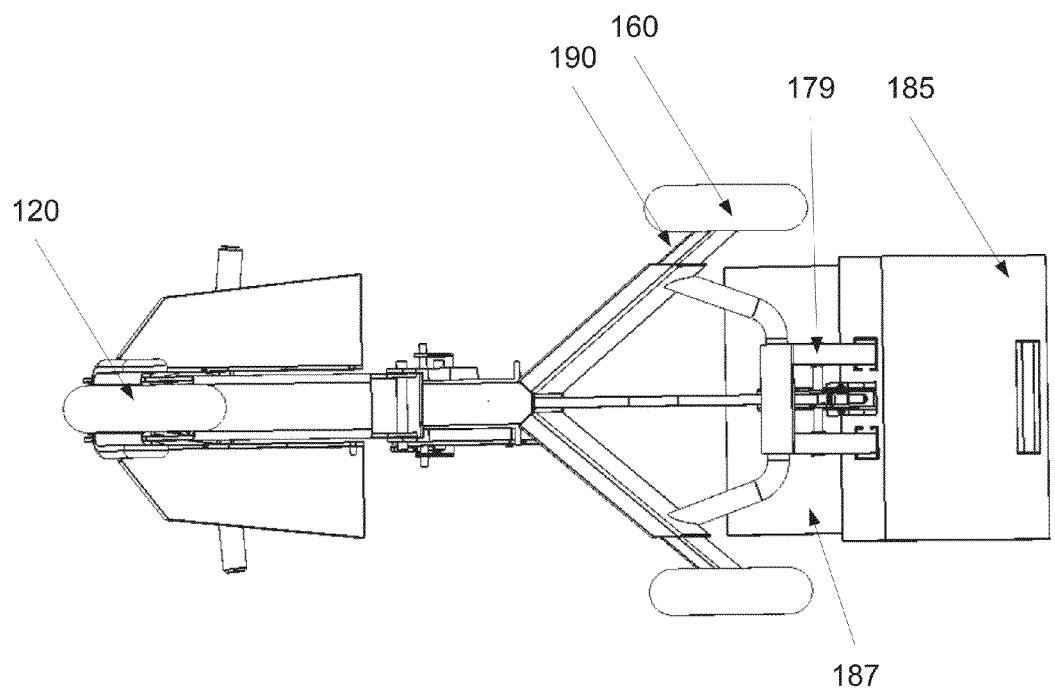
FIG. 5 is a bottom view of a motorized vehicle in an intermediate configuration between an operational configuration and a folded configuration, according to some embodiments of the present invention.

Reference is also made to FIG. 5, which illustrates a bottom view of a motorized vehicle in an intermediate configuration between an operational configuration and a folded configuration, according to some embodiments of the present invention. The motorized vehicle 101 is as depicted in FIG. 1. The elements numbering scheme corresponds to the elements numbering scheme of FIG. 1.

Figure 6:
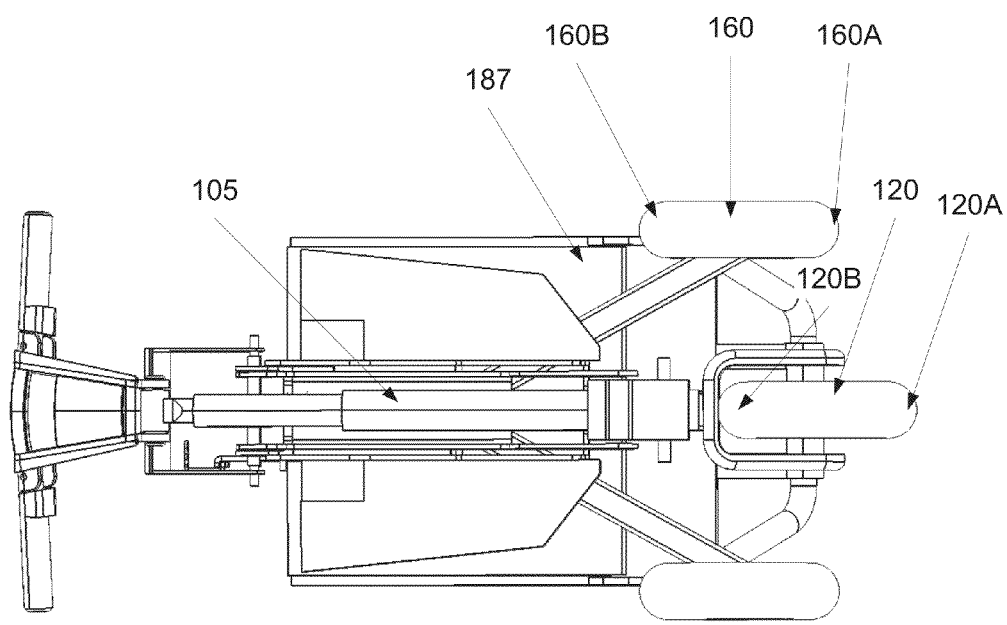
FIG. 6 is a bottom view of a motorized vehicle in a folded configuration, according to some embodiments of the present invention.

Reference is also made to FIG. 6, which illustrates a bottom view of a motorized vehicle in a folded configuration, according to some embodiments of the present invention. The motorized vehicle 101 is as depicted in FIG. 1. The elements numbering scheme corresponds to the elements numbering scheme of FIG. 1.

Figure 7:
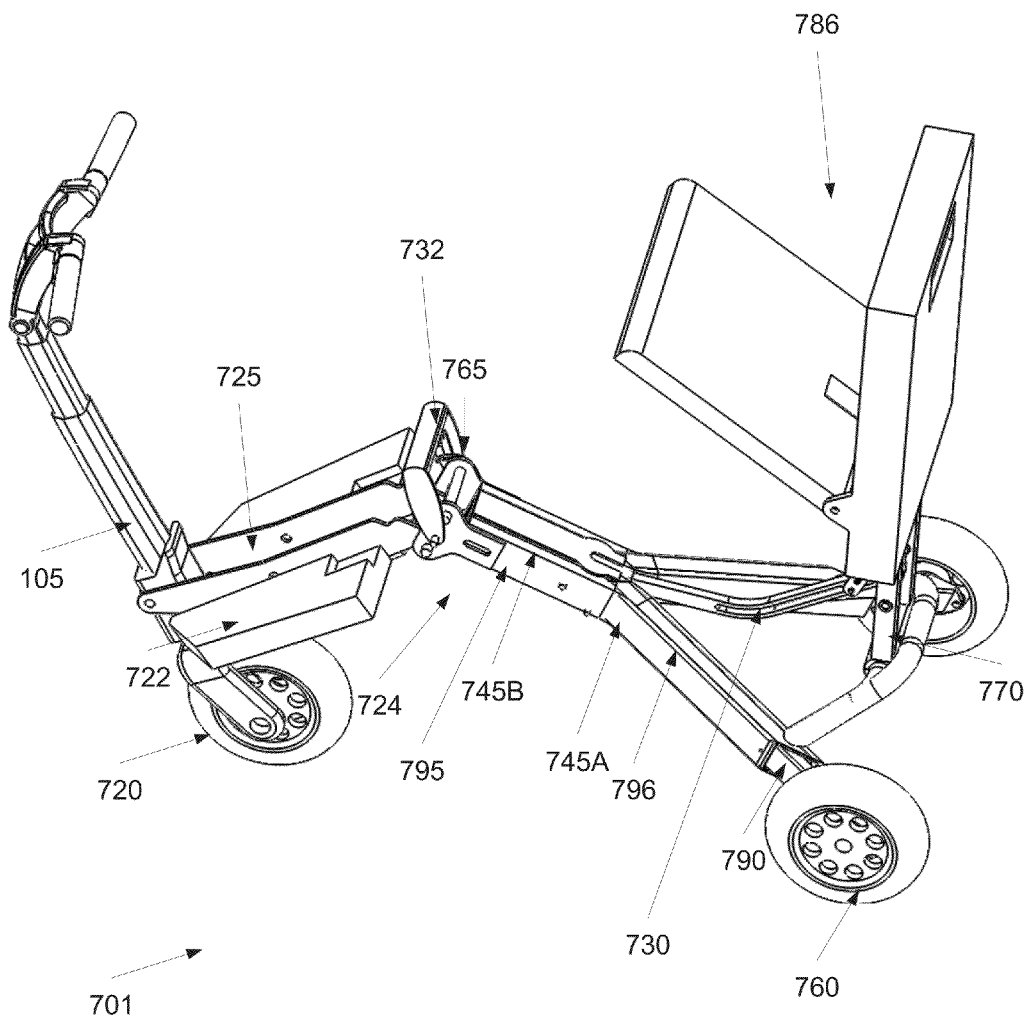
FIG. 7 is a top view illustration of a folding upper chassis coupled to a wheel retraction and extraction mechanism, according to some embodiments of the present invention.

Reference is also made to FIG. 7, which is a top view illustration of a folding chassis coupled to a wheel retraction and extraction mechanism, according to some embodiments of the present invention. FIGS. 7-10 illustrate a process of folding a motorized vehicle. The process begins by folding the seat and retracting the rear wheels. Then the handle 732 is lifted and the puller 1333 is pulled. The handle 732 is connected to a middle bearing 765. The middle bearing 765 connects between a front lower chassis 725 which is mechanically connected to the front wheel 720 and a rear lower chassis 745A, 745B that is mechanically connected to the rear wheels 760. The pulling approximates between the front lower chassis 725 and the rear lower chassis 745A, 745B. The curved lever 730 is connected to an actuator 795 which is connected to retraction links 796. The actuator 795 and retraction links 796 in this example are inside the lower chassis. The retraction links 796 are connected to wheel arms 790. The wheel arms 790 are connected to the rear wheels 760. The pushing of the lever 730 pulls the wheel arms 790, optionally diagonally, shortening the distance between one rear wheel 760 to another and between the rear wheel 760 and the rear lower chassis 745A, 745B. As the pulling simultaneously approximates between the front lower chassis 725 and the rear lower chassis 745A, 745B, the rear 760 and the front wheels 720 are maneuvered toward one another. In such a manner, in a folded configuration, the front 720 and rear wheels 760 are at a common side of the motorized vehicle 701. The wheel retraction and extraction mechanism 796 has an actuator 795, internal retraction links 796 and wheel arms 790 that pull the rear wheels 760 towards lower chassis 724. The motorized vehicle 701 has a chassis. The chassis is made of an upper chassis 770 and a lower chassis 724. The lower chassis 724 is made of a front lower chassis and a rear lower chassis. The two lower chassis parts are connected by a bearing 765. The folding of the upper chassis 770 towards the lower chassis 724 drives the movement of the wheel retraction and extraction mechanism. When the seat is folded the lever 730 drives the actuator 795 along the straight section of the rear lower chassis 745B. The moving actuator 795 pulls the retraction links 796 which pull the wheel arms 790. The retraction links 796 moves from the angled part of the rear lower chassis 745A to the straight part of the rear lower chassis 745B. The movement of the wheel arms enables change(s) in width, length, diagonal movement, V-shaped movement, Y-shaped movement and/or a combination thereof between the rear wheels 760 and the rear lower chassis 745. The upper chassis 770 folds towards the actuator 795. For example, the wheel retraction of a motorized vehicle of 580 mm width, 1138 mm length, 868 mm height, 203 mm wheel diameter is between about 60 mm and about 120 mm width, and between about 60 mm and 200 mm in length. Optionally, the actuator 795 and the lever 730 move the rear wheel 760 diagonally towards the lower chassis 724. The diagonal movement may be at an angle of about 25 to 65 degrees with respect to the rear lower chassis 745. The motorized vehicle 701 has at least one front wheel 720. Optionally, the folded motorized vehicle 701 has a foot rest 722. Optionally, the motorized vehicle 701 further comprises a folding seat 786. The folding seat 786 may be mounted on the upper chassis 770. Folding of the folding seat 786 may drive the contraction of the upper chassis 770. Optionally, the lower chassis 724 has a front lower chassis 725 and a rear lower chassis 745A, 745B and a bearing connects the front lower chassis with the rear lower chassis.

Figure 8:
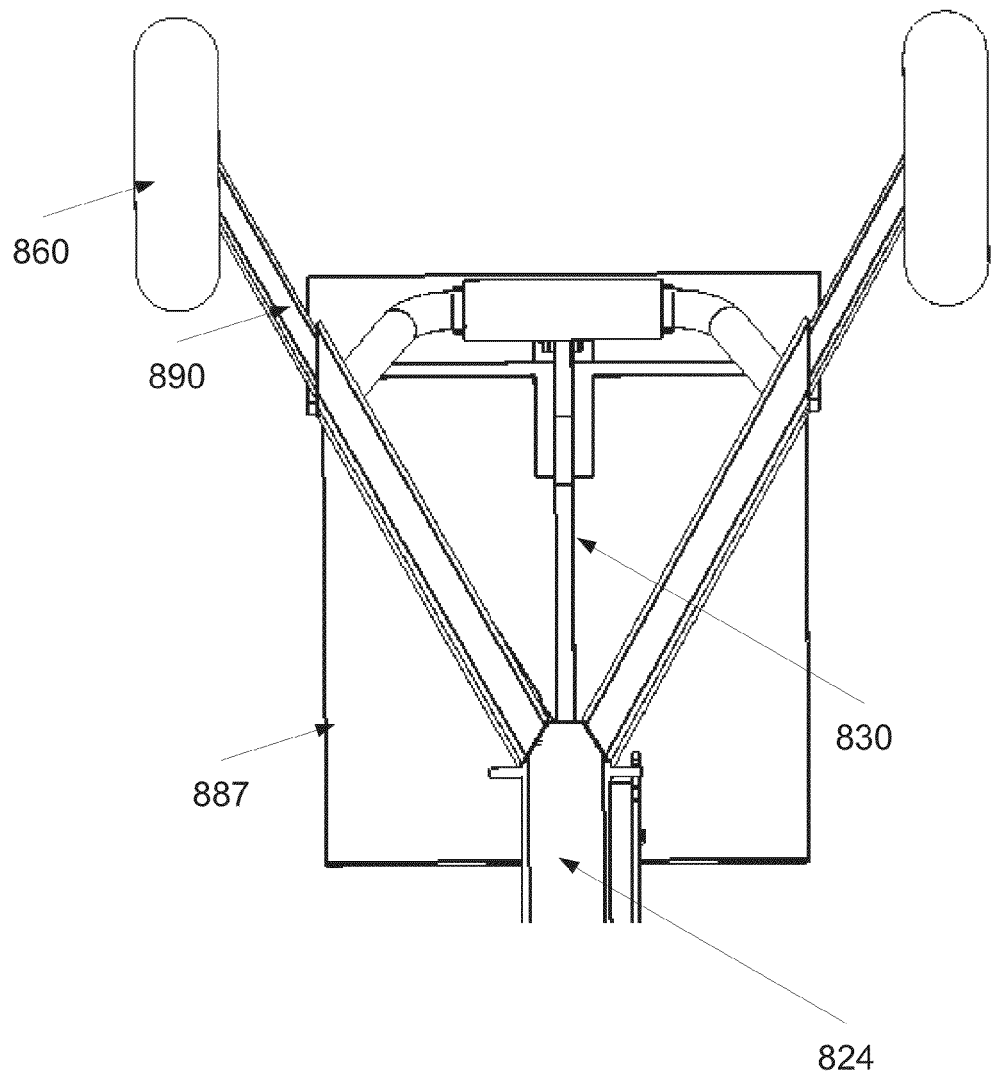
FIG. 8 is a bottom view illustration of a folding chassis back part coupled to a wheel retraction and extraction mechanism in an operational configuration, according to some embodiments of the present invention.

Reference is also made to FIG. 8, which is a bottom view illustration of a folding chassis back part coupled to a wheel retraction and extraction mechanism in an operational configuration, according to some embodiments of the present invention. The seat folding and the wheel retraction and extraction mechanisms are as depicted in FIG. 7. The curved lever 830 and the seat base 887 are viewed from below. The rear wheels 860 are depicted in an operational configuration. The wheel arms 890 are in furthest position with respect to the lower chassis 824.

Figure 9:
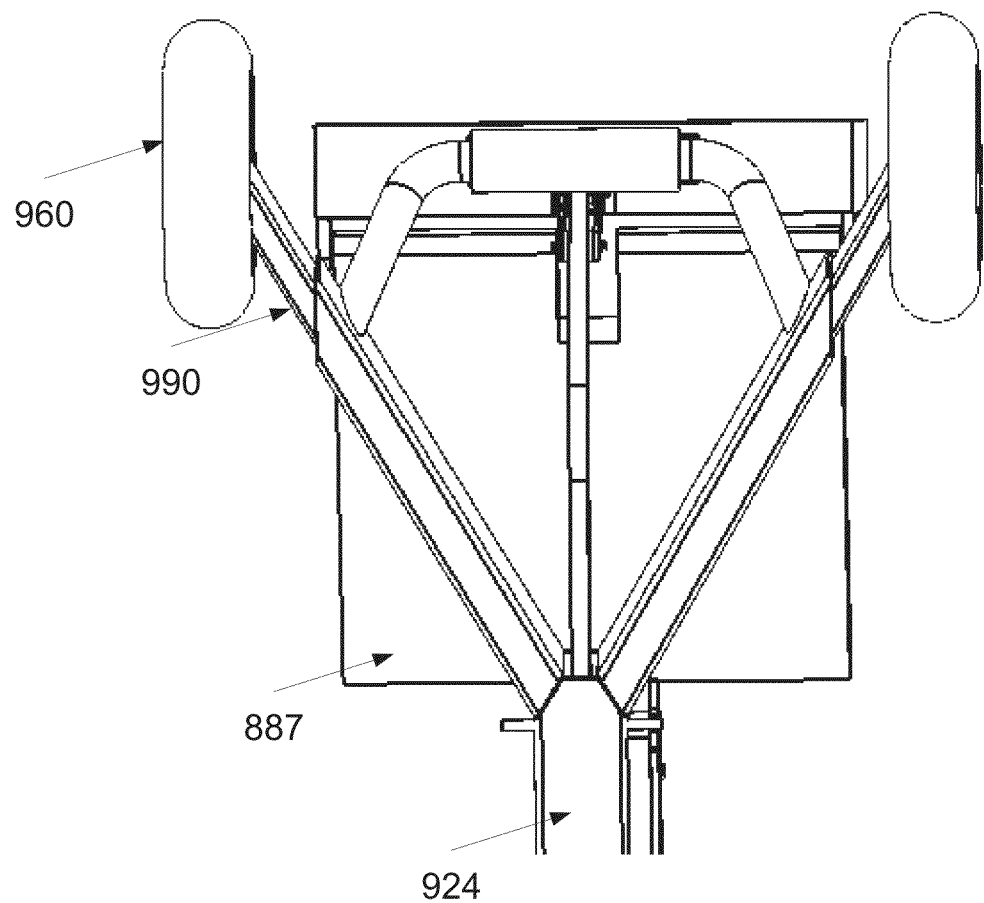
FIG. 9 is a bottom view illustration of a folding chassis back part coupled to a wheel retraction and extraction mechanism in an intermediate configuration, according to some embodiments of the present invention.

Reference is also made to FIG. 9, which is a bottom view illustration of a folding chassis back part coupled to a wheel retraction and extraction mechanism in an intermediate configuration, according to some embodiments of the present invention. The seat folding and the wheel retraction and extraction mechanisms are as depicted in FIG. 7. The rear wheels 960 are depicted in an intermediate position between an operational configuration and a folded configuration. The wheel arms 990 are closer to the lower chassis 924 with respect to their position as depicted in FIG. 8.

Figure 10:
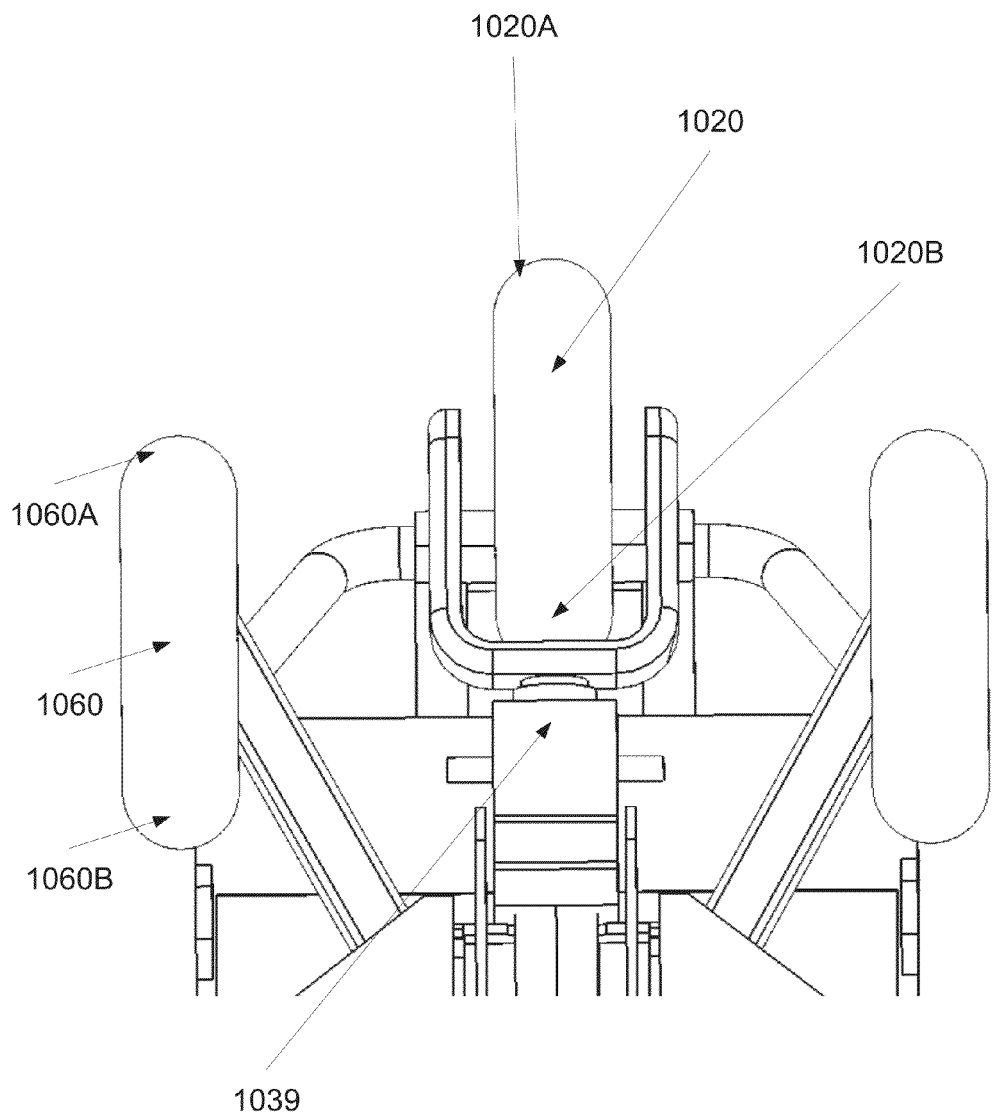
FIG. 10 is a bottom view illustration of a folding chassis back part coupled to a wheel retraction and extraction mechanism in a folded configuration, according to some embodiments of the present invention.

Reference is also made to FIG. 10, which is a bottom view illustration of a folding chassis back part coupled to a wheel retraction and extraction mechanism in a folded configuration, according to some embodiments of the present invention. The seat folding and the wheel retraction and extraction mechanism are as depicted in FIG. 7. The rear wheels 1060 are depicted in a folded configuration. The front wheel 1020 has a front wheel bottom 1020A and a front wheel top 1020B. The rear wheel 1060 has a rear wheel bottom 1060A and a rear wheel top 1060B. The wheel arms 1090 are in the closest position to the lower chassis 1024.

Figure 11:
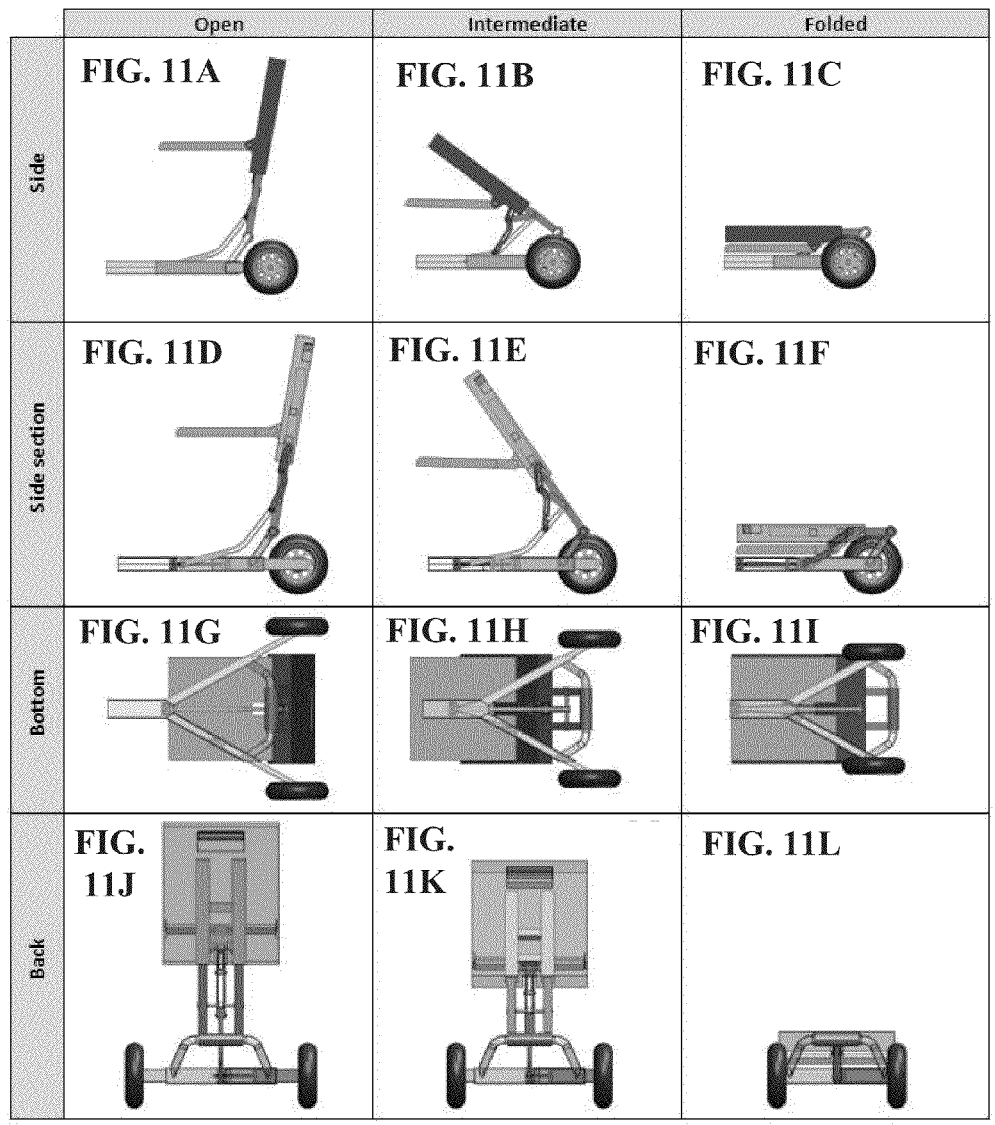
FIGS. 11A-11L is a table illustrating the back part of the motorized vehicle in operational, intermediate and folded configurations from four different view points.

Reference is also made to FIGS. 11A-11L, which are images illustrating the back part of the motorized vehicle in operational, intermediate and folded configurations from four different view points, according to some embodiments of the present invention. FIGS. 11A, 11B and 11C illustrate the back part of the motorized vehicle from a side view in operational, intermediate and folded configurations respectively. FIGS. 11D, 11E and 11F illustrates a side section of the back part of the motorized vehicle in an operational, intermediate and folded configurations respectively configuration. FIGS. 11G, 11H and 11I illustrate the back part of the motorized vehicle from a bottom view in operational, intermediate and folded configurations respectively. FIGS. 11J, 11K and 11L illustrate the back part of the motorized vehicle from a rear view in operational, intermediate and folded configurations respectively.

Figure 12:
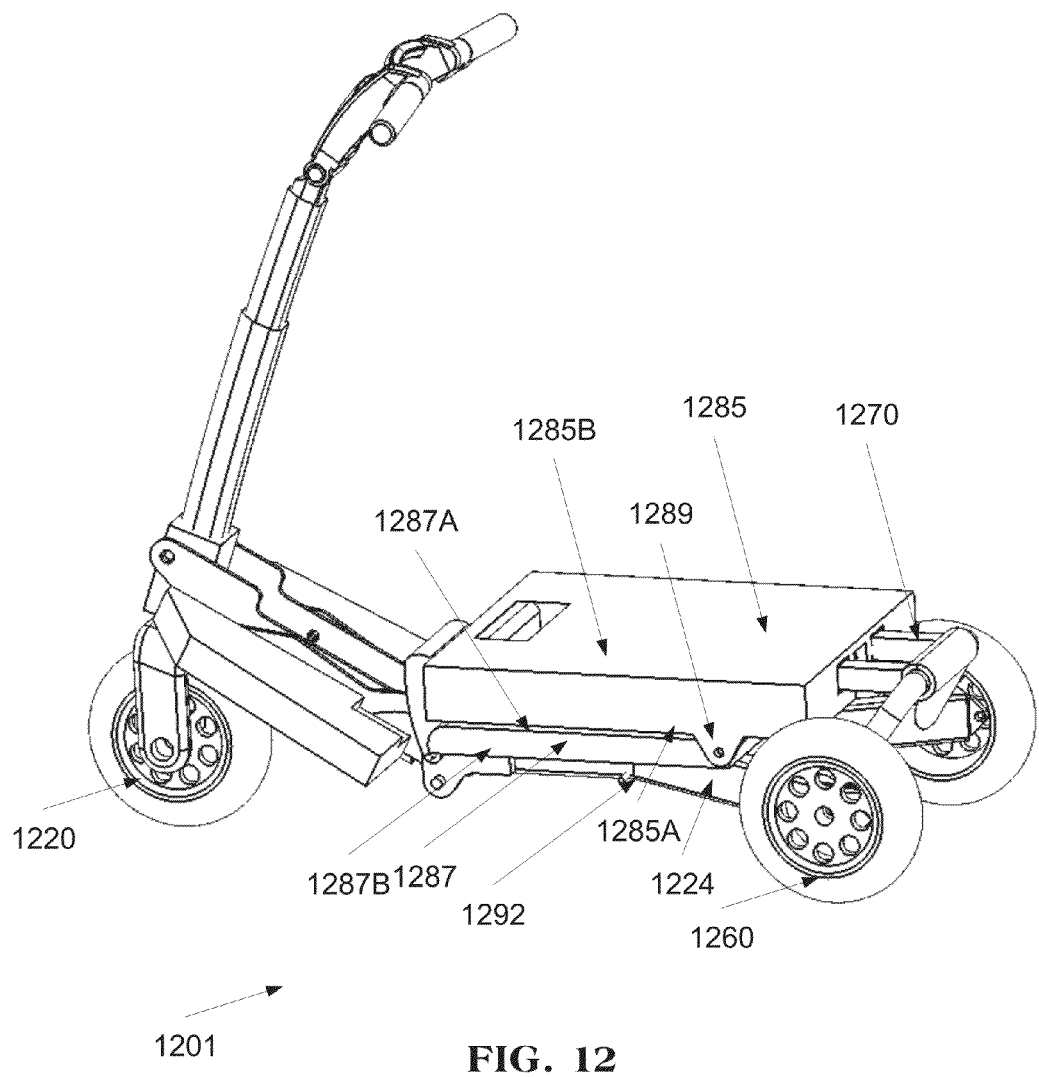
FIG. 12 is a motorized vehicle in a standing configuration, according to some embodiments of the present invention.

Reference is also made to FIG. 12, which illustrates a motorized vehicle 1201 in a standing configuration, according to some embodiments of the present invention. The motorized vehicle 1201 has at least two configurations, namely a sitting configuration and a standing configuration, and optionally a third configuration, the folded configuration. The transition of the motorized vehicle 1201 from the sitting configuration to the standing configuration or vice versa may be accomplished by folding the seat base 1287 and the upper chassis 1270. The folded back rest 1285 is used as a standing platform in the standing configuration. Optionally, the rear wheels 1260 may be retracted using a wheel retraction and extraction mechanism as described in FIGS. 7-10. The motorized vehicle 1201 has a chassis 1224, one or more rear wheel(s) 1260 and at least one front wheel 1220. The seat base 1287 is hinged to the backrest 1285 by a bearing 1289. The seat base 1287 is essentially perpendicularly positioned with respect to the backrest 1285 when the motorized vehicle 1201 is in a sitting configuration. The seat base 1287 is essentially parallel to the backrest 1285 when the motorized vehicle 1201 is in standing configuration. The seat base 1287 is in close proximity to the chassis when the motorized vehicle 1201 is in standing configuration. The seat base 1287 position change may be achieved by the upper chassis folding device depicted in FIG. 16. The seat base 1287 may have a seat base back side 1287B and a seat base seat support side 1287A. The seat base back side 1287B may fit in size and/or shape to the lower chassis. The backrest 1285 may have a backrest back support side 1285A and a backrest back side 1285B. The seat base seat support side 1287A and/or the backrest back support side 1285A may fit a sitting position of a human operator. The backrest back side 1285B size and/or shape may fit a standing mode of a human operator. The backrest back side 1285B may be flat and/or may have a rough gripping surface for preventing sliding and increasing traction. The motorized vehicle 1201 may have a wheel moving mechanism 1292 which pushes at least one rear wheel 1260 away from the chassis 1224 when the motorized vehicle 1201 is in sitting configuration and retracts at least one rear wheel 1260 when the motorized vehicle 1201 is in standing configuration. The motorized vehicle may comprise a seat locking mechanism, which restricts the movement of the seat base 1287 when the motorized vehicle is in at least one of the sitting configuration and standing configuration. The seat locking mechanism allows the movement of the seat base and the backrest when the scooter transitions between the sitting configuration and the standing configuration. The seat locking mechanism may be mounted on the backrest 1285. Optionally, the motorized vehicle may comprise a chassis locking mechanism, which restricts the movement of the upper chassis with respect to the lower chassis when the motorized vehicle is in at least one of the sitting configuration, folded configuration and standing configuration. The chassis locking mechanism allows the movement of the upper chassis 1270 and the lower chassis when the scooter transitions between the sitting configuration, folded configuration and the standing configuration. The chassis locking mechanism may be mounted on the backrest 1285.

Figure 13:
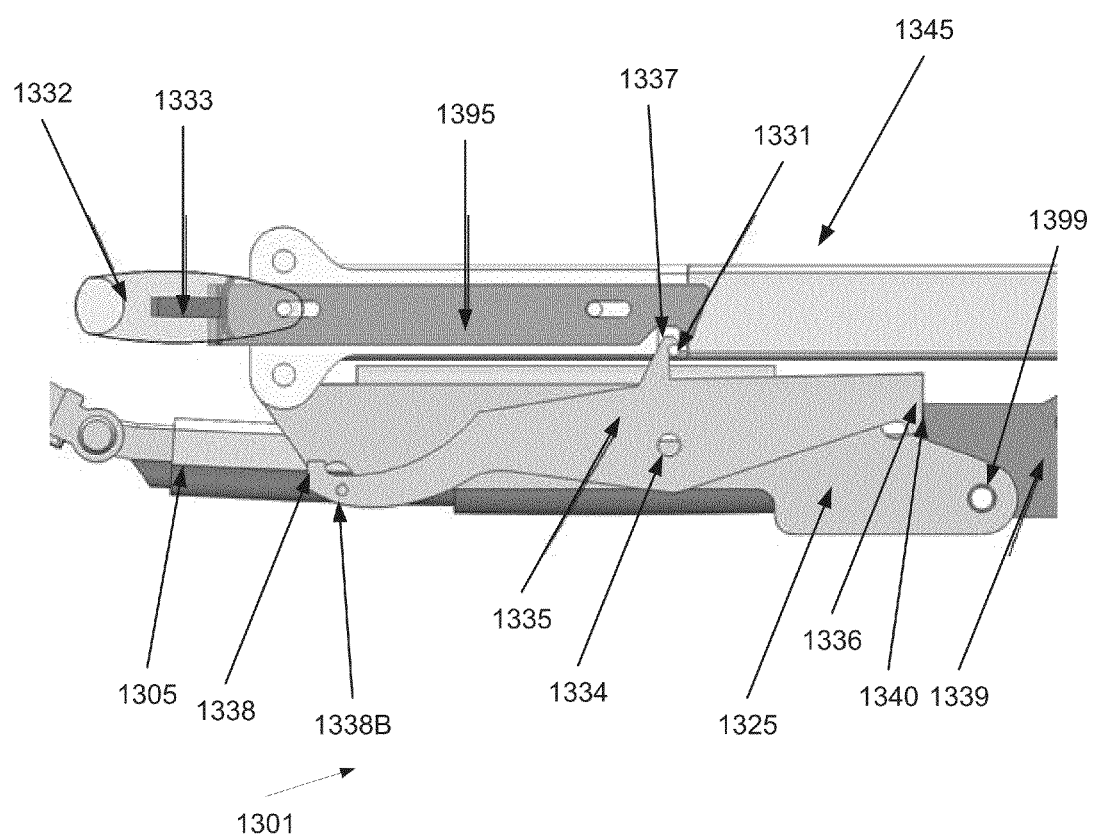
FIG. 13 is a central lock and release mechanism for simultaneous operation of two locks in a motorized vehicle, in a folded configuration, according to some embodiments of the present invention.

Reference is also made to FIG. 13, which illustrates a locked state of a central lock and release mechanism for a motorized vehicle 1301 in a folded configuration, according to some embodiments of the present invention. The rocker 1335 has a fork hook 1336, a first rear lower chassis hook 1337 and a second rear lower chassis hook 1338. The first 1337 and second 1338 rear lower chassis pins are mounted on said rear lower chassis 1345. In the folded configuration the first 1337 rear chassis hook 1337 is hooked to a pin 1331. The first 1337 and second 1338 rear lower chassis hooks hook onto the first 1537A and second 1538A rear lower chassis pins, respectively. The steering rod 1305 is hinged to the front lower chassis 1325. The front lower chassis 1325 is hinged to the rear lower chassis 1345. On the front lower chassis 1325 is a rocker 1335 that pivots around an axis 1334. In an operational configuration, a sitting and/or standing configurations, the rocker 1335 hooks onto the fork 1339 on one end and the rear lower chassis 1345 on the other end as further described in FIG. 15. The rocker 1335 is pivoted in the locking direction using a spring which is not shown in this illustration. Lifting the puller 1333, which is located on the handle 1332, pulls at pin 1338B and releases the two hooks 1336, 1337 simultaneously and allows the front lower chassis 1325 and the rear lower chassis 1345 to fold. The front lower chassis 1325 and the rear lower chassis 1345 are free to move from an operative configuration to a folded configuration. To release the central locking mechanism in the folded configuration, the puller 1333 moves the flange 1395, via a mechanical connection, against a flange spring. The flange spring is connected to the flange and rear lower chassis, and the flange 1395 is mechanically connected to the rear lower chassis 1345. The flange 1395 pulls against the first rear lower chassis hook 1337. The first rear lower chassis hook 1337 pivots the rocker 1335 for releasing. In a folded configuration the front lower chassis 1325 and the rear lower chassis 1345 are parallel to each other. A the first rear lower chassis hook 1337, in the rocker 1335 latches over the first rear lower chassis pin 1337A in the rear lower chassis 1345 and prevents the front lower chassis 1325 and the rear lower chassis 1345 from separating. A geometric lock 1340 between the rocker 1335 and fork 1339 prevents the steering rod 1305 from tilting. In this mode, lifting the puller 1333 moves the flange 1395 against a spring which is not shown. The flange 1395 pulls at the first rear lower chassis hook 1337 which pivots the rocker 1335 and releases the front lower chassis 1325 and the rear lower chassis 1345. In a folded configuration of the motorized vehicle, the released rocker 1335 releases two locks: the spring pivots the rocker 1335 so that the rocker 1335 pushes against the fork 1339 and prevents it from rotating about its axis 1399. A rear lower chassis 1345 is locked by the rocker 1335. The rocker 1335 pivoting releases the chassis and steering rod 1305 thereby allowing the front lower chassis 1325 and the rear lower chassis 1345 to align at an approximately horizontal position. Optionally, there are multiple rockers 1335. For example, two rockers 1335 are positioned on both sides of the front lower chassis 1325.

Figure 14:
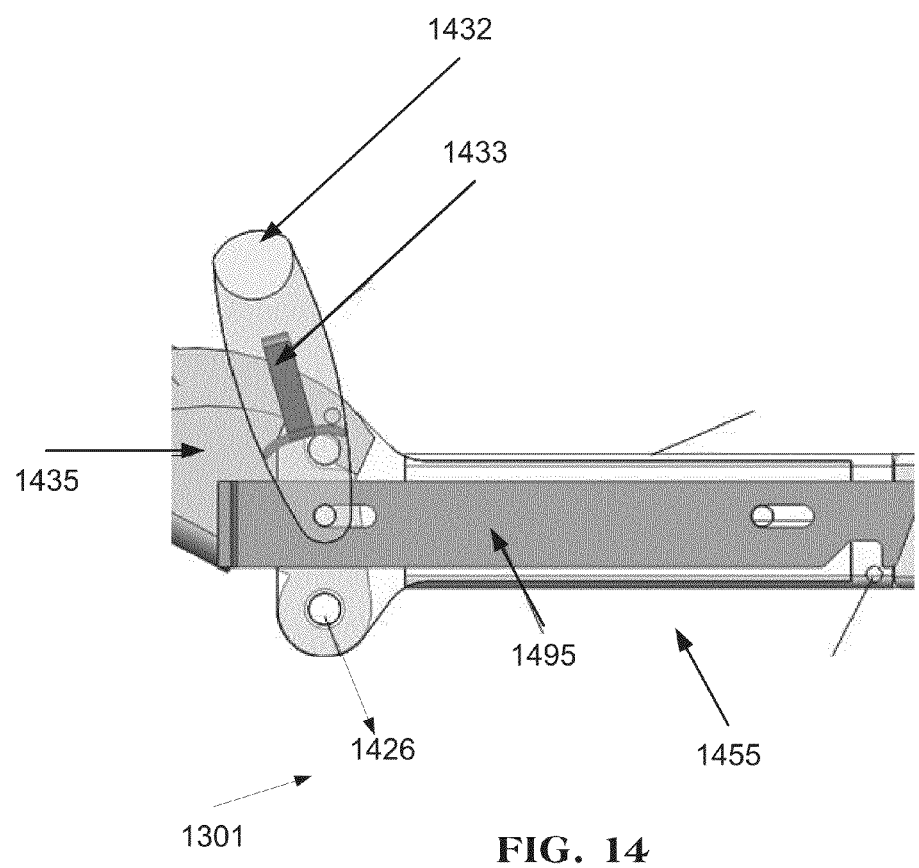
FIG. 14 is a central lock and release mechanism for simultaneous operation of two locks, in an operational configuration, according to some embodiments of the present invention.

Reference is also made to FIG. 14, which illustrates a central lock and release mechanism for simultaneous operation of two locks in an operational motorized vehicle, in a locked state, according to some embodiments of the present invention. The central lock and release mechanism 1301 is as depicted in FIG. 13. The elements numbering scheme corresponds to the elements numbering scheme of FIG. 13. The handle 1432 is moved by a human operator for folding the mobility scooter. The handle 1432 moves towards the rocker 1435 which in turn moves the puller 1433. The rocker moves around the axis 1334 and the front lower chassis moves around the chassis hinge 1426. When the front lower chassis moves around the chassis hinge 1426 it is folded towards the rear lower chassis lower side 1455.

Figure 15:
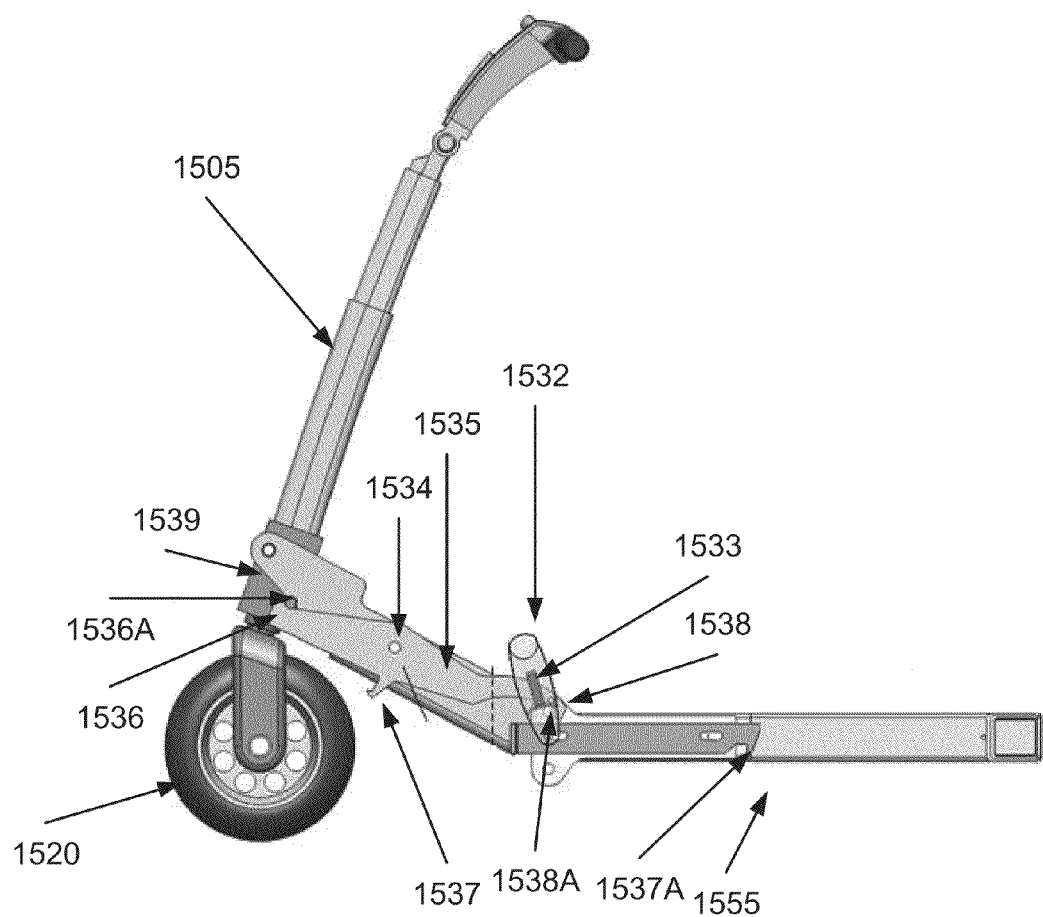
FIG. 15 is a central lock and release mechanism for simultaneous operation of two locks as part of a motorized vehicle front in an operational configuration, according to some embodiments of the present invention.

Reference is also made to FIG. 15, which illustrates a central lock and release mechanism for simultaneous operation of two or more locks as part of a motorized vehicle front in an operational configuration, according to some embodiments of the present invention. The central lock and release mechanism is as depicted in FIG. 13. The elements numbering scheme corresponds to the elements numbering scheme of FIG. 13. When the handle 1532 is positioned perpendicular to the rear lower chassis 1555 and the puller 1533 is pulled, the rocker 1535 pivots around the axis 1534 causing the rocker's fork hook 1536 to release from the fork 1539. The fork 1539, which is mounted on the front lower chassis 1525, has a pin 1536A fitting the fork hook 1536. The release is made by the release of the pin 1536A. The released fork 1539 along with the steering rod 1505 and the front wheel 1520 can move towards the lower side of the rear lower chassis 1555 to their folded position when the handle 1532 is pulled up. Optionally, a spring operated on said rocker 1535 to lock said rear lower chassis 1555 and said steering rod 1505.

Figure 16:
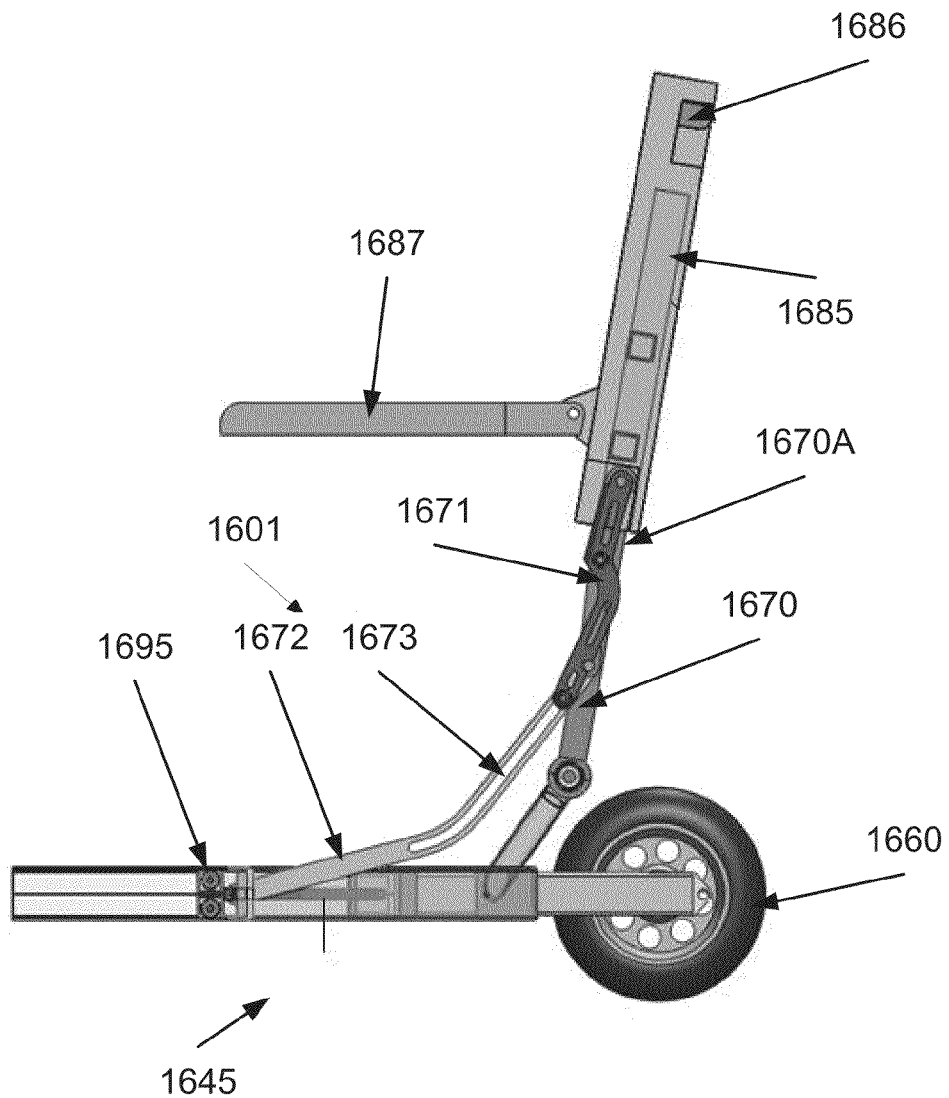
FIG. 16 is a side view of an upper chassis folding device, according to some embodiments of the present invention.

Reference is also made to FIG. 16, which illustrates a side view of an upper chassis folding device 1601, according to some embodiments of the present invention. An arm 1671 is mechanically connected to the upper chassis 1670. A curved lever 1672 having a curved channel 1673 is mechanically connected to a rear lower chassis 1645. The mechanical connection between the chassis and the curved lever 1672 may comprise an actuator 1695. The actuator 1695 is pushed inside along the chassis upon folding of the upper chassis folding device 1601. The arm 1671 is engaged in the curved channel 1673. The arm is essentially continuing the curved lever 1672. The arm 1671 is mechanically connected to the upper chassis 1670. The mechanical connection between the arm 1671 and the upper chassis 1670 may comprise a multiplicity of arms connected by a multiplicity of hinges. An arm 1671 and/or a set of arms and hinges 1671 is mechanically connected to the back rest 1685. The arm 1671 and the curved lever 1672 elevate the seat base 1687 indirectly in a sitting configuration compared to a standing configuration. Optionally, the back rest 1685 has channels and the upper chassis has roads 1670A. The back rest 1685 glides over the upper chassis 1670 by the movement of the backrest 1685 channels over the upper chassis roads 1670A. The back rest 1685 channels encircle the upper chassis roads 1670A. The gliding of the back rest 1685 may be enabled by the movement of the arm 1671 in the curved lever 1672. The gliding of the back rest 1685 may shorten the total length of the back rest 1685 and upper chassis 1670 thereby creating a compact folded configuration. Optionally, the upper chassis folding device comprises a back rest 1685 mounted on the upper chassis 1670 and a seat base 1687 hinged to the back rest 1685. The seat base 1687 hangs over the rear lower chassis 1645. The seat base 1687 may have an orthopedic shape capable of supporting a heavy weight person for about 12 hours in a row without causing discomfort. Optionally, the upper chassis folding device 1601 comprises a lock between the back rest 1685 and the seat base 1687. Optionally, the back rest 1685 has a release button 1686. The release button 1686 allows the seat base 1687 and the back rest 1685 to fold towards each other and towards the rear lower chassis 1645. The lock is re-engaged when the back rest 1685 and the seat base 1687 and the rear lower chassis 1645 are parallel in a folded position. Optionally, an additional hinged arm is connected to the seat base 1687. The additional hinged arm keeps the seat base 1687 parallel to the ground as the seat base 1687 is hanged over the rear lower chassis 1645 in an open position when the motorized vehicle is in an operational configuration and while the mobility scooter is transitioned from sitting configuration to standing configuration. Optionally, the upper chassis folding device 1601 is locked and released by a locking mechanism comprising a disc, which is mounted on the actuator 1695, with one or more pins. The disc's pins fit into apertures of the rear lower chassis 1645. When the actuator 1695 moves the upper chassis folds and the disc moves along with the actuator 1695. When the actuator is in its new position the pins on the disc fit into a different set of apertures in the rear lower chassis 1645. A wire connecting the release button 1686 to the actuator may be used to control the lock. There may be two discs on both sides of the actuator. The multiplicity of discs may contribute to the strength of the lock and/or its ability to maintain upper chassis position when external pressure is applied.

Figure 17:
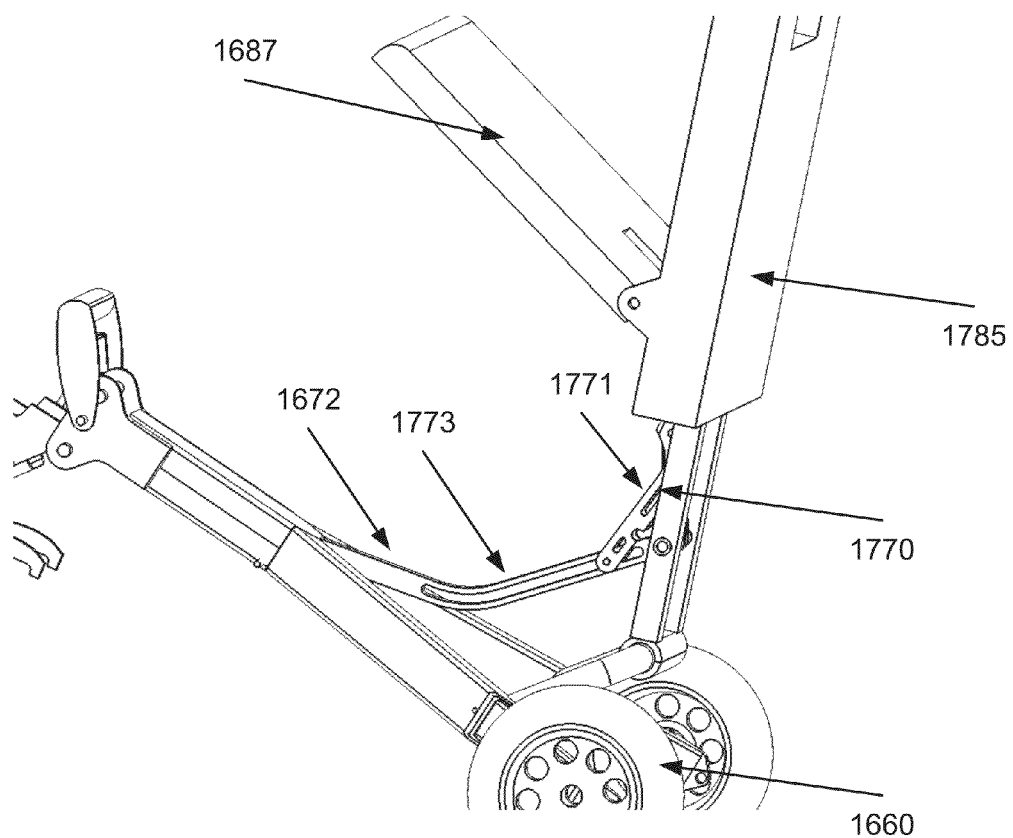
FIG. 17 is an angled rear view of an upper chassis folding device during folding, according to some embodiments of the present invention.

Reference is also made to FIG. 17, which illustrates an angled rear view of an upper chassis folding device during folding, according to some embodiments of the present invention. The upper chassis folding device is as depicted in FIG. 16. The upper chassis folding device is depicted here during the folding process. The arm 1771 is posited further down the curved channel 1773 with respect to its position 1671 in FIG. 16. The arm's 1771 position enables the back rest 1785 gliding over the upper chassis 1770.

Figures 18A, 18B, 18C, 18D, 18E, 18F:
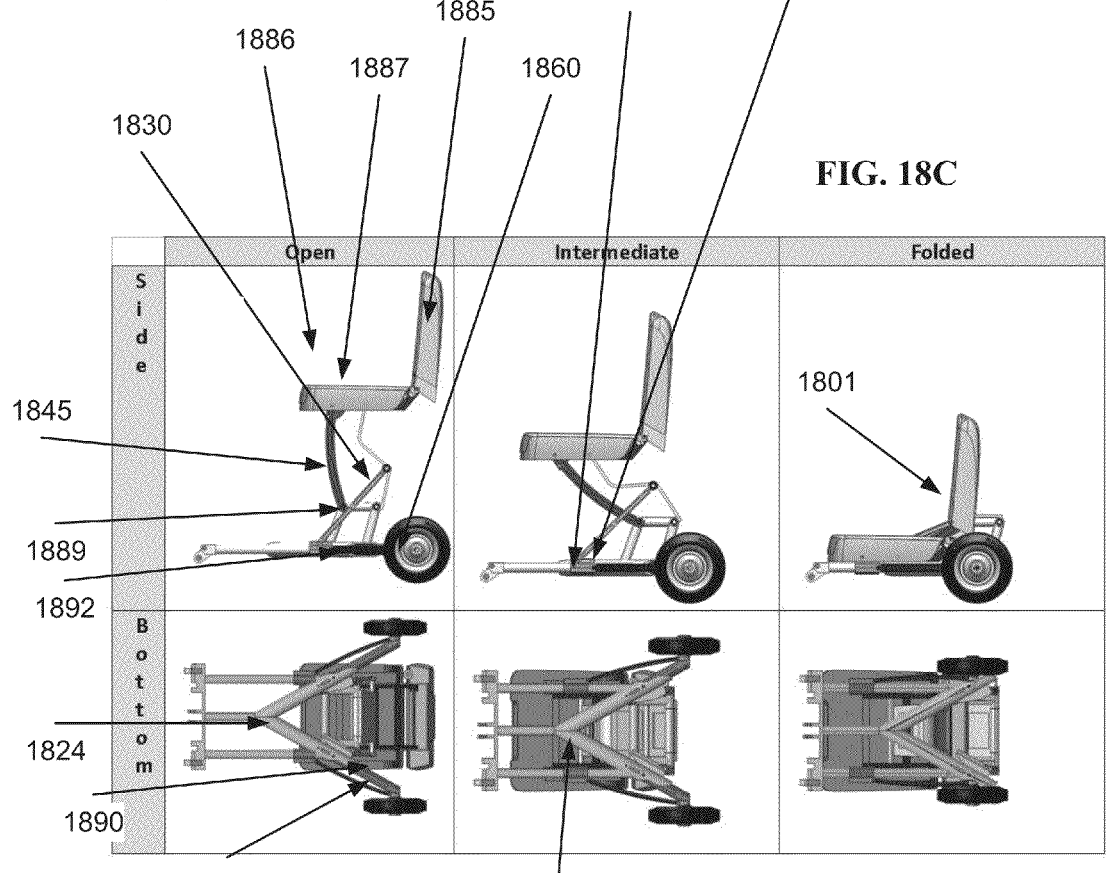
FIGS. 18A-18F are rear parts of motorized vehicles with a bearing and a wheel retraction apparatus, according to some embodiments of the present invention.

Reference is also made to FIGS. 18A-18F, which are images illustrating rear parts of a motorized vehicle 1801 with a bearing and a wheel retraction apparatus, according to some embodiments of the present invention. FIGS. 18A, 18B and 18C illustrate a side view of a sitting, intermediate and folded configurations respectively. FIGS. 18D, 18E and 18F illustrates a bottom view of the sitting, intermediate and folded configurations respectively. In this embodiment, the motorized vehicle 1801 seat 1886 and upper chassis 1845 folding triggers the rear wheels 1860 retraction. The motorized vehicle 1801 is as described in FIG. 20. The motorized vehicle 1801 folding begins with lowering the chair 1886. The chair 1886 may be in a folded configuration or in an open configuration when lowered. The chair 1886 has a base 1887 and a back rest 1885. The chair 1886 is lowered by the movement of the upper chassis 1845 towards the lower chassis. This movement is possible by multiple bearings 1889 connecting the upper 1845 and lower 1824 chassis. In this example, the movement is enabled by four bearings constituting a parallelogram. Upon the seat 1886 folding, the lever 1830 moves along with the upper chassis. The lever's 1830 movement triggers the rear wheels 1860 retraction by the wheel retraction apparatus 1892. Here, the wheel retraction apparatus 1892 has an actuator 1895, two retraction links 1896 and wheel arms 1890. Optionally, the wheel retraction apparatus 1892 has at least one actuator 1895, at least one retraction link 1896 and at least one wheel arm 1890. In this example, the retraction links 1896 are external to the lower chassis 1824. The retraction links 1896 are optionally spread in a V shaped arrangement and/or a Y shaped arrangement. Optionally, the movement of the retraction links 1896 may be limited by a Y shaped track. Optionally, the retraction links position is interior to the lower chassis 1824 and/or integral within the lower chassis. When the lever 1830 moves, the actuator 1895 moves forwardly. The lever 1830 moves along the tunnel 1895A of the actuator 1895. The lever also moves along with the actuator which moves along the lower chassis 1824. The actuator 1895 pulls with it the retraction links 1896. The retraction links 1896 then pull the rear wheels 1860. The rear wheels 1860 move diagonally towards the lower chassis 1845.

Reference is also made to FIGS. 19A-19F, which are images illustrating a motorized vehicle 1901 with a bearing and a wheel retraction apparatus, according to some embodiments of the present invention. FIGS. 19A, 19B and 19C illustrate a side view of a sitting, intermediate and folded configurations respectively. FIGS. 19D, 19E and 19F illustrates a bottom view of the sitting, intermediate and folded configurations respectively. In this embodiment, the motorized vehicle 1901 seat 1986 and upper chassis 1945 folding triggers the rear wheels 1960 retraction. The motorized vehicle 1901 is as described in FIG. 21. The motorized vehicle 1901 folding begins with folding the chair 1986. The base, which is not depicted in the illustration, is folded towards the back rest 1985. The upper chassis is folded towards the lower chassis 1924 by the bearing 1989. Upon the upper chassis folding, the lever 1930 triggers the rear wheels 1960 retraction by the wheel retraction apparatus 1992. Here, the wheel retraction apparatus 1992 has an actuator 1995, two retraction links 1996 and two wheel arms 1990. The retraction links 1996 located internally to the V shaped lower chassis 1924. The lever 1930 rotates the actuator 1995. The rotating actuator 1995 pulls with it the retraction link 1996. The retraction link 1996 then pulls the rear wheels 1960. The rear wheels 1960 move diagonally towards the folded lower chassis 1945.

Figure 20:
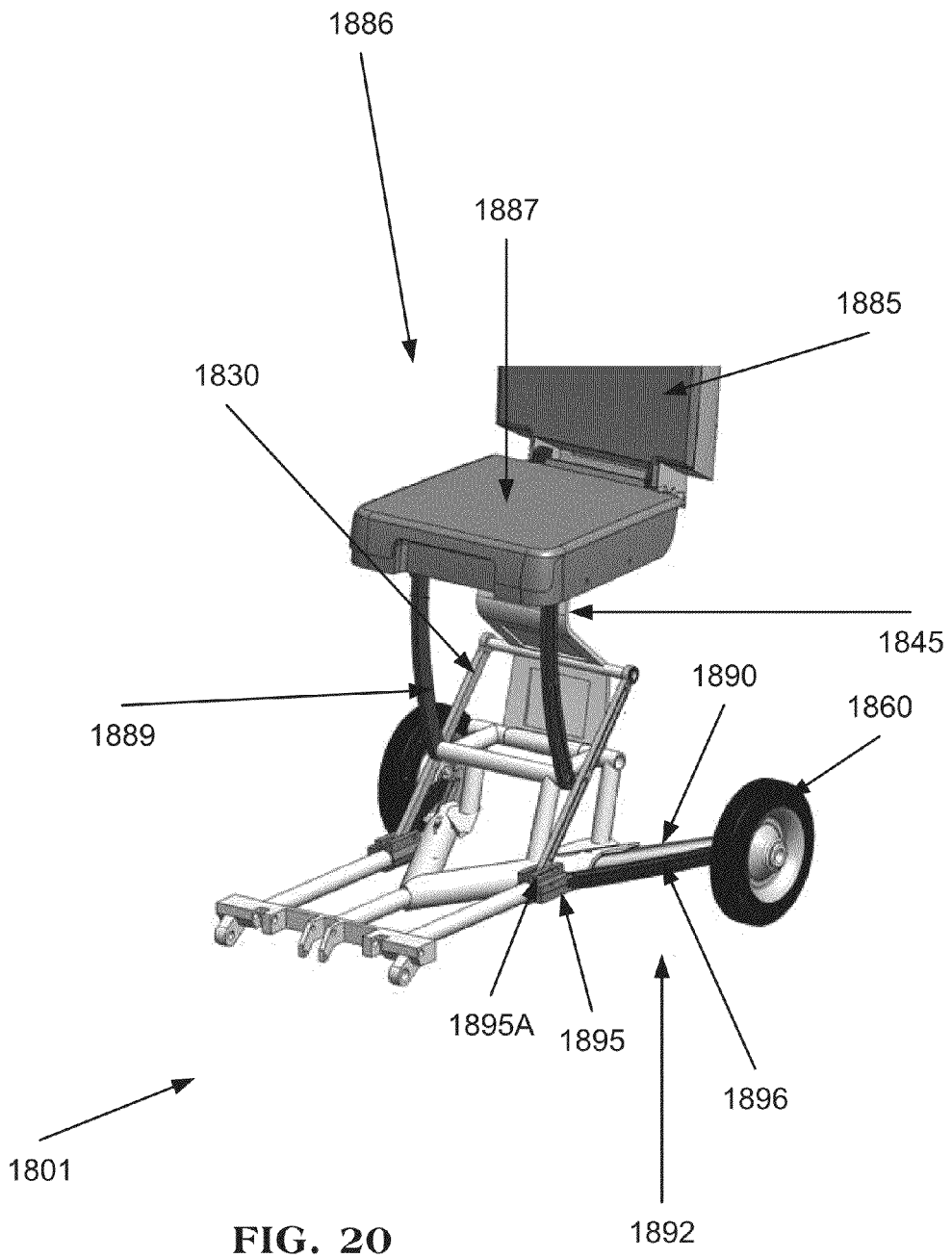
FIG. 20 is a back part of motorized vehicle with a tunneled actuator 1895 and a linear lever, according to some embodiments of the present invention.

Reference is also made to FIG. 20, which illustrates a back part of a motorized vehicle 1801 with a tunneled 1895A actuator 1895 and a linear lever 1830, according to some embodiments of the present invention. The seat 1886 has a base 1887 and a backrest 1885. An upper chassis 1845 is connected to the base 1887 by a system of bearings 1889. An essentially linear lever 1830 is connected to the upper chassis 1845 on one side and to the actuator 1895 on the other side. The actuator 1895 has a tunnel 1895A. The rear wheels 1860 connect to retraction links 1896. The rear wheels 1860, wheel arms 1890, retraction links 1896 and actuators 1895 move symmetrically on both sides of the lower chassis 1824. The folding movement and folding sequence of the motorized vehicle 1801 are as described in FIG. 18.

Figure 21:
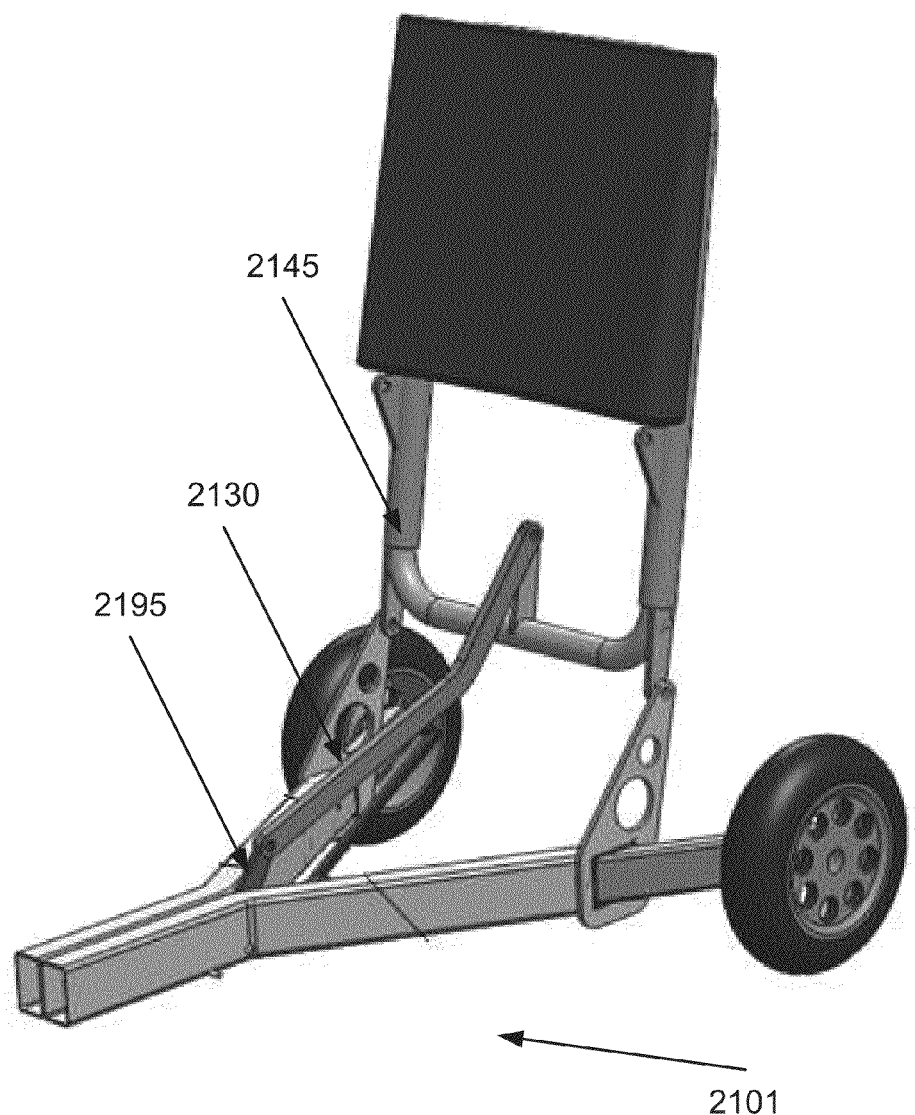
FIG. 21 is a back part of motorized vehicle having an angled lever, according to some embodiments of the present invention.

Reference is also made to FIG. 21, which illustrates a back part of motorized vehicle 2101 having an angled lever 2130, according to some embodiments of the present invention. The angled lever 2130 connects the upper chassis 2145 to the actuator 2195. The actuator 2195 may be V-shaped. The angle of the angled lever 2130 is between 100 degrees and 170 degrees.

Figure 22:
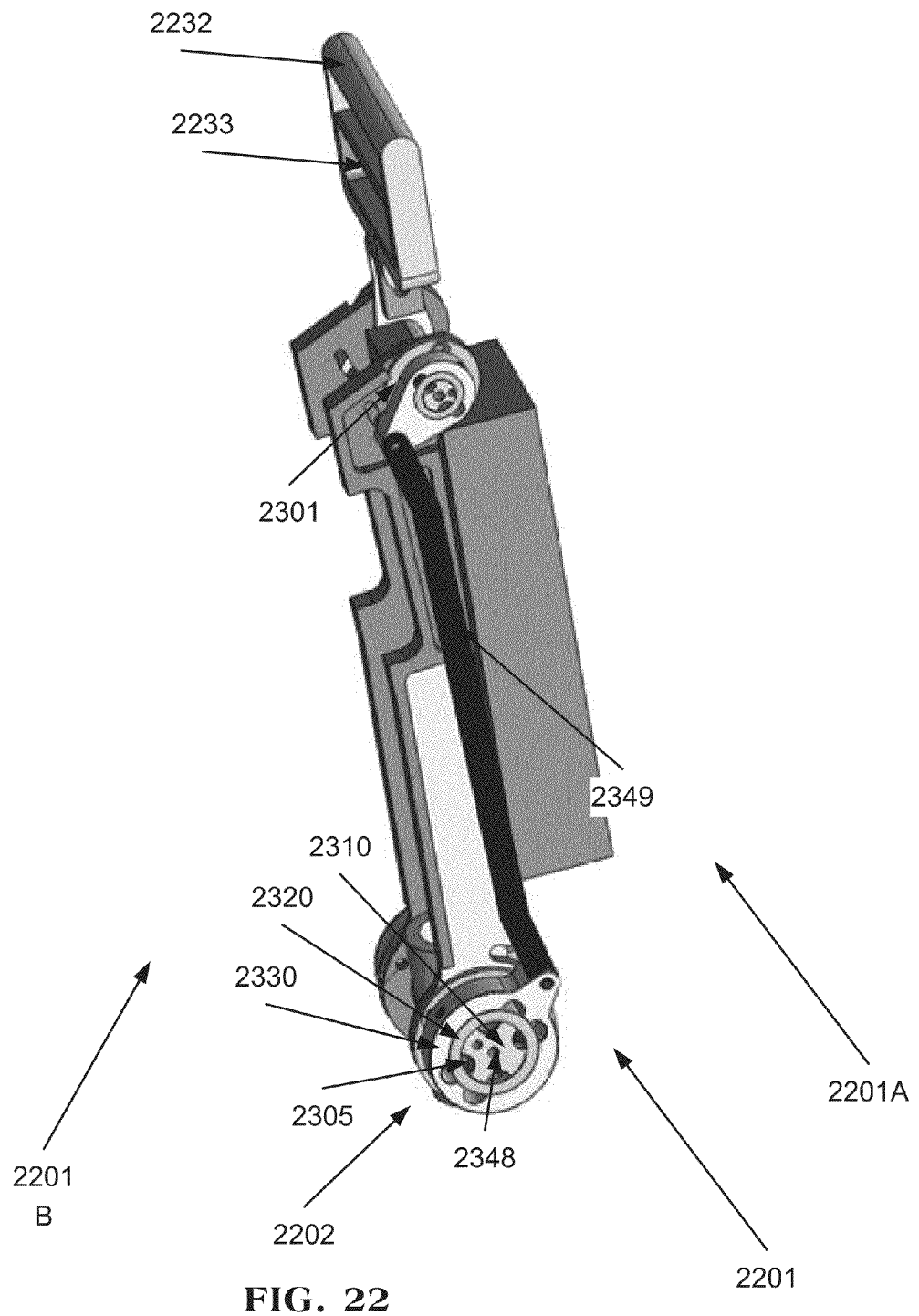
FIG. 22 is a central lock and release mechanism mounted on a motorized vehicle's lower chassis, according to some embodiments of the present invention.

Reference is also made to FIG. 22, which illustrates a central lock and release mechanism 2201 mounted on a motorized vehicle's lower chassis, according to some embodiments of the present invention. There are two locks: a steering rod lock 2202 and a lower chassis lock 2301. Each lock 2301, 2202 may be positioned on both right 2201A and left 2201B sides of the vehicle. The locks 2301, 2202 are connected by an angular rod 2349 which is a motion transferring element. The locks 2301, 2202 are mounted, in this example, on the lower chassis. The steering rod lock 2202 connects the steering rod to the front lower chassis. The lower chassis lock 2301 connects the front lower chassis to the rear lower chassis. The motorized vehicle is folded by lifting the handle 2232. The handle 2232 lifts the puller 2233 and the puller 2233 opens the lower chassis lock 2301. The lower chassis lock 2301 moves the angled rod 2349. The angled rod 2349 transfers the motion and opens the steering rod lock 2202. The angles of the rod 2349 may be designed to simultaneously open the two locks 2301, 2202. In this example the steering rod lock 2202 has two knobs 2305 and the lower chassis lock 2301 has one knob 2305. A higher number of knobs 2305 may contribute to the strength of the lock and its ability to maintain a configuration under physical pressure. Multiple knobs may restrict the freedom of movement for the concentric elements 2310, 2320 and/or 2330. Optionally, the number of knobs is half the number of apertures on a single concentric element 2310, 2320 and/or 2330. Optionally, the number ratio between knobs and recesses can be chosen to change the number of locking positions, the angles of locking positions and/or the freedom of movement the lock allows. The two locks 2301, 2202 are as described in FIG. 23. Optionally, rod's 2349 shape may serve to transfer motion from one lock to the other. For example the rod may be: a linear rod, a non-linear rod having at least one curve, a non-linear rod having a plurality of angles and a plurality of curves and/or a plurality of segments mechanically connected to one another. Each segment can be as described above. Optionally, the order of locks operated by the central lock and release mechanism 2201 may be reversed: the puller opens the steering rod lock 2202 first. The rod 2349 transfers the motion to the lower chassis lock 2301. The locks are simultaneously opened by the puller movement.

Figure 23:
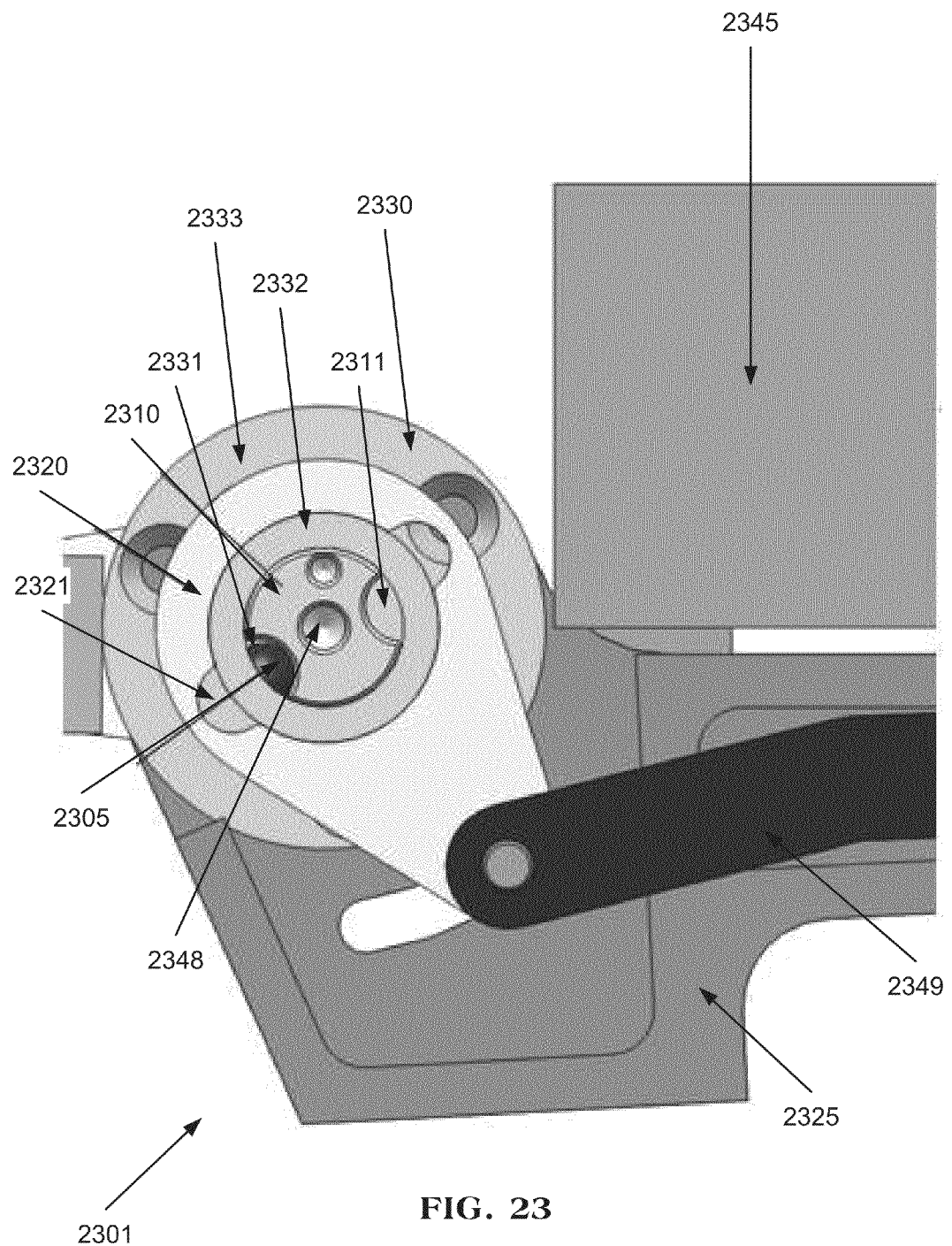
FIG. 23 is a lower chassis lock, according to some embodiments of the present invention.

Reference is also made to FIG. 23, which illustrates a lower chassis lock, according to some embodiments of the present invention. This lock 2301 may be also used to lock the steering rod. The lock mechanism is based on one or more knobs 2305 which transfer between apertures 2311, 2321, 2331 of at least three concentric elements: the fold axis 2310, the collar 2320 and the flange 2330. The collar 2320 scoops up one or more knobs 2305 from an aperture 2311, 2321 and/or 2331. When the collar 2320 moves the knob 2305 moves along with it until the knob 2305 is deposited at the another aperture 2311, 2321 and/or 2331. Optionally, at least one essentially flat surface of each of the three concentric elements 2310, 2320, 2330 may be on a shared plane. When the apertures 2311, 2321 and/or 2331 are aligned the knob can transfer easily from one element to the other and the parts statically attached to the fold axis 2310 and the flange 2330 can change position. The statically attached parts may be the front lower chassis 125 and the rear lower chassis 145. The aligned apertures 2311, 2321 and/or 2331 may allow the folding and/or unfolding of a motorized vehicle 101. When the apertures 2311, 2321, and 2331 are out of alignment the knob 2305 cannot move through aperture 2331, thereby locking the entire mechanism 2301 and the parts statically attached to them 2325, 2345. The collar 2320 may prevent the knob(s) 2305 from moving out of the fold axis 2310. The fold axis 2310 has a plurality of fold axis apertures 2311. The fold axis 2310 may be mounted on the lower chassis 2325. The mounting of the fold axis 2310 on the lower chassis 2325 may be fixed, thereby creating a single rigid body that moves as one unit. The fold axis 2310 may be mounted on said rear lower chassis 2345 and said flange 2330 may be mounted on said front lower chassis. Optionally, a flange 2330 has a flange disc 2333 and a flange sleeve 2332. The flange has a plurality of flange apertures 2331. The collar 2320 encircles the flange sleeve. The collar 2320 has a plurality of collar apertures 2321. One or more knobs 2305 occupy the apertures 2311, 2321, 2331. In this example a single knob 2305 occupies each aperture set: a fold axis aperture 2311a collar aperture 2321, and a flange aperture 2331. The top of the flange aperture 2331 is partially visible in this FIG. Optionally, some of the apertures 2311, 2321, 2331 are not occupied by a knob. The diameter of each knob 2305 is smaller than the diameter of each flange aperture 2331. The fold axis 2310 and collar 2320 may rotate around a common axis 2348. When the collar apertures 2321 align with the fold axis apertures 2311 and the flange apertures 2331, the knob 2305 moves from fold axis apertures 2311 to the collar apertures 2321. The rotation of the collar 2320 may be transferred to another lock mechanism such as 2202. The movement may be transferred by an angled non-linear rod 2349. Optionally, the rod may be a linear rod, a non-linear rod with a single and/or multiple curves, and/or non-linear rod with a combination of angles and curves. The angular rod 2349 may be connected to the fold axis 2310 and/or to the collar 2320. Optionally, the locations of the fold axis 2310 and the collar 2320 are switched, for example, the collar 2320 is essentially centrally located with respect to the flange sleeve 2332 and the flange sleeve 2332 essentially encircles the collar 2320. Optionally, additional essentially concentric elements other than the fold axis 2310, the collar 2320 and the flange 2330 comprise the lower chassis lock. Optionally, the knob harboring parts, for example the fold axis 2310, the collar 2320 and/or the flange 2330 may be arranged in a non concentric fashion. An example of such an arrangement is a fold axis 2310, a collar 2320 and a flange 2330 which have essentially the same diameter and are positioned behind one another and the apertures of the fold axis and the flange are in different positions. Optionally, a cover is mounted on the lower chassis lock 2301. The cover may hold the collar in its position. The cover may protect the lock 2301 against dust, dirt and other mechanism blockers.

Figures 24A, 24B, 24C:
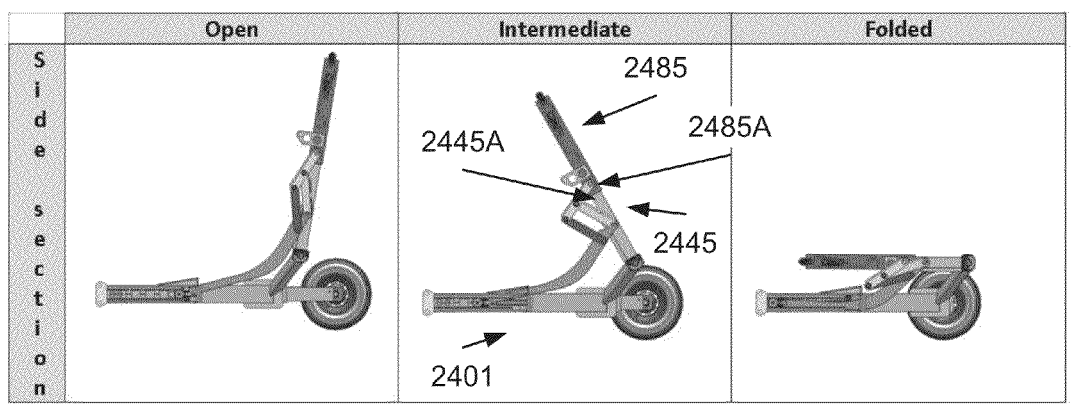
FIGS. 24A-24C are the folding process of a rear part of a motorized vehicle having a channeled backrest which glides over an upper chassis road, according to some embodiments of the present invention.

Reference is also made to FIGS. 24A-24C, which images illustrating the folding process of a rear part of a motorized vehicle 2401 having a channeled 2485A backrest 2485 which glides over an upper chassis road 2445A, according to some embodiments of the present invention. The motorized vehicle 2401 and the manner of its folding is as described in FIG. 25. FIG. 24A illustrates a sitting configuration of the motorized vehicle 2401. FIG. 24B illustrated an intermediate configuration of the motorized vehicle 2401 upon folding. The backrest 2485 glides partially over the upper chassis 2445. FIG. 24C illustrates a folded configuration. The backrest 2485 covers the major part of the upper chassis 2445.

Figure 25:
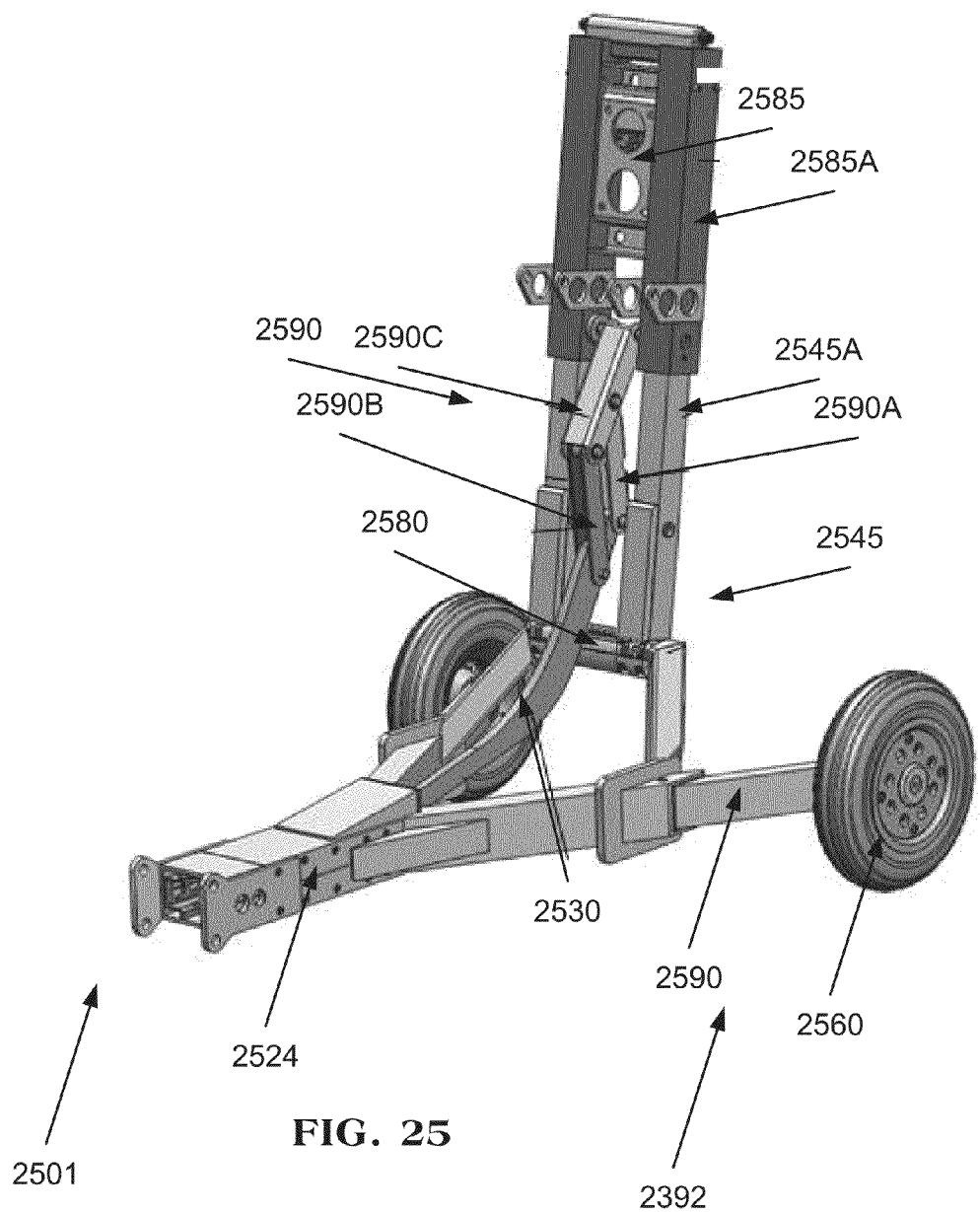
FIG. 25 is the rear part of a motorized vehicle having a channeled backrest which glides over an upper chassis road, according to some embodiments of the present invention.

Reference is also made to FIG. 25, which illustrates the rear part of a motorized vehicle 2501 having a channeled 2585A backrest 2585 which glides over an upper chassis road 2545A, according to some embodiments of the present invention. The backrest 2585 and the upper chassis 2545 are pushed forward around the seat bearing 2580. The movement of the upper chassis 2545 causes the lever 2530 to move forward and moves the back rest 2585. The backrest 2585 is pulled by the arm and hinges system 2590 and the lever 2530 toward the upper chassis 2545 and over the upper chassis 2545. The movement of the backrest channels over the encircled upper chassis roads 2585A. When the upper chassis 2545 and the backrest 2585 are pushed forward around the seat bearing 2580, the lever 2530 moves forward and pivot about the rear link 2590A. The front link 2590B moves up in relation to the rear link 2590A, pivoting the top link 2590C around the top link-rear link 2590A axis. The motion pulls the backrest 2585 towards the upper chassis 2545 and is completed when the backrest 2585 and the upper chassis 2545 are parallel to the lower chassis 2524. The motorized vehicle 2501 also has a wheel retraction apparatus 2392. The movement of the lever 2530 which induces the gliding of the backrest 2585 over the upper chassis 2545 also pulls the retraction links 2596 which pull the wheel arms 2590. The wheels arms 2590 retract the rear wheels 2560 bringing them closer to the lower chassis 2524.

Figure 26:
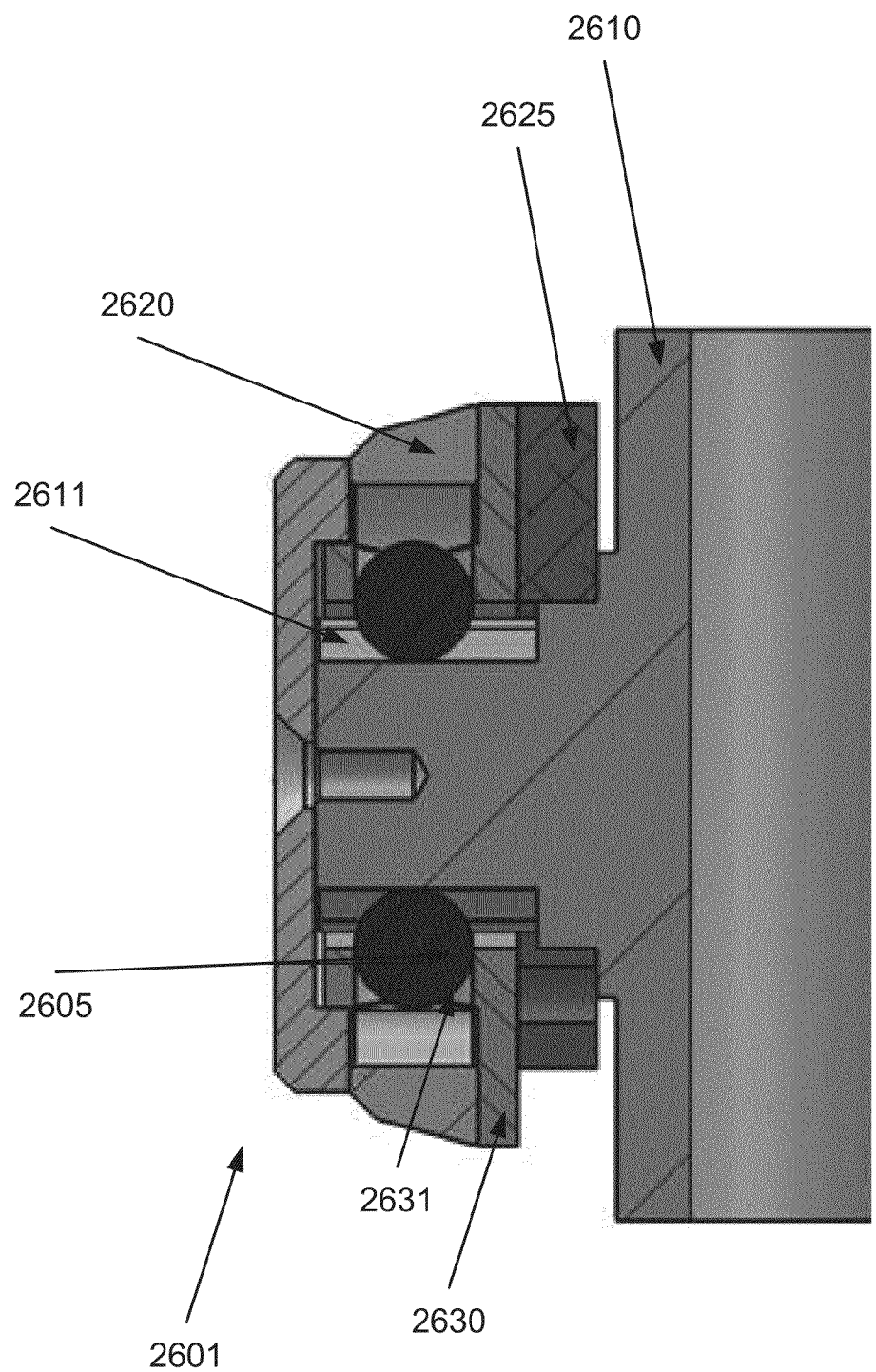
FIG. 26 is a section of half a lower chassis lock with aligned apertures, according to some embodiments of the present invention.

FIG. 26 is a section of half a steering rod lock 2202 with aligned apertures, according to some embodiments of the present invention. The lock is as depicted in FIG. 23. Here, the lock is applied to the steering rod instead of the lower chassis. The aligned apertures create an open lock configuration which allows the static parts, front lower chassis and steering rod, connected to the lock 2601 to change their position toward one another. The lock is comprised of a fold axis 2610, a collar 2620 and a flange 2630. The lock 2601 has two knobs 2605 which occupy the flange apertures 2631, fold axis apertures 2611 and/or the collar apertures. The apertures 2611, 2631 are aligned, enabling the knobs 2605 to pass between the fold axis 2611 and the collar aperture through the flange aperture 2631.

Figure 27:
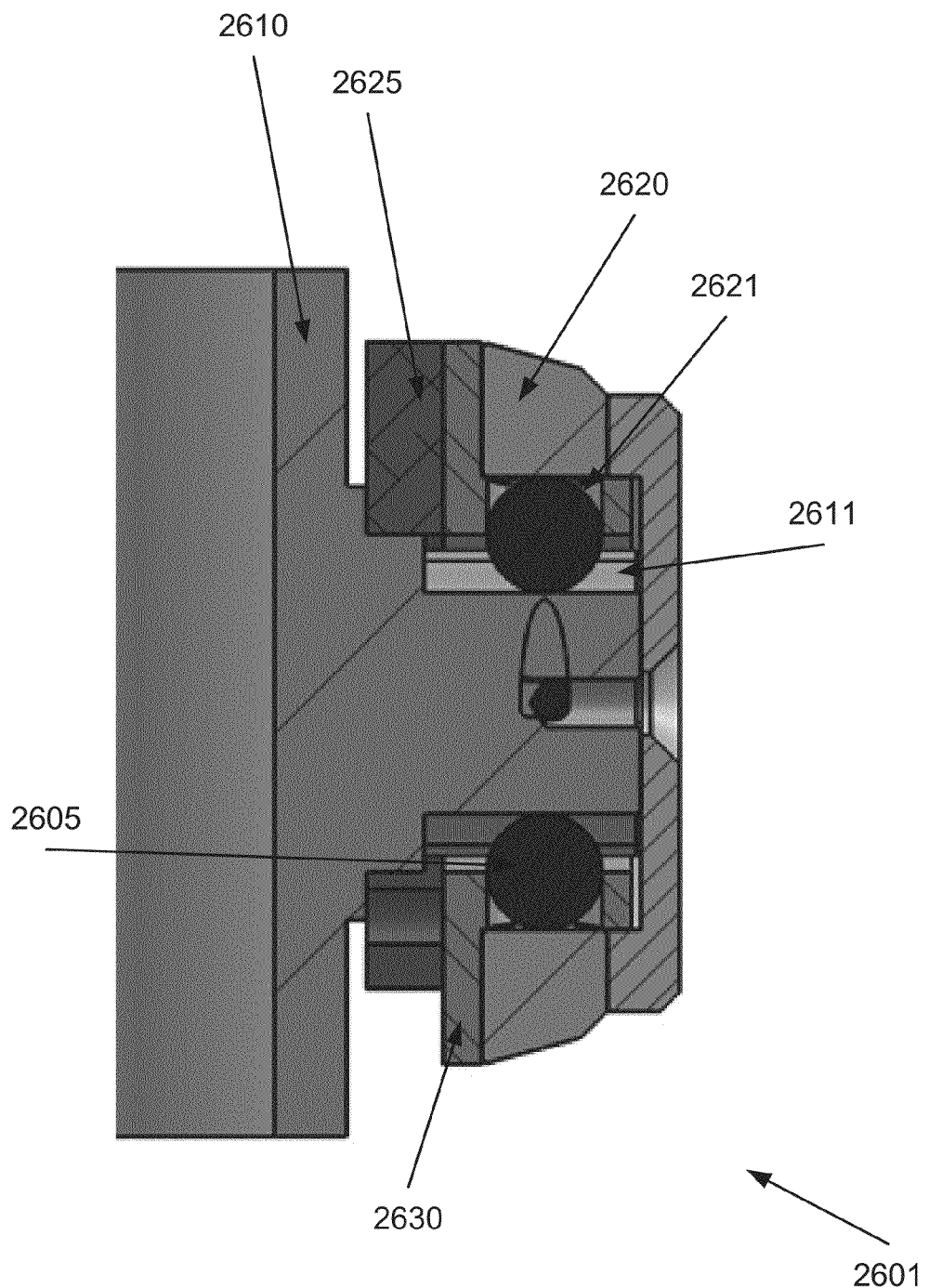
FIG. 27 is a section of half a lower chassis lock with unaligned apertures, according to some embodiments of the present invention.

FIG. 27 is a section of half a lower chassis lock with unaligned apertures, according to some embodiments of the present invention. The lock 2601 is as depicted in FIG. 26 with the fold axis apertures 2611 and the collar apertures in an unaligned position which prevent the knob from moving through the flange aperture 2631.

Figure 28:
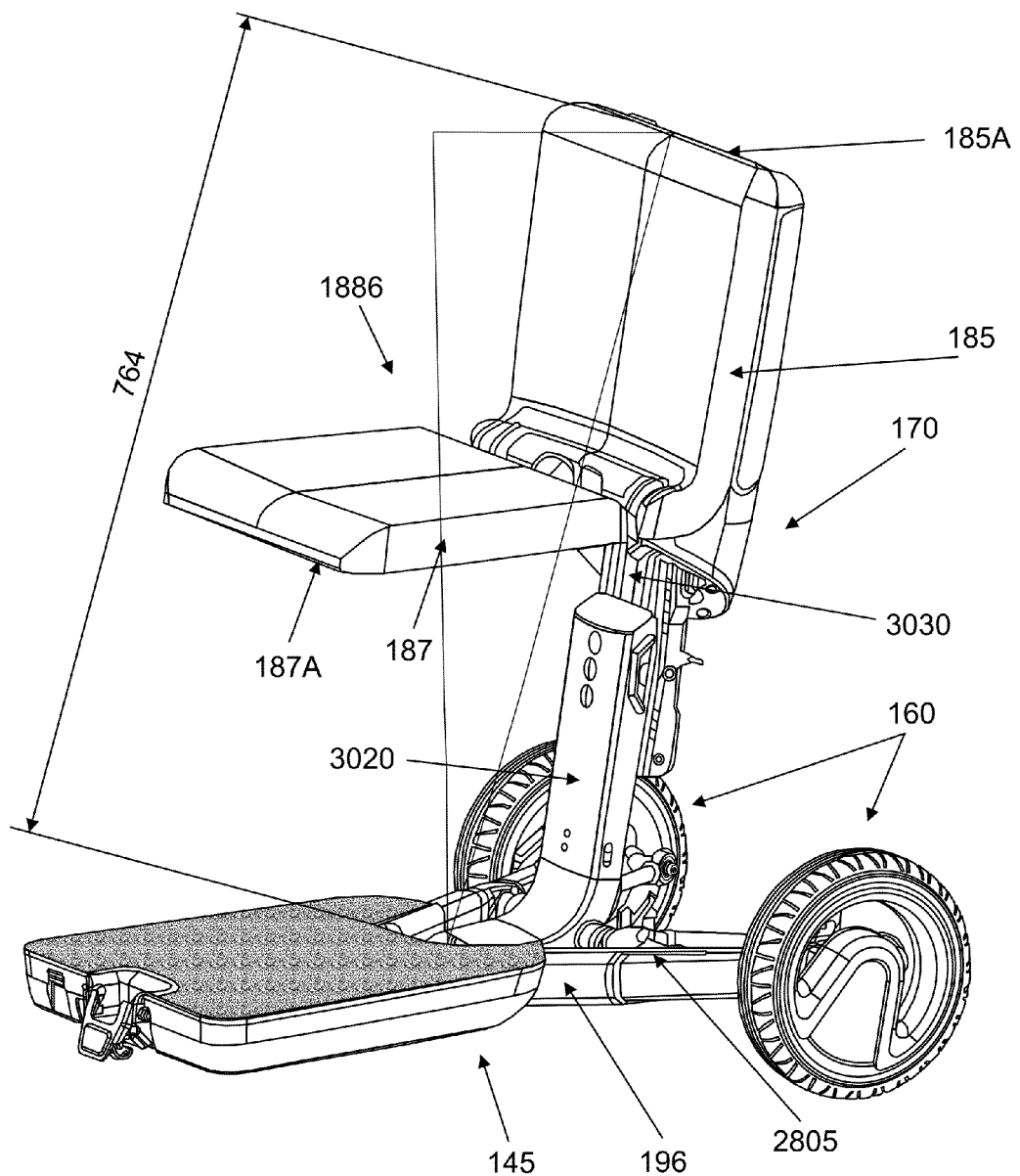
FIG. 28 is an illustration of a seat folding apparatus prior to shortening of a distance between a seat and a chassis connection, according to some embodiments of the present invention.
Figure 29:
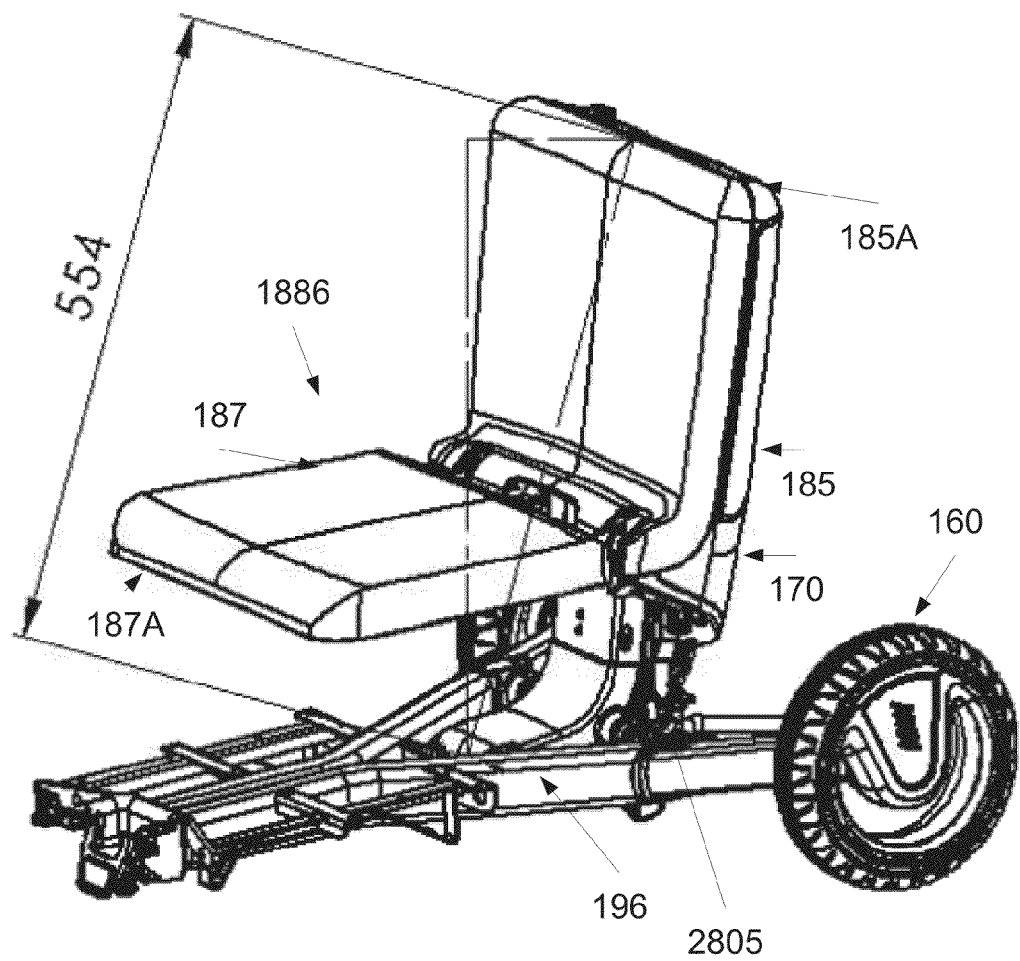
FIG. 29 is an illustration of a seat folding apparatus after shortening of a distance between a seat and a chassis connection, according to some embodiments of the present invention.

Reference is also made to FIGS. 28-32. FIG. 28 is an image illustrating an operational configuration of the rear part of the motorized vehicle 101 having a mechanical seat folding arrangement 2805, according to some embodiments of the present invention. The motorized vehicle 101 is as presented in FIGS. 1-22 and 24-25. The mechanical seat folding arrangement 2805 moves the seat 1886 along the lower chassis 145. The movement of the seat 1886 along the lower chassis 145 may be retracting the seat 1886 towards the rear wheels client management module 160 and/or advancing the seat 1886 towards the front wheel 120. Optionally, the mechanical seat folding arrangement 2805 also shortens the distance between the seat 1886 and the chassis connection 3110 as illustrated in FIG. 29. Optionally, shortening the distance between the seat 1886 and the chassis connection 3110, as illustrated in FIG. 29, is performed independently of the mechanical seat folding arrangement's 2805 operation. The chassis connection 3110 connects the upper chassis to the lower chassis 145. As a result of one or more of the mechanical seat folding arrangement's 2805 operations the back rest 185 is positioned in proximity to other elements 187, 145. The back rest 185, seat base 187 and rear lower chassis 145 are proximate to each other and/or the back rest 185 and seat base 187 are proximal to each other. The mechanical seat folding arrangement's 2805 operations, folding, shortening and/or moving, may be performed in a single motion. The combined motion of shortening the distance to the chassis connection 3110 and moving the seat 1886 aligns a back rest lateral front 185A with the seat base lateral front 187A, thereby creating a boxed shape of the motorized vehicle in a folded configuration. The boxed shape may have large planar surfaces and/or be free of extrusions and recesses. The boxed shaped may resemble a carried suitcase. The motion of the back rest lateral front 185A during the combined motion creates a modified arched path 3210 illustrated in FIG. 32.

Figure 32:
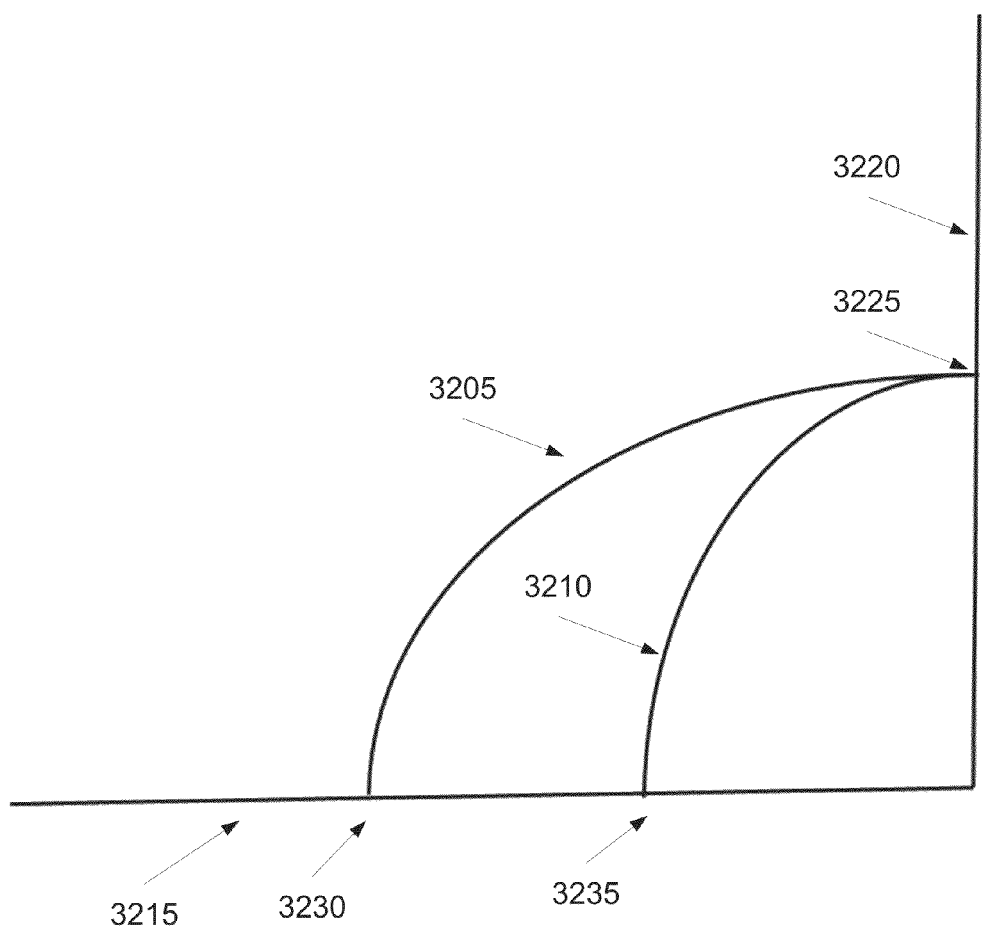
FIG. 32 is a graph illustrating a modified and an unmodified arched path of a lateral front of said seat back rest, according to some embodiments of the present invention.

FIG. 32 illustrates two paths 3205 and 3210 of a back rest lateral front 185A. In FIG. 32 two axes are shown: axis 3220 essentially parallel to the upper chassis 170 in an operational configuration and axis 3215 essentially parallel to the rear lower chassis 145 in an operational configuration. The paths 3205 and 3210 illustrate the movement of the back rest lateral front 185A from a position in an operational configuration 3225 to a position in the folded configuration 3230 and/or 3235. The path creates a curve between an axis 3220 essentially parallel to the upper chassis 170 in an operational configuration and an axis 3215 essentially parallel to the rear lower chassis 145. Without retracting the back rest lateral front 185A the path ends at a location 3230 according to the dimensions of the upper chassis 170, the back rest 185 and connection means between the seat 1886 and the upper chassis 170. The path generated by such a location 3230 is an unmodified arched path 3205. Optionally, the unmodified arched path 3205 is a perfect radial. Upon retraction of the back rest lateral front 185A the path 3205 is modified. The location 3230 of the back rest lateral front 185A in a folded configuration of the motorized vehicle, when the back rest 185 is retracted is more proximate to the rear wheels compared to the location 3235 of the back rest lateral front 185A in a folded configuration of the motorized vehicle, without back rest 185 retraction. The retraction of the back rest 187 brings the back rest lateral front 185A closer to the rear wheels 160 along the rear lower chassis 145. The back rest 185 retraction created a modified arched path 3210 ending 3235 at a shorter distance from the upper chassis 170 and/or the rear wheels 160 compared to the unmodified path 3205. Optionally, the upper chassis 170 comprises two beams: a rotating beam 3120 and a linear beam 3130. The linear beam 3130 is connected to the seat 1886. The rotating beam 3120 is connected to the lower chassis 145 through the chassis connection 3110. The rotating beam 3120 rotates around the chassis connection 3110. The linear beam 3130 may slide along the rotating beam 3120 for performing seat 1886 shortening as described above. Sliding may occur using tracks. The joint movement of the two beams 3120, 3130 creates the arch movement as illustrated in FIG. 32.

Figure 30:
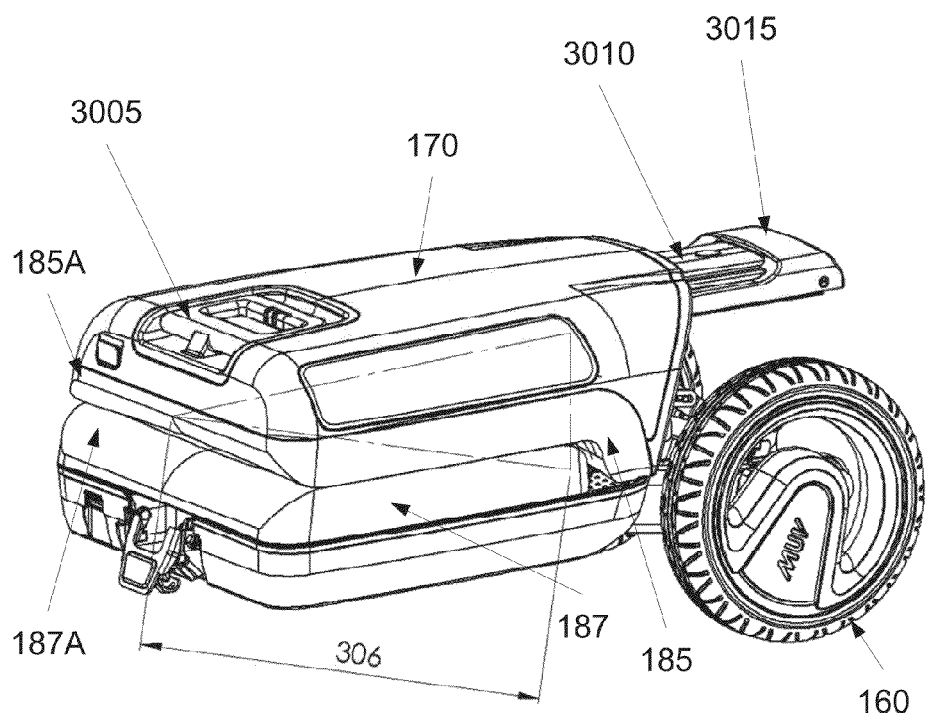
FIG. 30 is an illustration of a seat folding apparatus at the end of a shifting process, according to some embodiments of the present invention.
Figure 31:
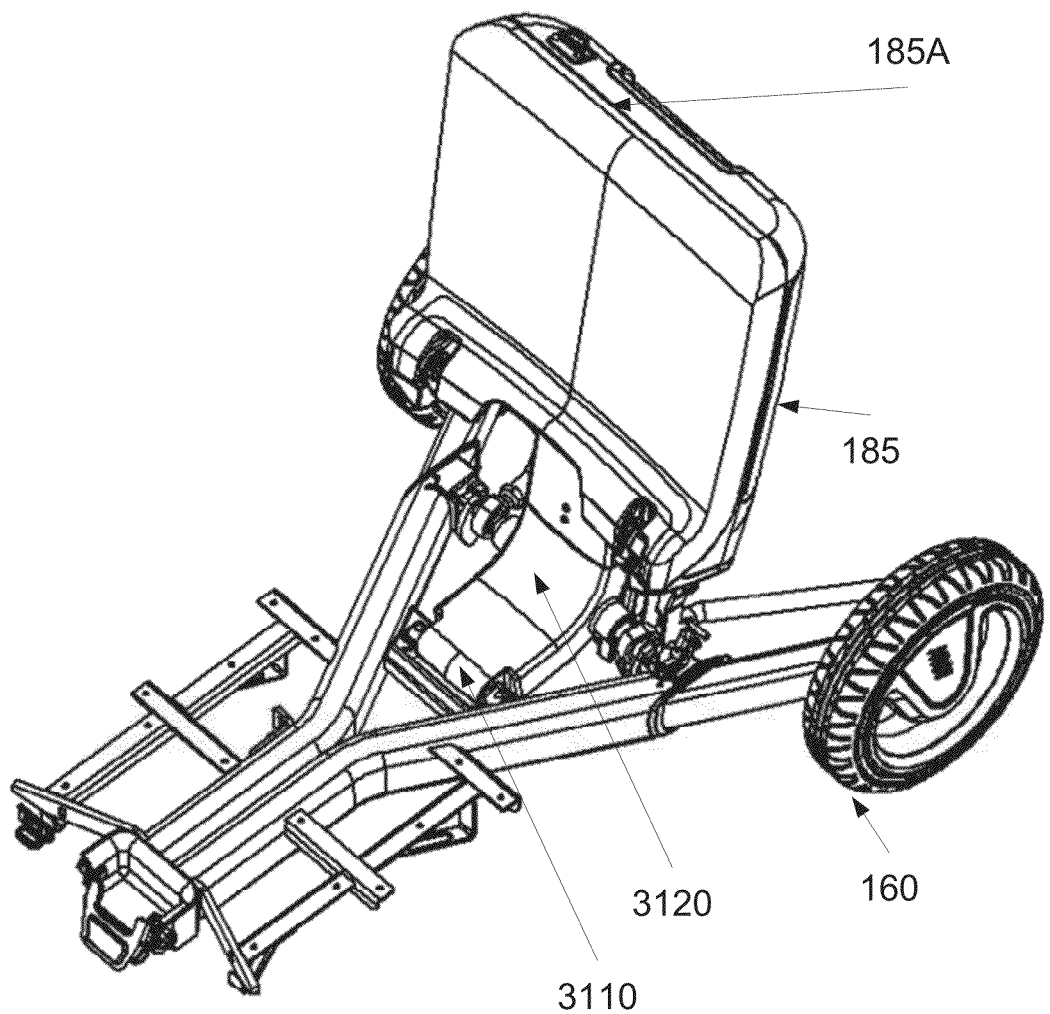
FIG. 31 is a top view of a rotating beam in a seat folding apparatus, according to some embodiments of the present invention.

The motion created by the mechanical seat folding arrangement 2805 decreases at least one dimension of the folded configuration, rendering the folded configuration more compact for carrying, storage and/or handling. The distance between the back rest lateral front 185A and the rear lower chassis 145 in an operational configuration is bigger than the same distance in a folded configuration. For example, the distance changes from 764 centimeters in the operational configuration to 306 centimeters (as illustrated by FIG. 28 and FIG. 30 respectively. FIG. 30 illustrates a folded configuration of the rear part of the motorized vehicle 101 having a mechanical seat folding arrangement 2805, according to some embodiments of the present invention. The motorized vehicle 101 is as presented in FIG. 28. The folded configuration is achieved after the mechanical seat folding arrangement 2805 shifts the seat 1886 by both folding the seat 1886 and retracting the seat 1886. The backrest 185 retracts until the back rest lateral front 185A aligns with the seat base lateral front 187A. Optionally, the back rest lateral front 185A and the seat base lateral front 187A form a single plane. Optionally, the back rest lateral front 185A is distant between about 1 and about 10 centimeters from the seat base lateral front 187A. Optionally, the back rest lateral front 185A is distant between about 5 and about 15 centimeters from the seat base lateral front 187A.

According to some embodiments of the present invention, a user pulls a seat folding trigger 3005 located in the backrest 185 and/or presses the release button 1686. The seat folding trigger presses a seat locking rod (not shown), positioned in an upper beam of the upper chassis 170, downwards towards the rear wheels 160. The seat locking rod pushes a rail knob (not shown) positioned in the upper beam, out of a rail lock socket (not shown) in a lower beam 3010 of the upper chassis 170. Once the rail lock socket is unoccupied the upper beam is free to move on top of the lower beam using rail(s). The upper chassis 170 is lowered towards the rear lower chassis 145 thereby lowering the entire seat 1866 (backrest 185 and seat base 187). Optionally, the seat 1886 moves along a bearing track 5.2 05. The bearing track may be positioned along the elongated dimension of the upper chassis 170. The lowering movement ends with the upper chassis extrusion 3015 close to the plane supporting the wheels 120, 160, for example, ground, a pavement, a floor etc.

After lowering the seat 1886, a user folds the seat 1886 while folding the lower chassis 124. The user pulls the handle 732 thereby releasing a lock between the chassis 129 and the rear lower chassis 145. A mechanical seat folding arrangement 2805 translates the folding movement created by the user folding the motorized vehicle 101 into a motion of folding the seat 1886 along a modified arched path 3210. This motion combines an arched folding movement of the seat 1886 with a lateral movement of the seat 1886 and the upper chassis 170 toward the rear wheels 160. At the end of this combined motion the seat rest 185, seat base 187 and the upper chassis 170 are aligned. Optionally, the seat base 187 is folded towards the backrest 185 prior to lowering the seat 1886.

Figure 33:
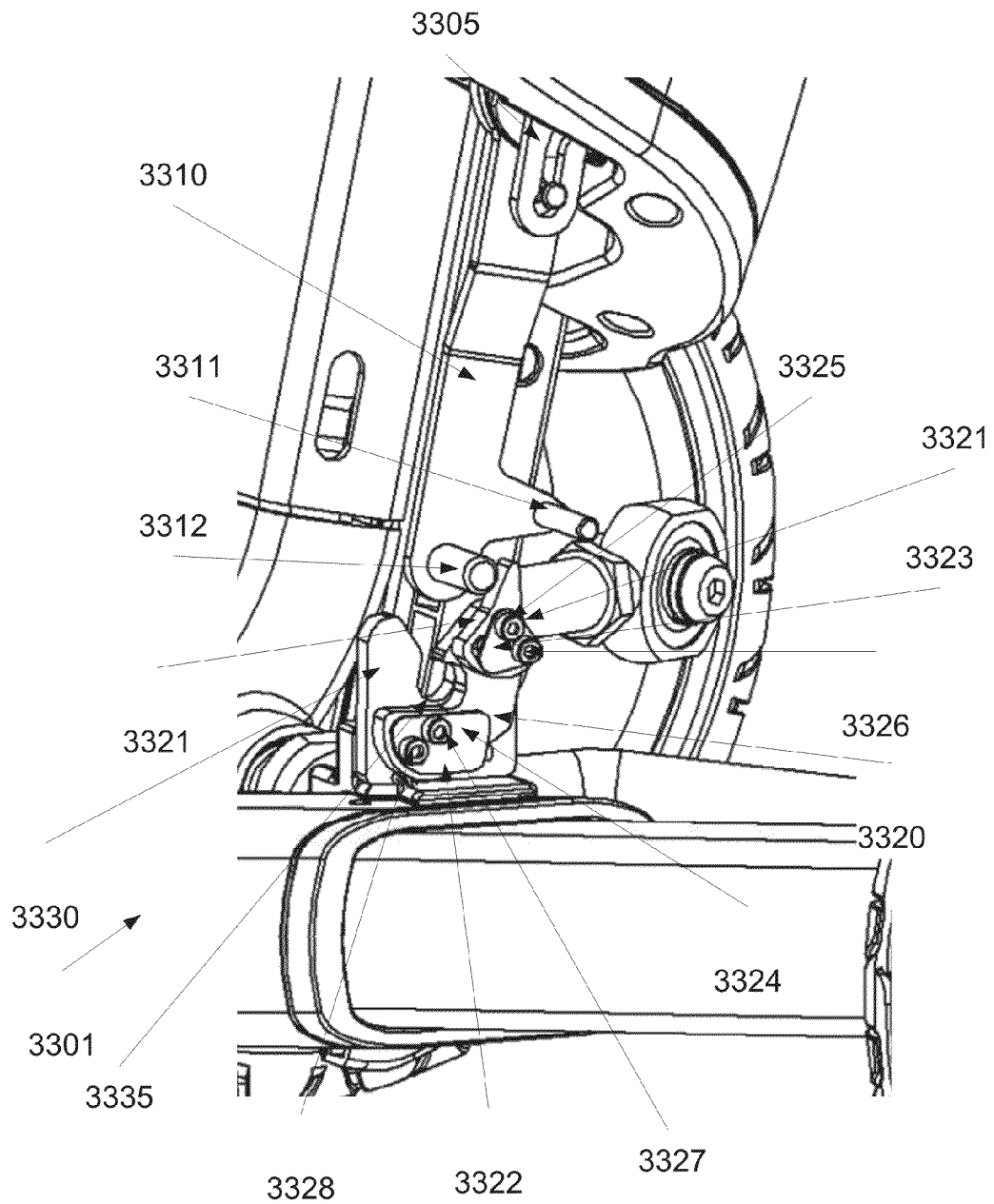
FIG. 33 is an illustration of a latching arrangement before the latching arm is caught by the catching arm, according to some embodiments of the present invention.
Figure 34:
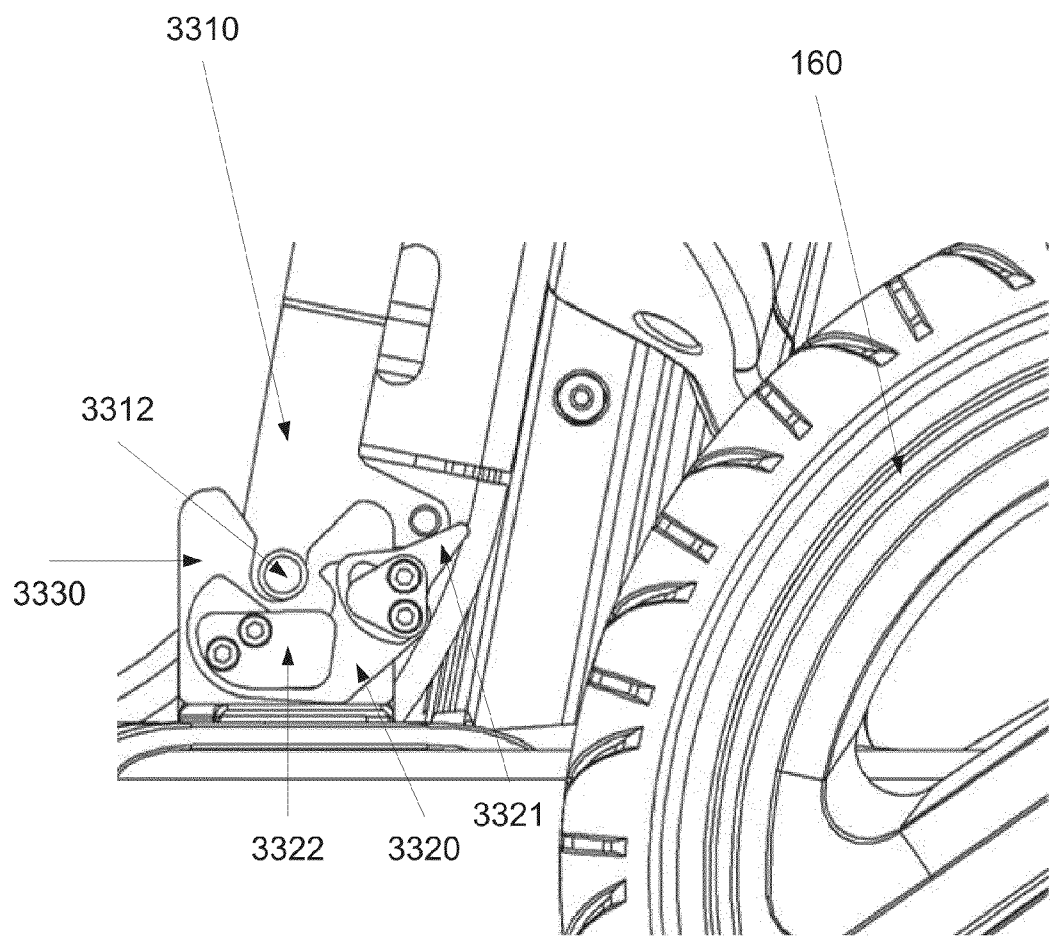
FIG. 34 is an illustration of a latching arrangement after the latching arm is caught by the catching arm, according to some embodiments of the present invention.
Figure 35:
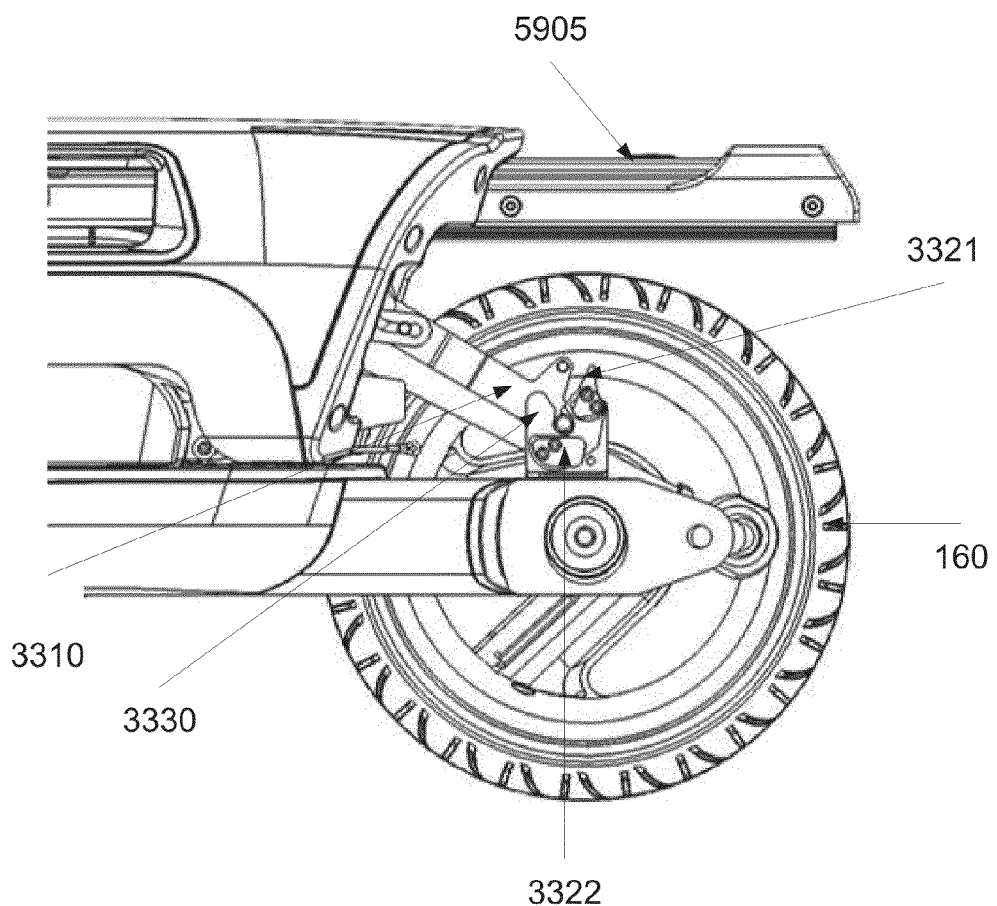
FIG. 35 is an illustration of a latching arrangement with a latching arm moving bolt in a frontal position with respect to the catching arm, according to some embodiments of the present invention.
Figure 36:
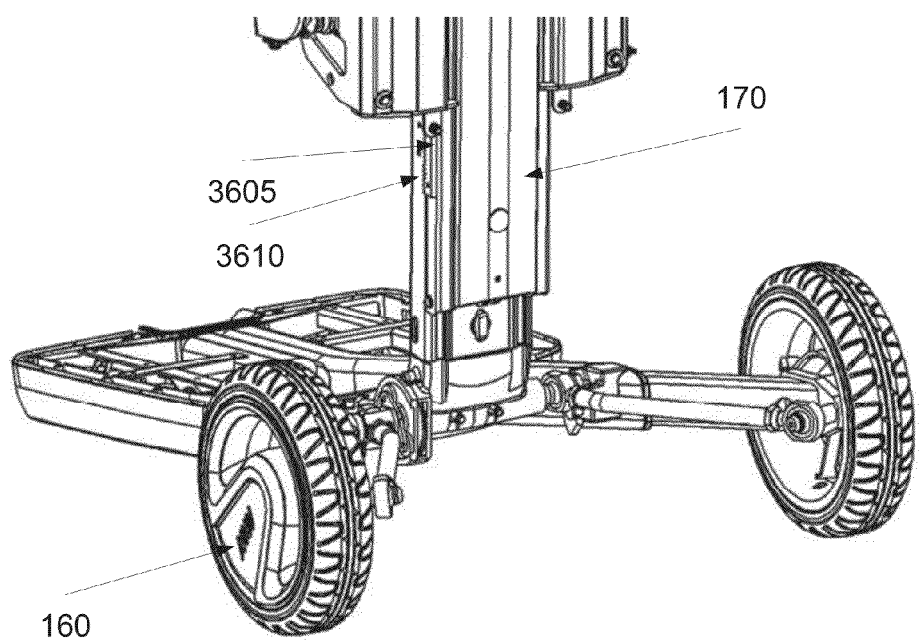
FIG. 36 is an illustration of bearing tracks in a seat folding apparatus of a motorized vehicle in an upright position prior to shortening, according to some embodiments of the present invention.

Reference is also made to FIGS. 33-35. FIG. 33 is an image illustrating a latching arrangement, according to some embodiments of the present invention. The mechanical seat folding arrangement 2805 which translates the folding movement of the seat into a modified arched path 3210 may be a latching arrangement 3301. The latching arrangement 3301 allows catching the upper chassis 170 and/or seat 1886 in a lowered position while performing the seat 1886 retraction. The latching arrangement comprises a latching arm 3310, a latching receiver 3330 and a catching arm 3320. The latching arm 3310 is connected by a latching arm hinge 3305 to the seat base 187. The latching arm 3320 has two bolts: a latching arm moving bolt 3311 and a latching arm caught bolt 3312. When the seat 1886 is lowered the latching arm caught bolt 3312 pushes against the catching arm front side 3321. The catching arm 3320 moves around a catching arm lower hinge bolt 3327, and the catching arm 3310 moves away from the latching socket 3335 of the latching arm receiver 3330. The movement of the catching arm 3320 is limited by a catching arm lower limiter bolt 3328. The latching arm caught bolt 3312 is latched by the latching socket 3335. Then, there is no pressure applied to the catching arm 3320 by the latching arm caught bolt 3312, and the catching arm 3320 moves back to its upright original position, thereby securing the latching arm caught bolt 3312 in the latching socket 3335. When the seat 1886 retraction motion starts the latching arm catch bolt 3312 presses on the catching arm 3320. The catching arm 3320 tilts forward, as a result of pushing by the latching arm moving bolt 3311, along the latching arm. The forward tilt of the catching arm 3320 occurs around a catching arm upper hinge bolt 3325. The latching arm 3310 moves from the rear side of catching arm 3322 to the front side of the catching arm 3321, thereby passing the catching arm 3320 as illustrated in, as illustrated in FIG. 35. Once the latching arm 3310 passes the catching arm 3320, the catching arm 3320 moves back to its upright position by a spring (not shown).

Upon seat 1866 unfolding, the latching arm 3320 moves towards the catching arm 3310. The latching arm catch bolt 3312 pushes against the catching arm upper section 3323. A catching arm upper section 3323 moves a catching arm lower section 3324 by a set of connecting hinges 3325-3328. The catching arm lower section 3324 moves away from the latching socket, thereby releasing the latching arm caught bolt 3312. The latching arm 3310 is free to move out of the latching socket 3335 and the seat 1886 may be lifted upwards for unfolding into an operational configuration.

Figure 37:
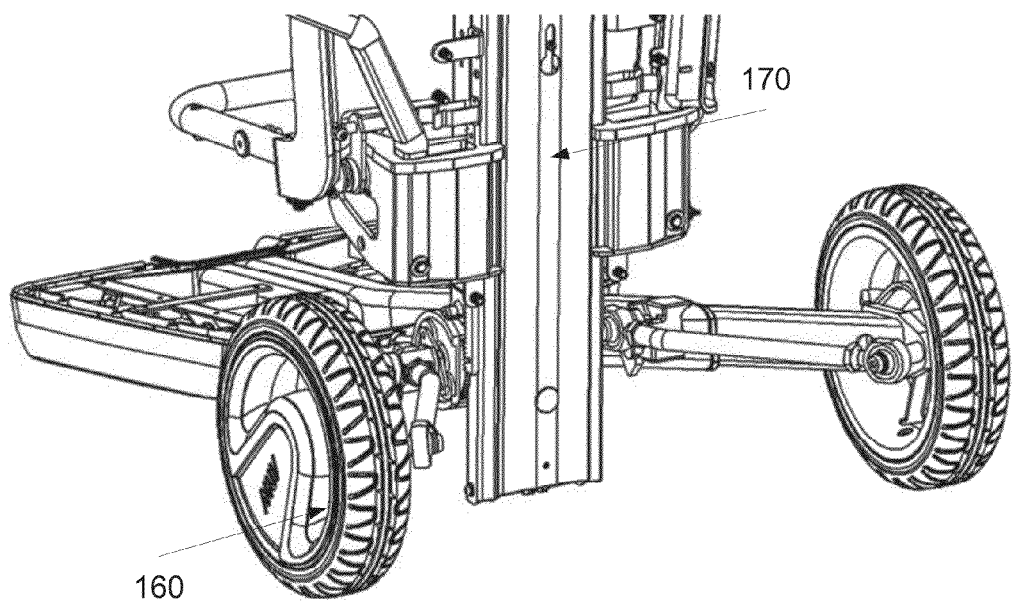
FIG. 37 is an illustration of bearing tracks in a seat folding apparatus of a motorized vehicle in an upright position after shortening, according to some embodiments of the present invention.
Figure 38:
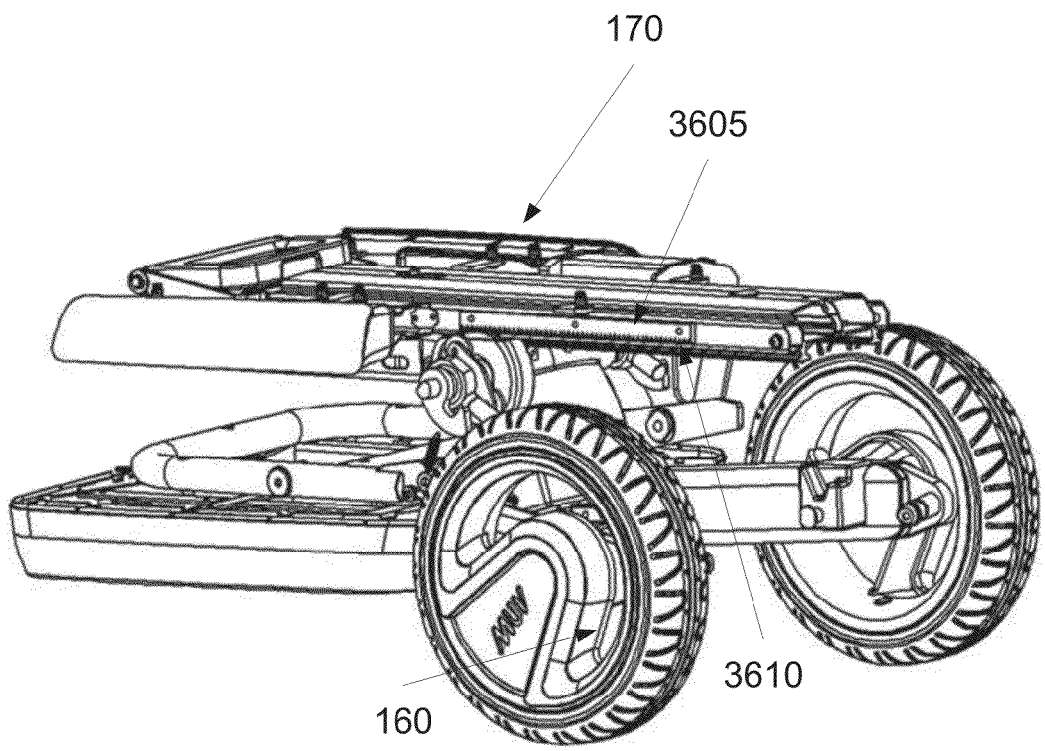
FIG. 38 is an illustration of a retraction track with cogs and a cogwheel in a seat folding apparatus of a motorized vehicle in a folded configuration, according to some embodiments of the present invention.
Figure 39:
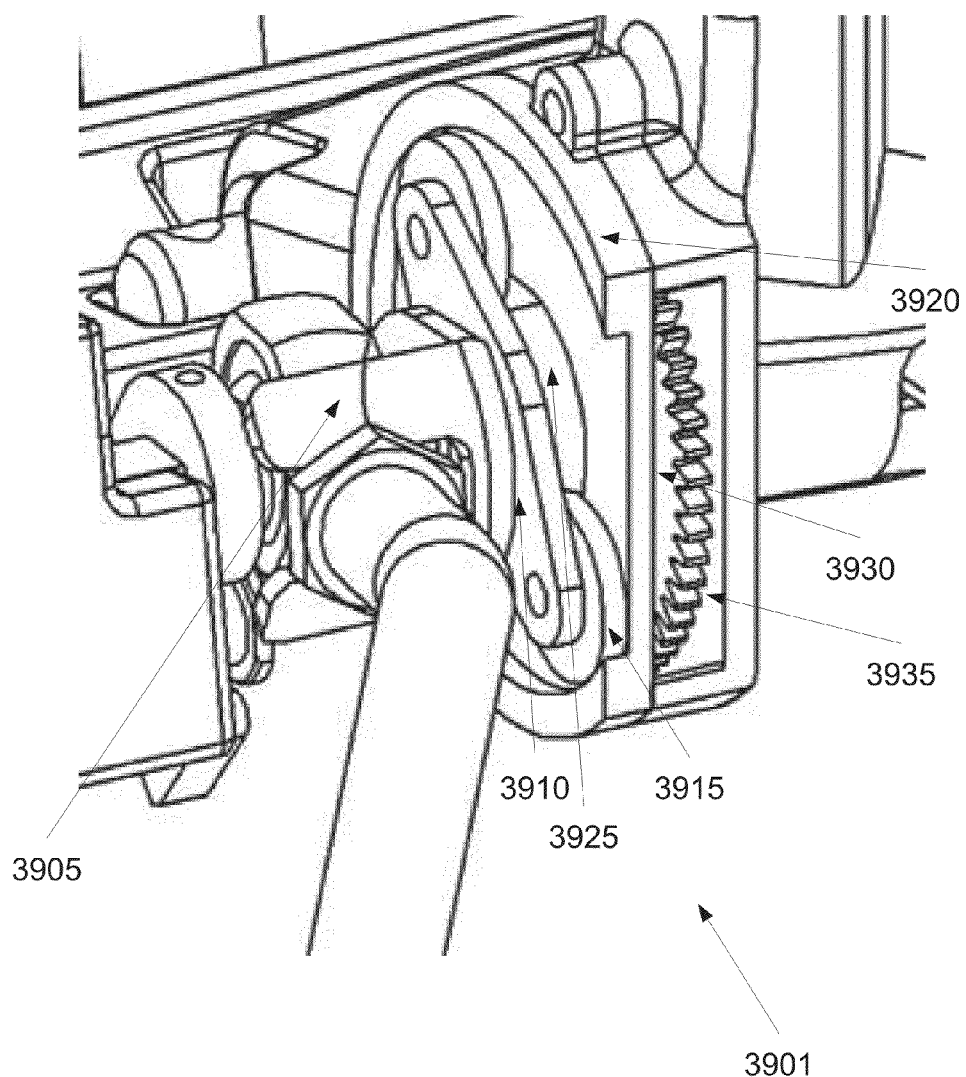
FIG. 39 is an illustration of a planetary gear in a motorized vehicle, according to some embodiments of the present invention.

Reference is also made to FIGS. 36-39. FIGS. 36-39 illustrate a planetary gear 3901 shifting a seat 1886 of a motorized vehicle 101, according to some embodiments of the present invention. The motorized vehicle 101 and the mechanical seat folding arrangement 3901 are depicted in three states:
1. in an operational configuration prior to seat 1886 lowering and seat 1886 retraction (FIG. 36)
2. in an intermediate configuration between an operational configuration and a folded configuration after lowering seat 1886 (FIG. 37)
3. in a folded configuration after seat 1886 retraction (FIG. 37)

The planetary gear 3901 is mounted on the rear lower chassis 145. Before the seat is lowered the planetary gear 3901 is not engaged with a retraction track 3605. Once the seat 1886 is lowered the retraction track 3605 is positioned adjacent to the planetary gear 3901. The seat lowering is as described in FIGS. 28-32. Then, the retraction track 3605 engages with the planetary gear 3901. Optionally, the engagement is performed by meshing of the retraction track cogs 3610 with driver gear cogs 3935. Upon the seat 1886 shifting along a modified curved path, the angle between the seat base 187 and the wheel retraction arm changes, thereby changing the angle of the angle fixer 3905. The angle fixer 3905 then rotates the satellite carrier 3910. The satellite carrier 3910 rotates the satellites 3915, which in turn rotate the sun gear 3925. The sun gear 3925 rotates the driver gear 3930. The driver gear 3930 then engages the retraction track cogs 3610 and pulls the retraction track 3605. For example, an angle fixer 3905 rotating 100 degrees, rotates the driver gear about 400 degrees and creates a linear retraction motion of the seat 1886 and/or the upper chassis 170 of about 450 centimeters.

Figure 40:
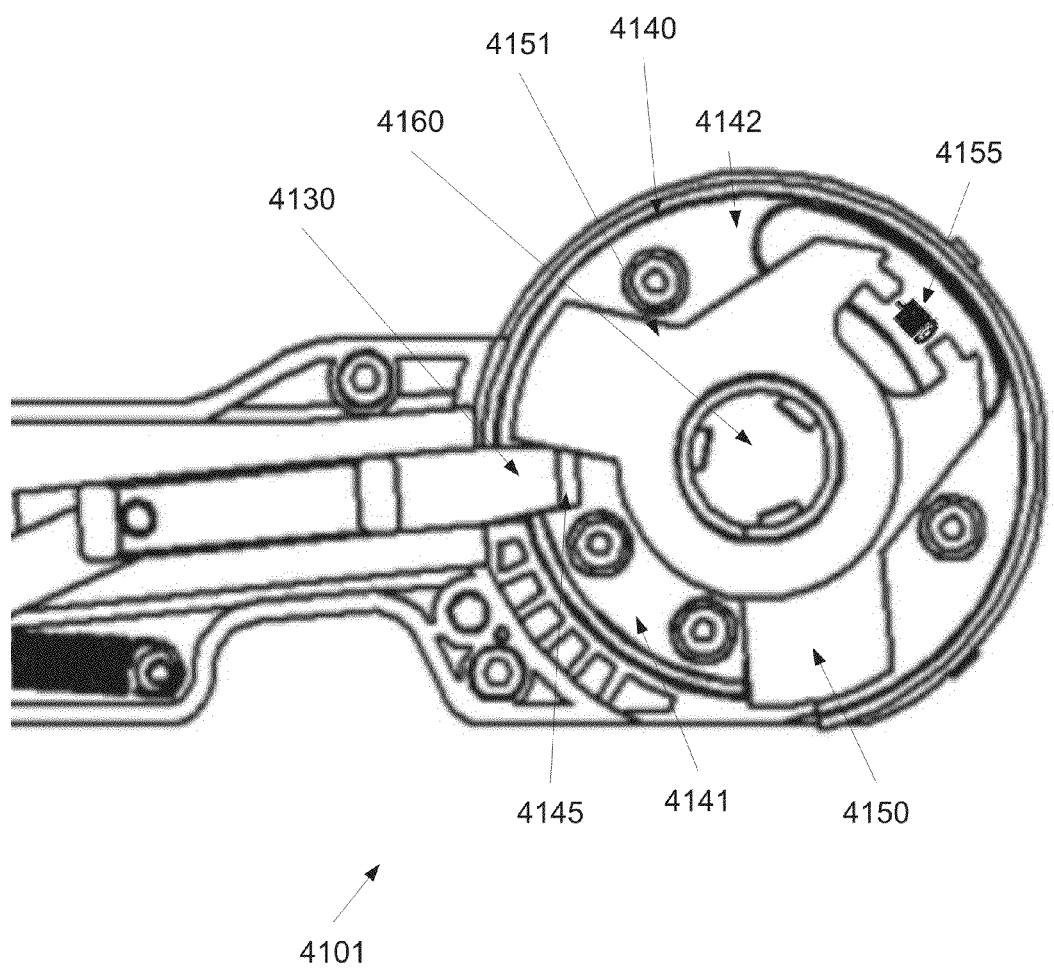
FIG. 40 is an illustration of a locking wheel in a transient locking and unlocking handle operated lock mechanism, according to some embodiments of the present invention.

Reference is also made to FIGS. 40-45 illustrating a transient locking and unlocking handle operated lock mechanism 4101 and an asynchronous lock and a synchronous release locking system operating a multiple locks when folding and unfolding a motorized vehicle 4102, according to some embodiments of the present invention. FIG. 40 illustrates a transient locking and unlocking handle operated lock mechanism, according to some embodiments of the present invention. The locking mechanism 4101 enables a user to transiently operate a locking and unlocking handle. The transient operation may be, for example, pulling and then releasing a locking and unlocking handle 4110. Optionally, the transient operation may be pushing and releasing or rotating and releasing. The brief transient nature of the operating the locking and unlocking handle 4110 enables a user to freely use his or her hands for operations other than locking and/or unlocking.

According to some embodiments of the present invention, a locking system 4102 of multiple locking mechanisms 4101, 4103 in a folding motorized vehicle (FIGS. 41-45), such as the locking mechanism described above 4101, are asynchronously locked and a synchronously released. The asynchronous lock and a synchronous release locking system 4102 locks each locked element once it reaches folded and/or operational positions locking points accordingly. The locked element may be, for example, a steering rod 105, a foot surface 198, a rear lower chassis 145 and/or a front lower chassis 125. Upon unlocking the locking system 4102 each locking mechanism 4101 is unlocked at the same time. A synchronizing arm 4120 coordinates and/or synchronizes the release of the locking mechanisms 4101, 4103. Optionally, the locking mechanism 4102 is positioned along the front lower chassis 125.

According to some embodiments of the present invention, the transient locking and unlocking handle operated lock mechanism 4101 comprises: a locking wheel 4140, a bolt. 4130, a locking and unlocking handle 4110, and at least two rotating clamps 4150, 4151. The locking wheel 4140 has a non unified radius. The non unified radius defines recesses 4145 and sections 4141, 4142 are between the recesses. The recesses lock a bolt 4130 which drives into and retracts from the recesses 4145. The rotation of the locking wheel 4140 is limited according to the different radii of the locking wheel's sections 4141, 4142. The non unified radius creates at least two bolt locking recesses 4145. Each section between two adjacent bolt locking recesses 4145 may have a unified radius. At least two sections 4141, 4142 are defined by the bolt locking recesses 4145: a small radius section 4141 and a big radius section 4142. As the name suggests, big radius section 4142 has a bigger radius than said small radius section 4141. A locking and unlocking handle 4110 is mechanically connected to the bolt 4130. Optionally, the locking and unlocking handle 4110 is directly connected to the bolt 4130. Optionally, the locking and unlocking handle 4110 is connected to the bolt 4130 via a set of connecting arms 4122 and hinges 4125, 4126. Optionally, a synchronizing arm 4120 is part of the mechanical connection between the locking and unlocking handle 4110 and the bolt 41. At least two rotating clamps 4150, 4151 are mounted on a rotating clamp driving and retraction mechanism 4155. Each rotating clamp 4150, 4151 is positioned in proximity to a bolt locking recess 4145. Each rotating clamp 4150, 4151 blocks a bolt locking recess 4145 upon bolt retraction from the bolt locking recess 4145.

Figure 41:
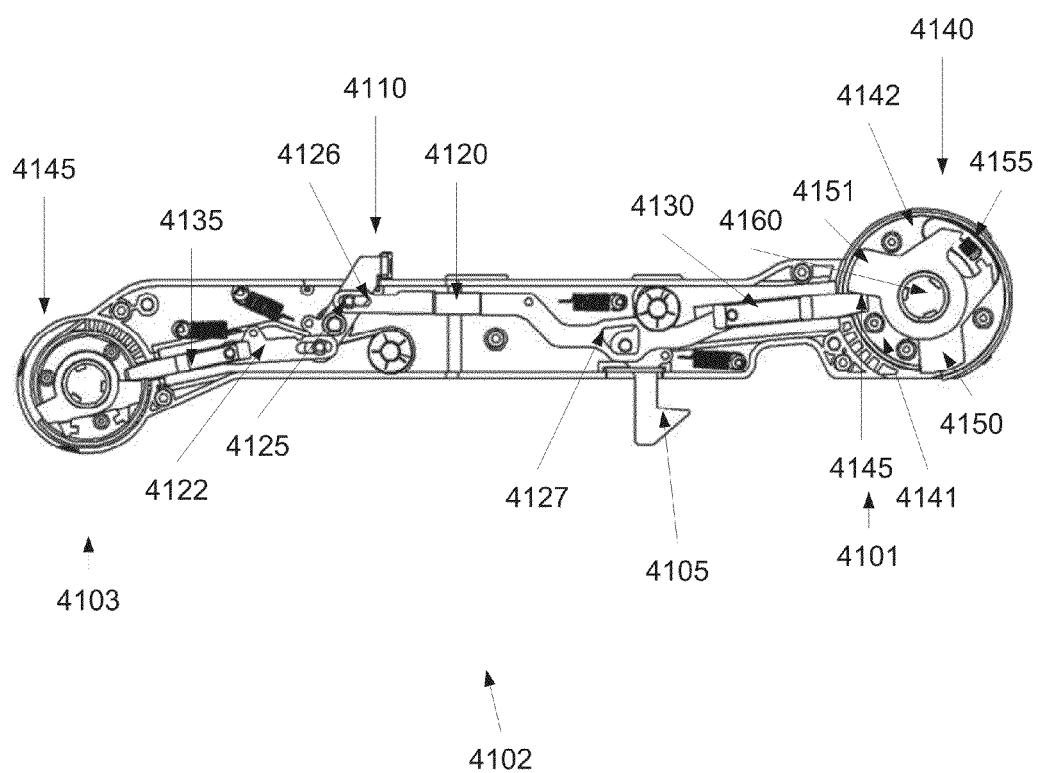
FIG. 41 is an illustration of a transient locking and unlocking handle operated lock mechanism having two locking wheels prior to operation, according to some embodiments of the present invention.

When the motorized vehicle 101 is in a folded configuration the asynchronous lock and a synchronous release mechanism 411 is as illustrated in FIG. 41. To open the motorized vehicle, i.e. transfer the motorized vehicle from a folded configuration to an operational configuration, an operating user pulls the locking and unlocking handle 4110, as illustrated in FIG. 41. The locking and unlocking handle 4110 is pulled briefly by the user and then released. The locking and unlocking handle 4110 pulls bolts 4130, 4135. At least one bolt 4130 is pulled for each locking wheel 4140. In this example, there are two locking wheel 4140, 4145 which are controlled by the locking and unlocking handle 4110 in opposite directions to one another. The locking and unlocking handle 4110 may be connected to a bolt 4130, 4135 by a set of connecting arms 4120-4122. The connecting arms may have apertures 4126, 417 allowing the movement of other connecting arms 4120-4122, of the bolts 4130, 4135 and/or of the locking and unlocking handle 4110. As a result of its pulling, the bolt 4130 retracts from a recess 4145 in a locking wheel 4140. The bolt 4130 retracts so it blocks the bigger radius section of the locking wheel 4142, but not the smaller radius section 4141.

Figure 42:
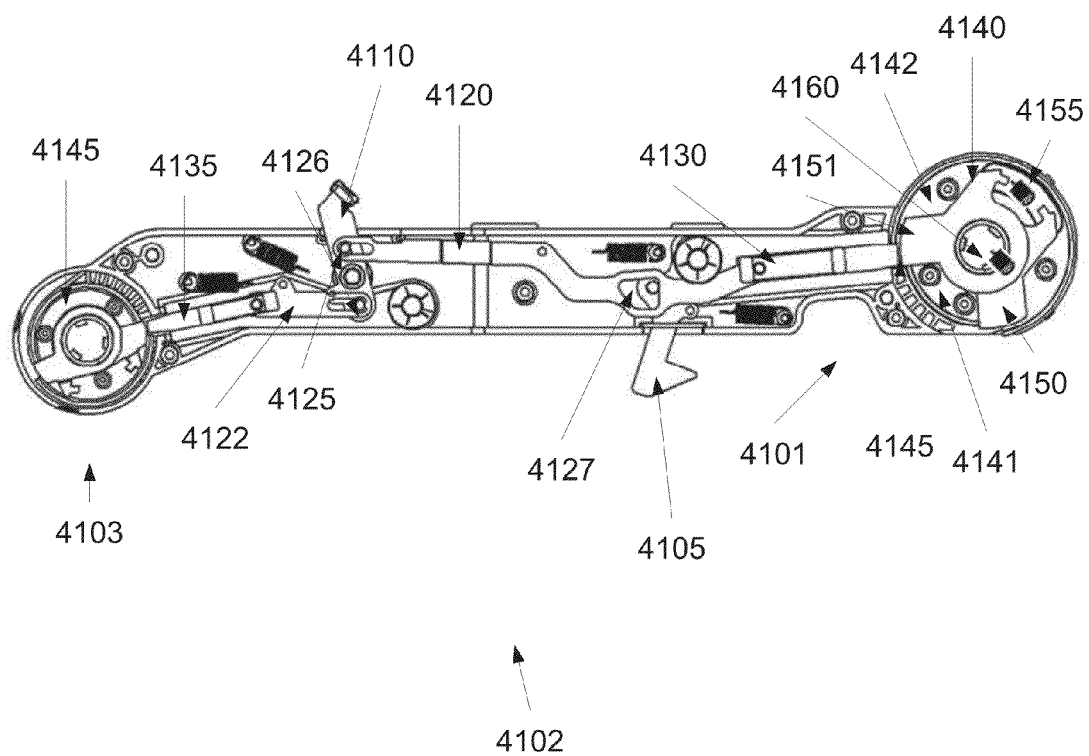
FIG. 42 is an illustration of a transient locking and unlocking handle operated lock mechanism having two locking wheels when the locking and unlocking handle is pulled, according to some embodiments of the present invention.
Figure 43:
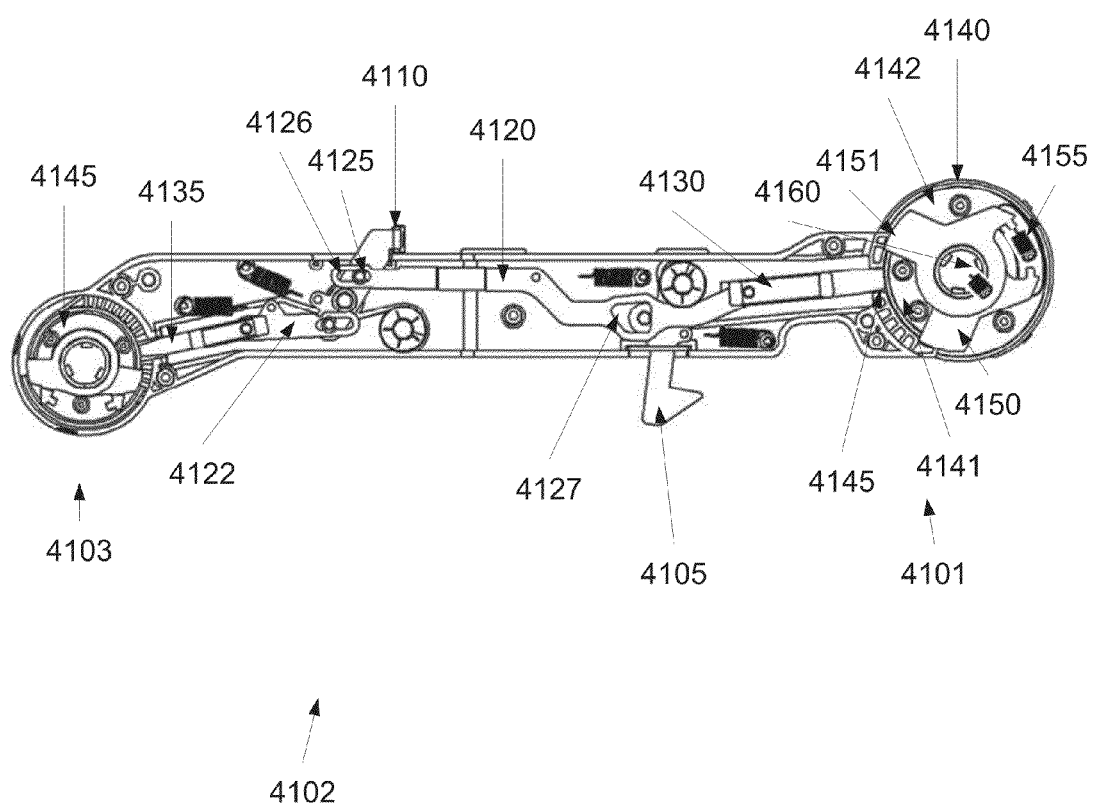
FIG. 43 is an illustration of a transient locking and unlocking handle operated lock mechanism having two locking wheels when the locking and unlocking handle is released, according to some embodiments of the present invention.
Figure 44:
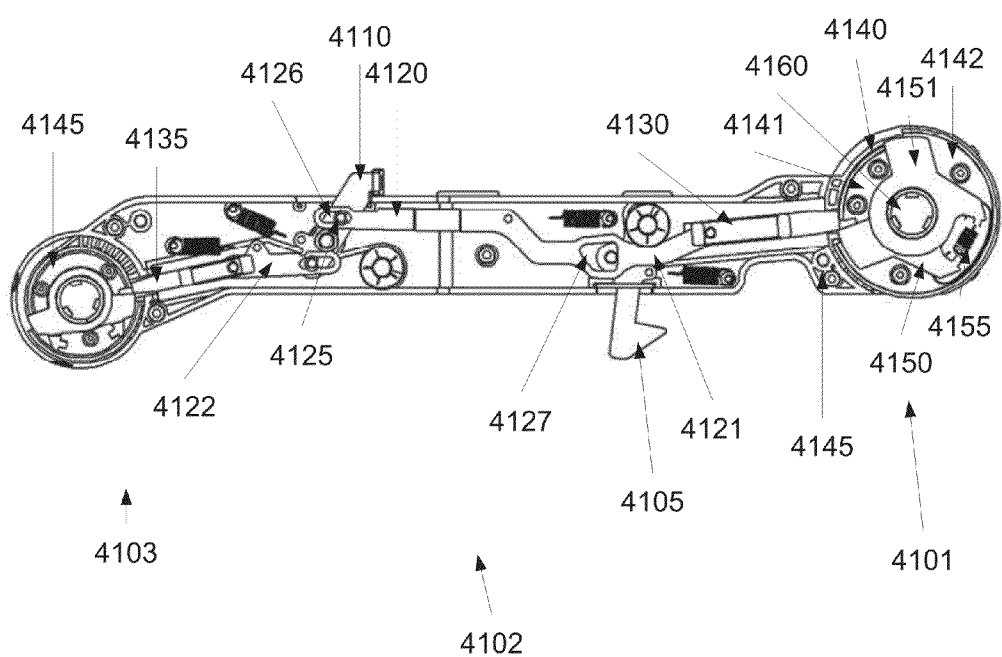
FIG. 44 is an illustration of a transient locking and unlocking handle operated lock mechanism having two locking wheels when the bolt locking recess is revealed, according to some embodiments of the present invention.
Figure 45:
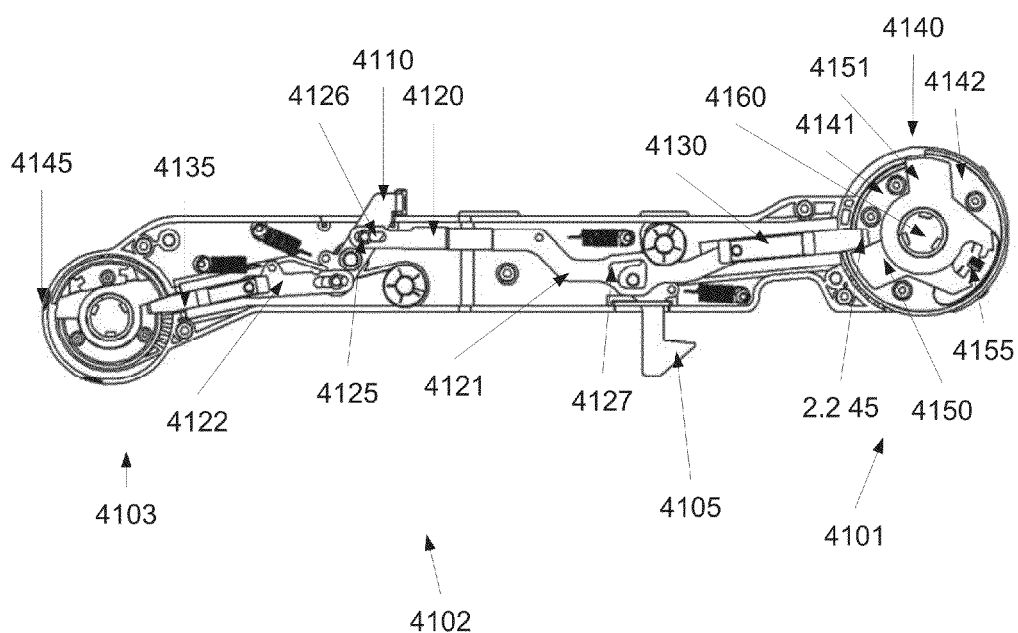
FIG. 45 is an illustration of a transient locking and unlocking handle operated lock mechanism having two locking wheels when the bolt occupies the bolt locking recess, according to some embodiments of the present invention.
Figure 46:
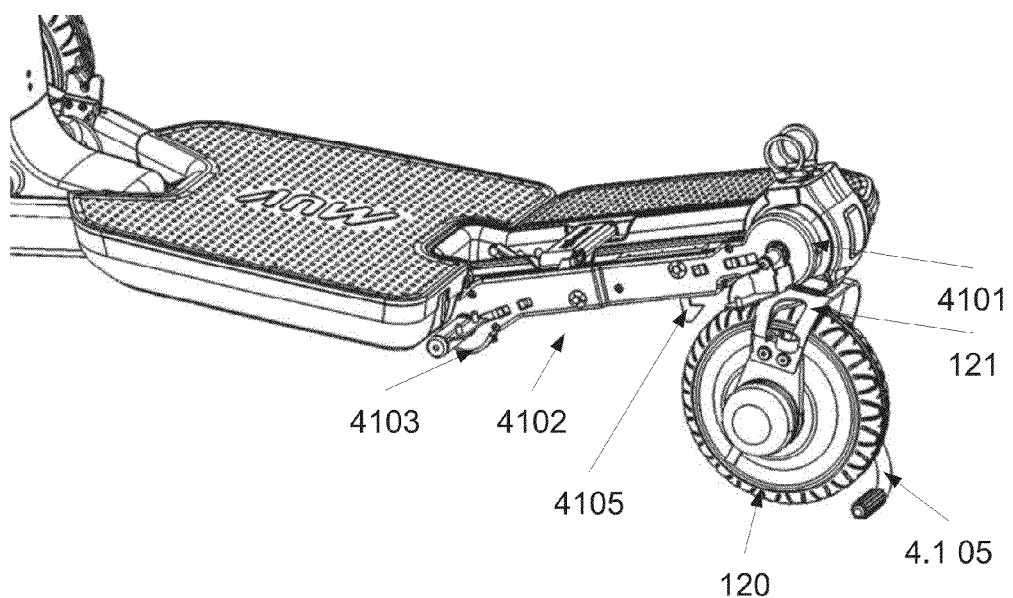
FIG. 46 is an illustration of a transient locking and unlocking handle operated lock mechanism positioned along the front lower chassis, according to some embodiments of the present invention.

Once the bolt locking recess 4145 in unoccupied, a rotating clamp 4151 is pushed into the bolt locking recess 4145 by a clamp spring 4155 as illustrated in FIG. 42. Occupation of the bolt locking recess 4145 in the locking wheel 4140 by the rotating clamp 4150 prevents the bolt 4130 from reentering the bolt locking recess 4145. The bolt 4130 slides over the locking wheel 4140 along the small radius section 4141 until another bolt locking recess is revealed as illustrated in FIGS. 43 and 44. The sliding of the bolt 4130 over the locking wheel 4140 occurs even when the unlocking handle is released. The bolt 4130 drives into the revealed bolt locking recess and is locked in it as illustrated in FIG. 45.

Optionally, the locking system 4102 is mounted on the front lower chassis 125. Optionally, the locking system 4102 locks the mechanical connection between the rear lower chassis 145 and a front lower chassis 125. The locking system 4102 may be mounted along the front lower chassis 125. The locking system 4102 may have two locking wheels 4140, 4145. The back locking wheel 4145 may lock the connection between the rear lower chassis 145 and a front lower chassis 125, enabling a letter "N" shaped fold as illustrated in FIGS. 47A-47B.

Optionally, more than two locking mechanisms 4101, 4103 are synchronized by the locking system 4102 (not shown). Optionally, other lock configurations, other than the transient locking and unlocking handle operated lock mechanism 4101, 4103, are coordinated by the locking system 4102. For example, the folded configuration of the front lower chassis 125 and the rear lower chassis 145 is locked by a locking latch 4105. Optionally, the locking system 4102 has multiple locking latches and/or other locking elements (not shown). Optionally, the tope side 115 of the steering rod 105 is locked by the locking system 4102 when the motorized vehicle 101 is in a folded configuration and the steering rod is essentially parallel to the lower chassis.

Figure 47A:
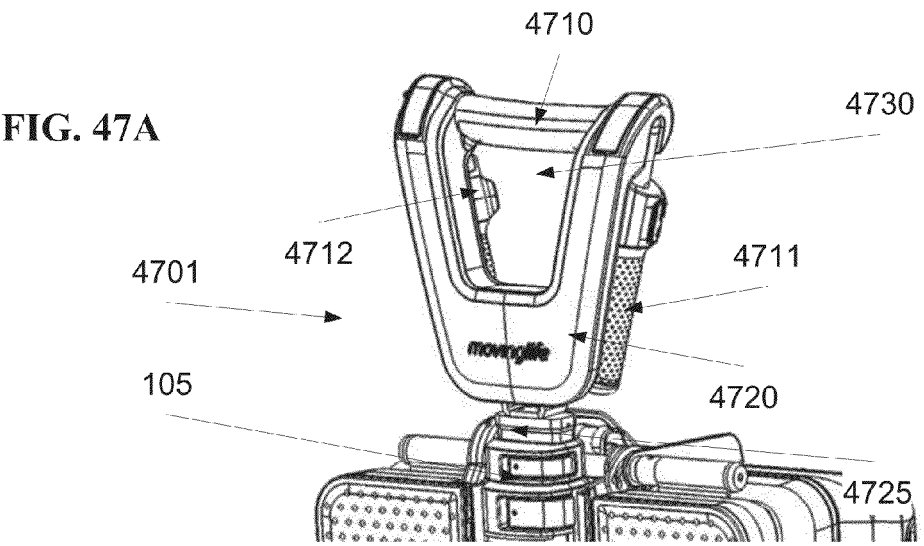
FIGS. 47A-47B are illustrations of a steering, carrying, folding and trolling device, according to some embodiments of the present invention.
Figure 47B:
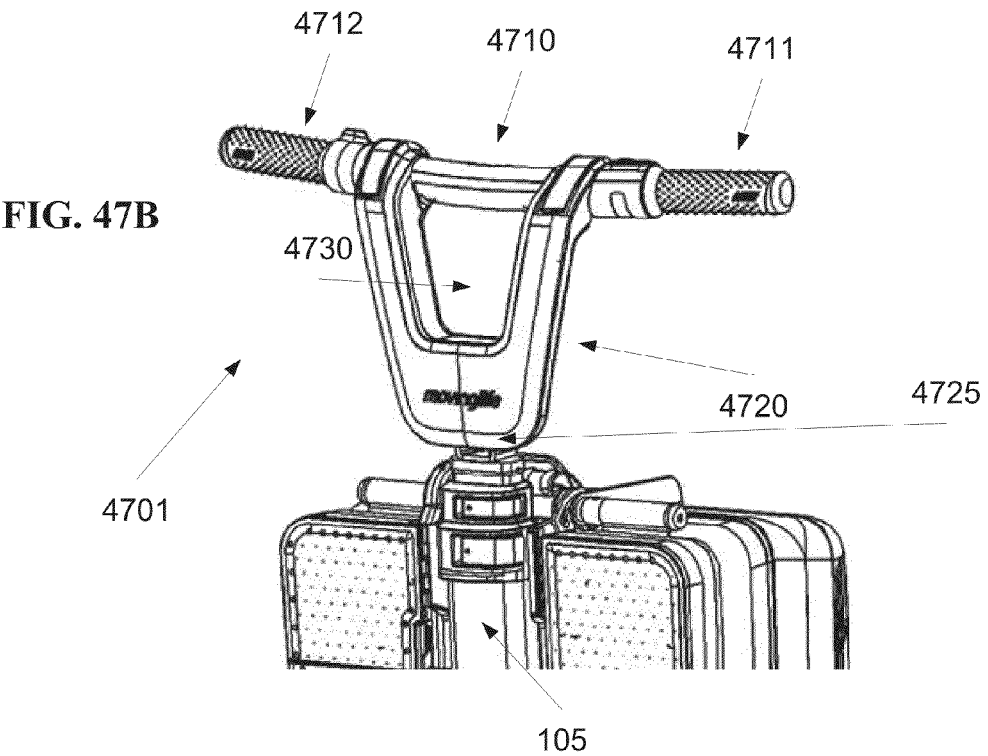
Figure 48A:
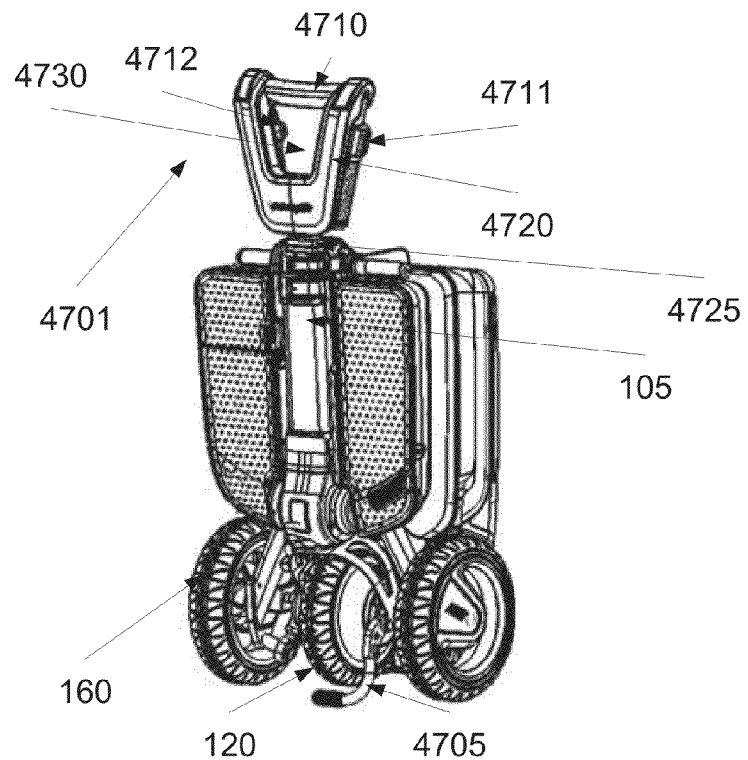
FIGS. 48A-48B are illustrations of a steering, carrying, folding and trolling device mounted on a motorized vehicle in a trolley configuration, according to some embodiments of the present invention.
Figure 48B:
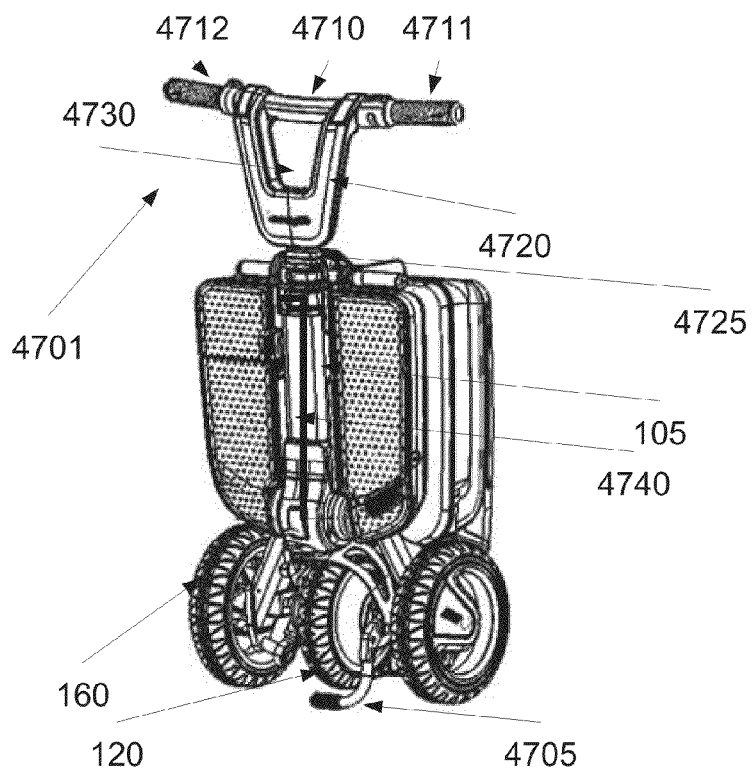
Figure 49A:
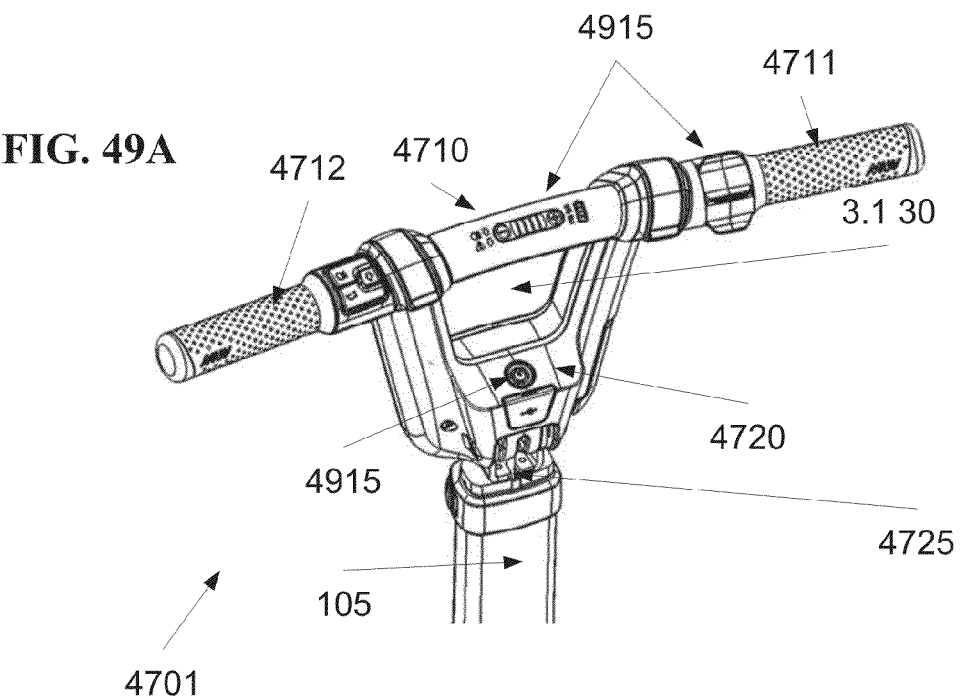
FIGS. 49A-49B are illustrations of a user interface in a steering, carrying, folding and trolling device of a motorized vehicle, according to some embodiments of the present invention.
Figure 49B:
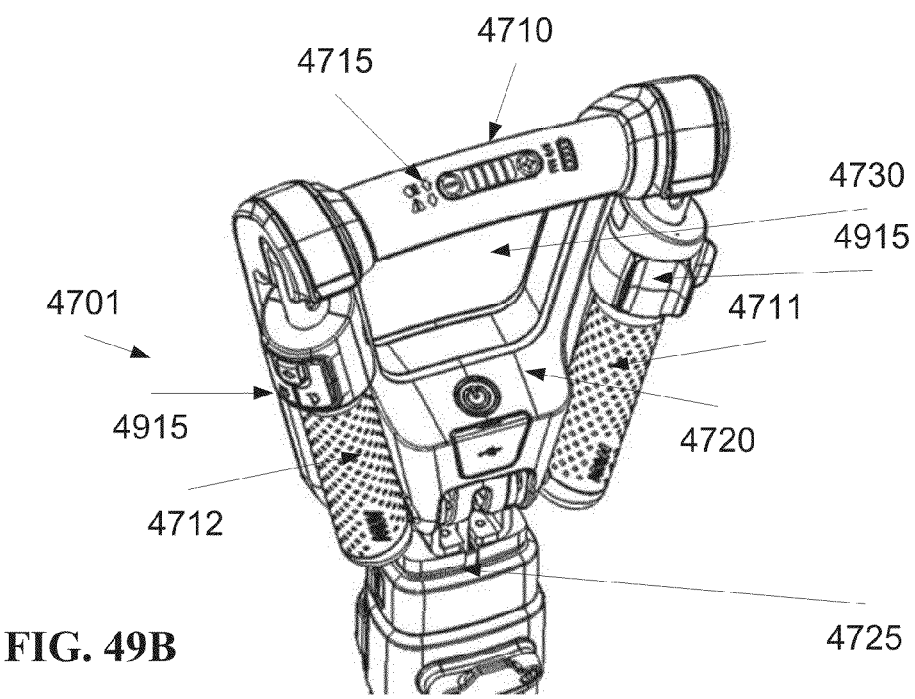

Reference is now made to FIGS. 47-49 illustrating a steering and trolling device of a motorized vehicle with folding handles, according to some embodiments of the present invention. The steering and trolling device 4701 has a central arm 4710. The central arm 4710 is mounted on a fork 4720. The fork 4720 is mounted on the supporting end 4725 of the steering rod 105. A carrying aperture 4730 is defined between the central arm 4710 and the fork 4720. The carrying aperture 4730 may be 10 centimeters long, thereby enabling a user to fit in a feast closed around the central arm 4710. Optionally, the carrying and folding handle aperture 4730 is between about 5 to about 15, between about 10 to about 20 centimeters and/or between about 8 to about 12 centimeters along at least one of its dimensions. Optionally, the carrying and folding handle aperture 4730 is not occupied by any element of the motorized vehicle 101. Keeping the carrying and folding handle aperture 4730 element free enables a user to use this carrying and folding handle aperture 4730 for folding, carrying, steering and/or trolling the motorized vehicle 101. Optionally, the carrying and folding handle aperture 4730 is partially occupied by an element of the motorized vehicle 101, leaving an unoccupied region of the aperture 4730 big enough to fit a user hand. To the sides of the central arm 4710 are: a right folding handle 4711 and a left folding handle 4712. The central arm 4710 may be substantially serial to the right and left folding handles 4711, 4712 in a steering configuration illustrated in FIGS. 47B and 48B. Optionally, the central arm 4710 is elevated from a line connecting said right and left folding handles 4711, 4712. Optionally, the central arm 4710 is extrudes forward from a line connecting said right and left folding handles 4711, 4712. The steering configuration enables a user to steer the motorized vehicle. The right and left folding handles 4711, 4712 may be mechanically connected to the fork 4720. Optionally, the right and left folding handles 4711, 4712 are mechanically connected to the central arm 4710. The mechanical connection between the right and the left folding handles 4711, 4712 to the fork 4720 enables the right and the left folding handles 4711, 4712 to fold. The right and the left folding handles 4711, 4712 may fold to the sides of the fork 4720. Optionally, the right and the left folding handles 4711, 4712 fit into the fork's 4720 dimensions and do not essentially protrude beyond its dimensions. The central arm 4710 remains unfolded during folding of the right and left folding handles 4711, 4712. Optionally, the right and the left folding handles 4711, 4712 fit into the lateral dimensions of the fork 4720 when in folded configuration as illustrated in FIGS. 47A and 48A. Optionally, the folding handles 4711, 4712 do not extrude out of the lateral sides of the fork 4720. Optionally, the folding handles 4711, 4712 are hidden behind the fork 4720 in a frontal view of the motorized vehicle 101. Optionally, the central arm 4710 has a user interface 4915 comprising button(s), clock(s), display screen(s), control element(s) etc. Optionally, one or both of the folding handles 4711, 4712 carry a user interface elements 4915 as listed above. The user interface elements 4915 may be used to display and/or control the motorized vehicle's 101 speed, set the motorized vehicle's 101 upper speed limit, set a driving mode such as sport and/or regular. Optionally, the user interface controls the motorized vehicle in an operative configuration and/or in a folded configuration.

Reference is now made to FIGS. 50-57 illustrating a supporting leg 5005 of a motorized vehicle 101, according to some embodiments of the present invention. Transforming the motorized vehicle 101 from an operative configuration to a folded configuration by an operating user, may be easier to perform and/or safer when the motorized vehicle 101 is stabilized during the folding process. Stabilizing the motorized vehicle 101 during the folding process (illustrated, for example, in FIG. 56) may prevent is from tipping over, tilting, falling over etc. The stabilization may refer to essentially all intermediate configurations (i.e. the configurations of the motorized vehicle between an operative configuration and a folded configuration during the process of folding and/or unfolding). Optionally, the motorized vehicle 101 is stabilized during the folding process by three support elements. Optionally, the supporting elements are two rear wheels 160 and a front wheel 120. Optionally, the front wheel server 120 is folded in between the rear wheels 160 and is elevated from the line connecting the two rear wheels 160. The elevated front wheel 120 may not function as a supporting element. Optionally, the stabilizing elements are two rear wheels 160 and an upper chassis extrusion 5801.

Figure 50A:
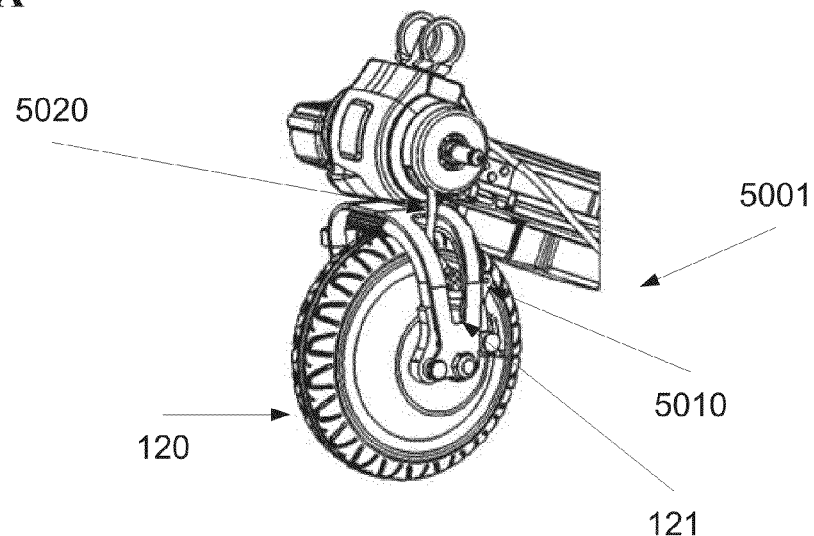
FIGS. 50A-50B are illustrations of a supporting leg stabilizing a motorized vehicle in folded and unfolded supporting leg configurations, according to some embodiments of the present invention.
Figure 50B:
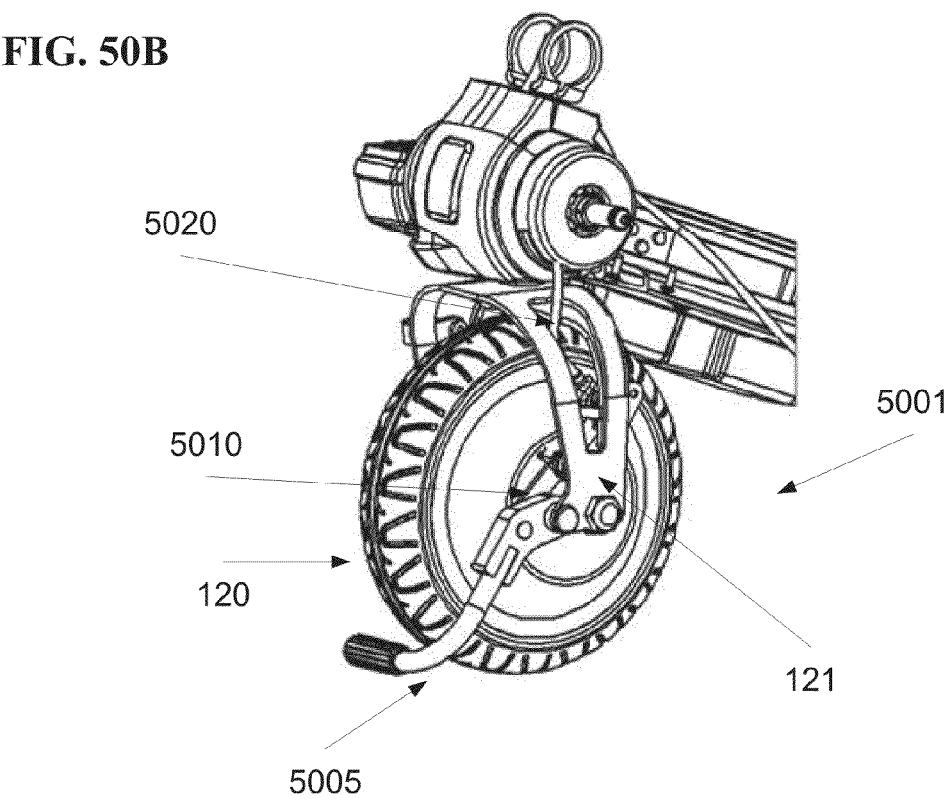
Figure 51:
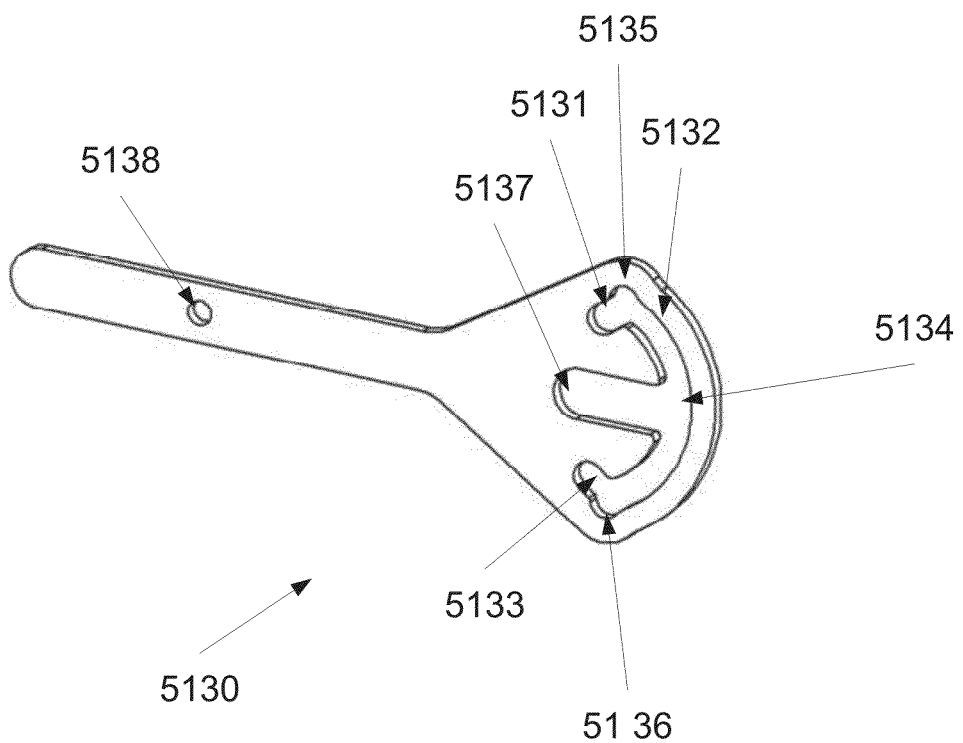
FIG. 51 is an illustration of a pitchfork, according to some embodiments of the present invention.
Figure 52A:
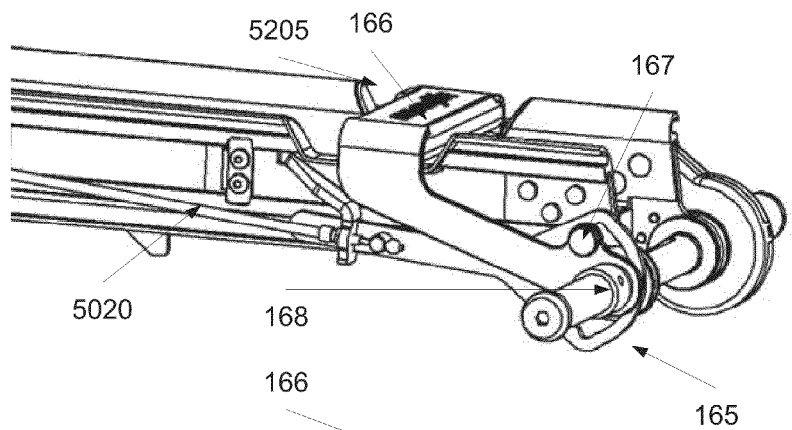
FIGS. 52A-52C are illustrations of a handle causing no movement of a supporting leg while operating a stabilizing mechanism of a motorized vehicle, according to some embodiments of the present invention.
Figure 52B:
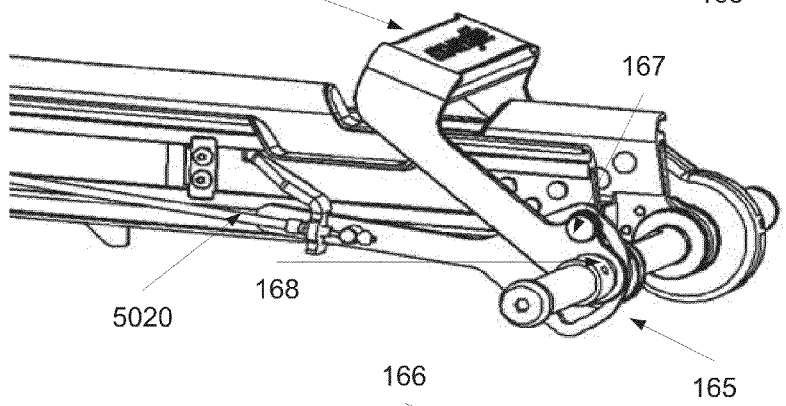
Figure 52C:
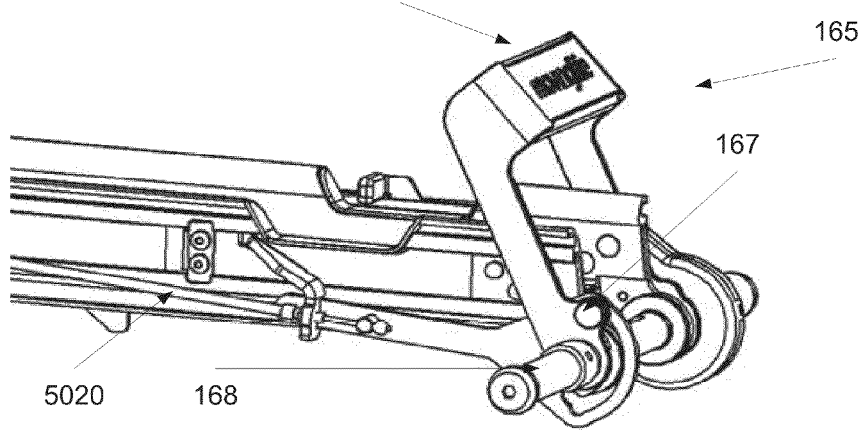
Figure 53A:
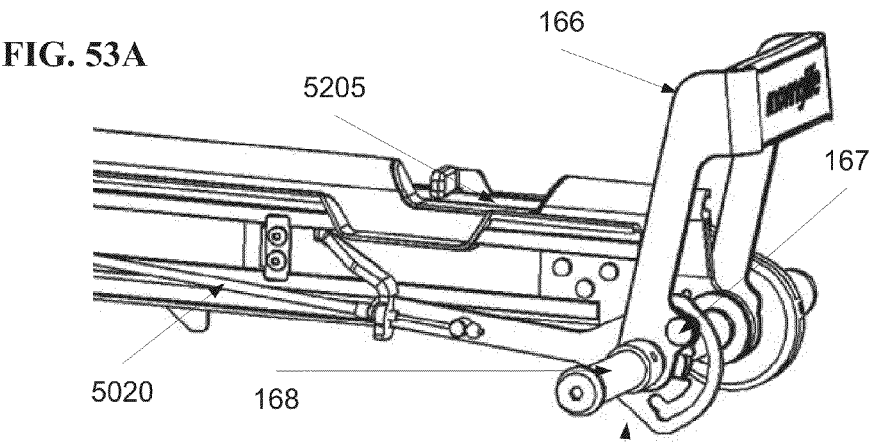
FIGS. 53A-53C are illustrations of a handle lowering a supporting leg a while operating a stabilizing mechanism of a motorized vehicle, according to some embodiments of the present invention.
Figure 53B:
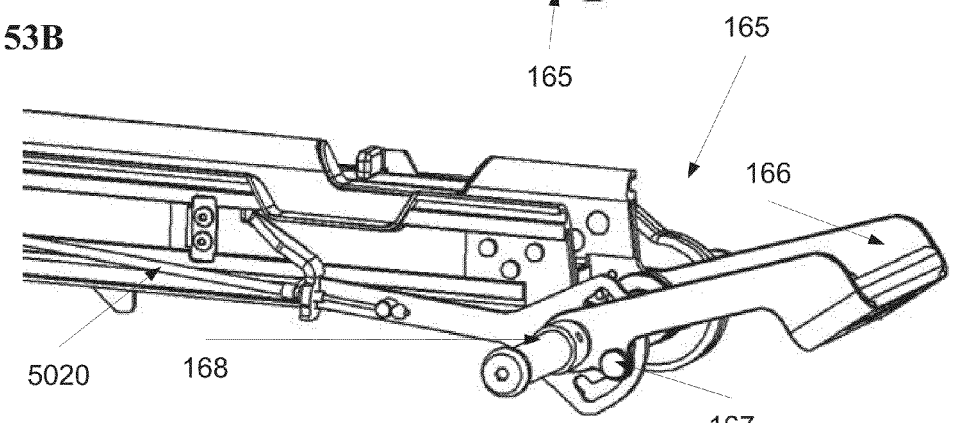
Figure 53C:
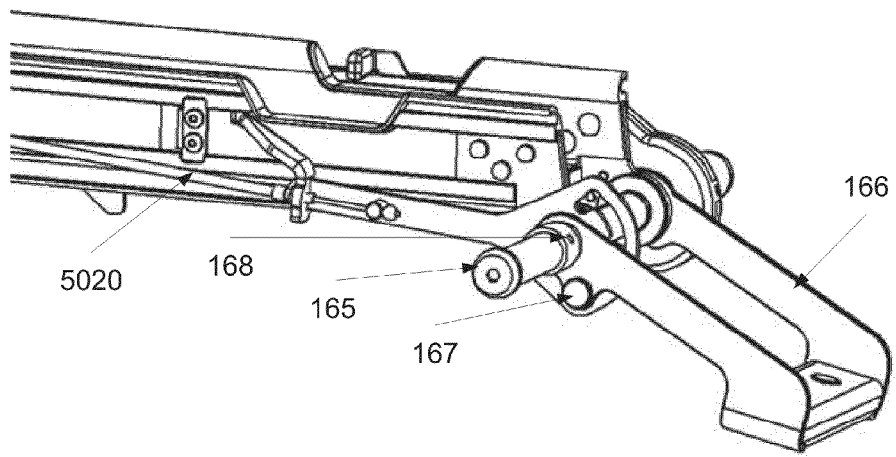
Figure 54A:
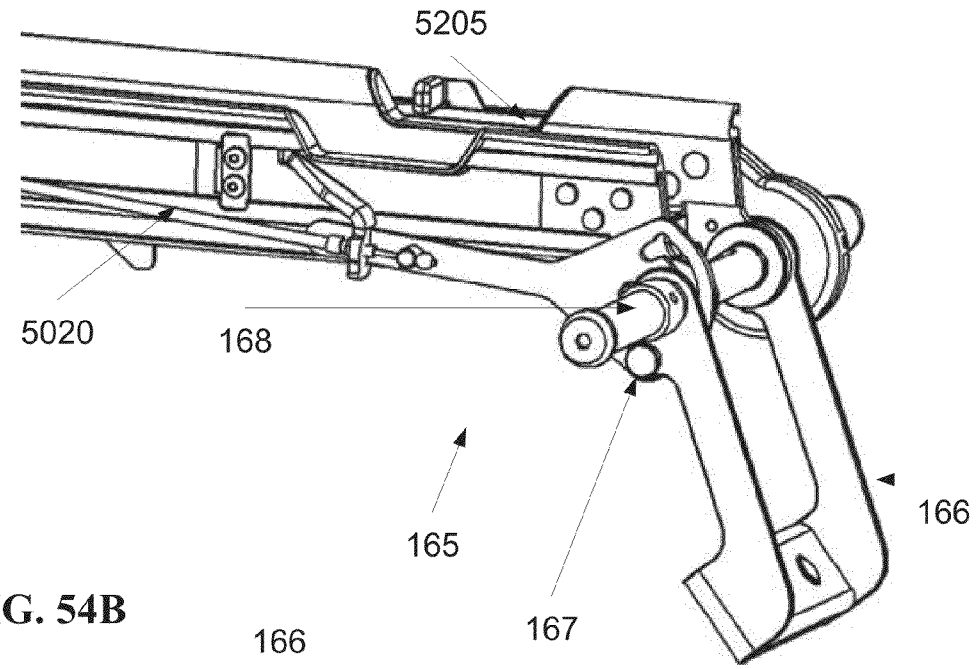
FIGS. 54A-54B are illustrations of a handle lifting a supporting leg while operating a stabilizing mechanism of a motorized vehicle, according to some embodiments of the present invention.
Figure 54B:
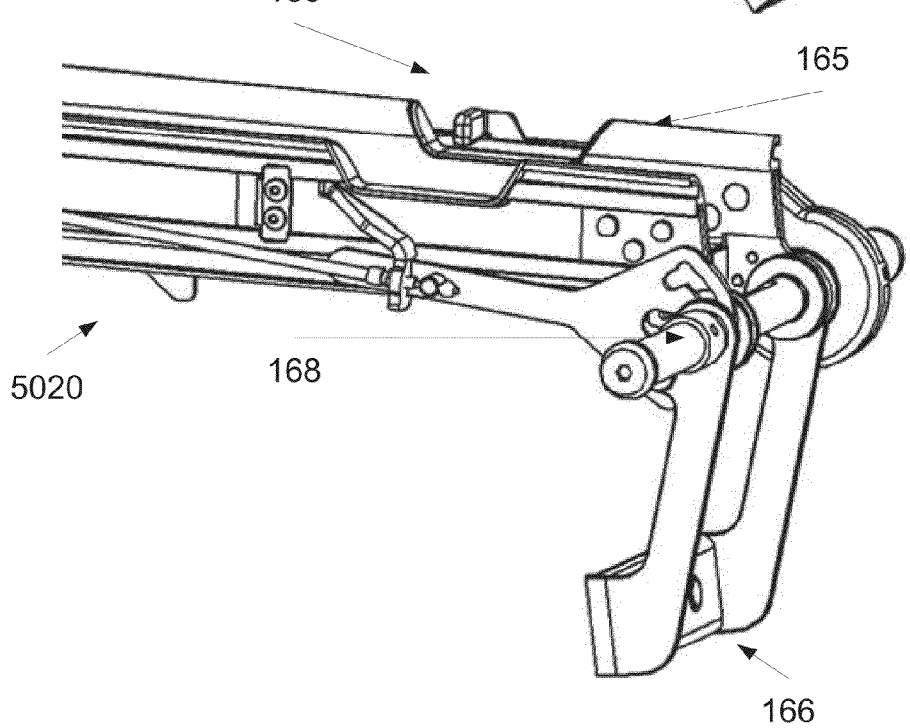

According to some embodiments of the present invention, a supporting leg 5005 is a stabilizing element, supporting the motorized vehicle 101 during the folding and/or unfolding process. Optionally, the stabilizing elements are two rear wheels 160 and a supporting leg 5005. The supporting leg 5005 may be mounted on the front wheel fork 121. The supporting leg 5005 stabilizes the motorized vehicle 101 when in an unfolded leg configuration, as illustrated in FIG. 50B. Supporting leg 5005 stabilization of the motorized vehicle 101 may be desired for the intermediate configurations of the motorized vehicle 101. When the motorized vehicle 5005 is in an operative configuration and/or in a folded configuration, an unfolded leg configuration may not be desired. Accordingly, synchronization between the motorized vehicle configuration and the supporting leg configuration is provided. The same handle 166 utilized for folding and/or unfolding the motorized vehicle 101 is further utilized for unfolding and/or folding the supporting leg 5005.

The supporting leg 5005 may be connected to a wheel fork 121 by a knuckle joint. When folded, the supporting leg 5005 may be hidden in the wheel fork 121 as illustrated in FIG. 50A. A synchronizing element 5030 connects between the handle and the supporting leg. According to some embodiments of the present invention, the synchronizing element 5030 comprises a pitchfork. Optionally, the pitchfork 5030 is connected to the supporting leg 5005 with a cable 5020. Optionally, the cable 5020 is connected to the supporting leg 5005 through a set of folding arms 5010. The folding arms 5010 may be connected to a spring (not shown). The spring pulls the folding arms 5010 towards one another.

Figure 55:
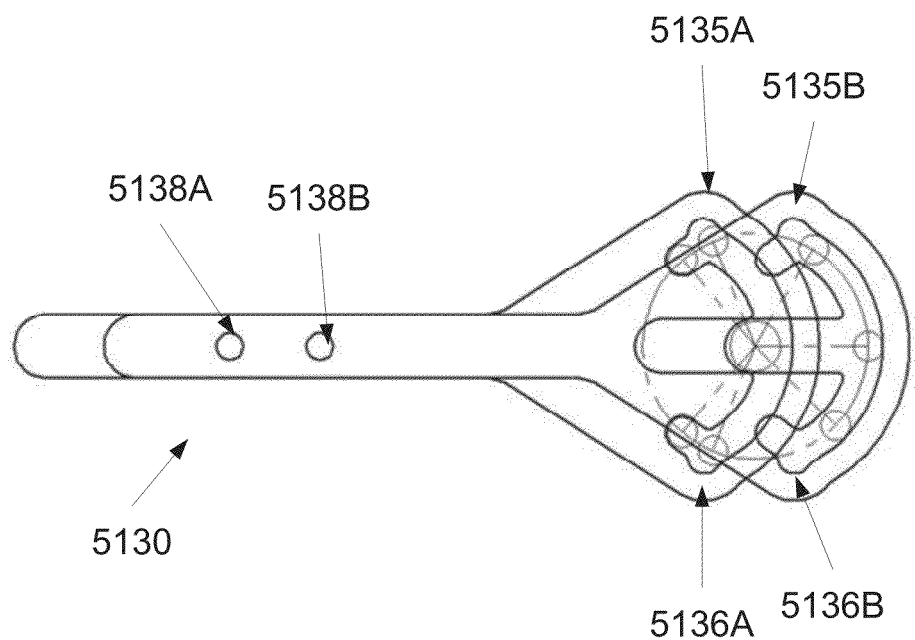
FIG. 55 is an illustration of a pitchfork's movement while operated, according to some embodiments of the present invention.
Figure 56A:
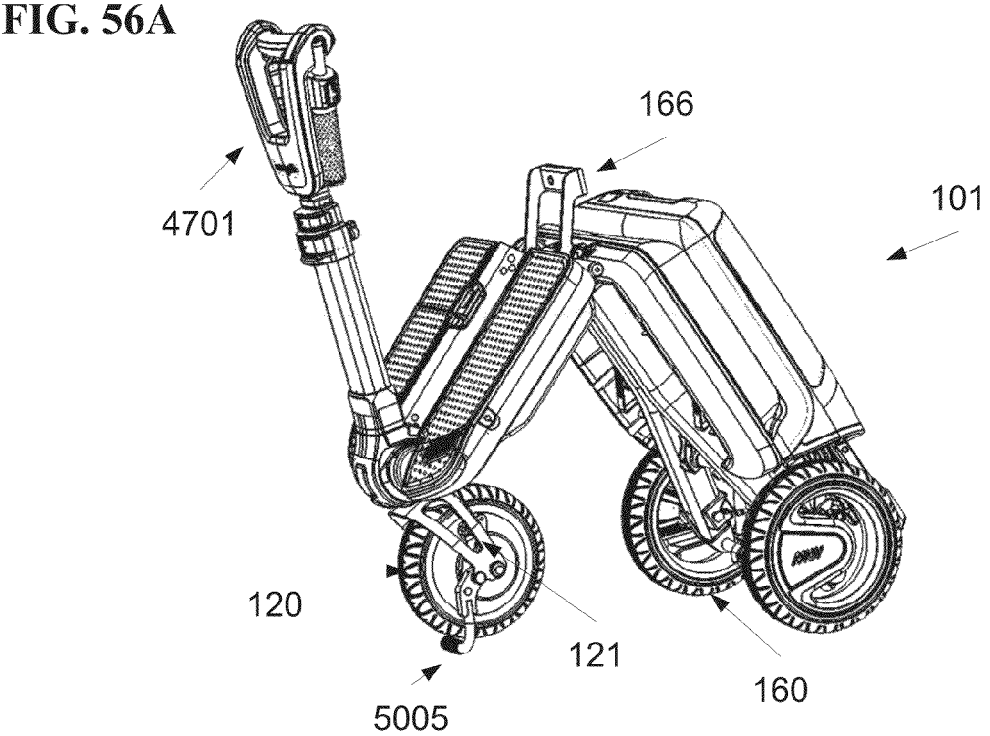
FIGS. 56A-56B are illustrations of different side views of intermediate configurations of a motorized vehicle supported by a supporting leg of a stabilizing mechanism, according to some embodiments of the present invention.
Figure 56B:
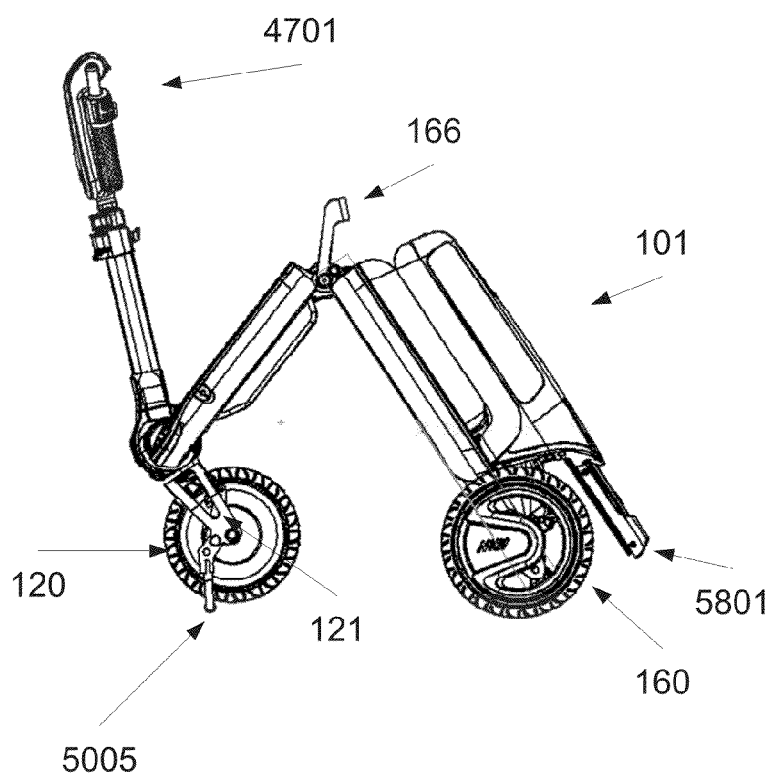
Figure 57A:
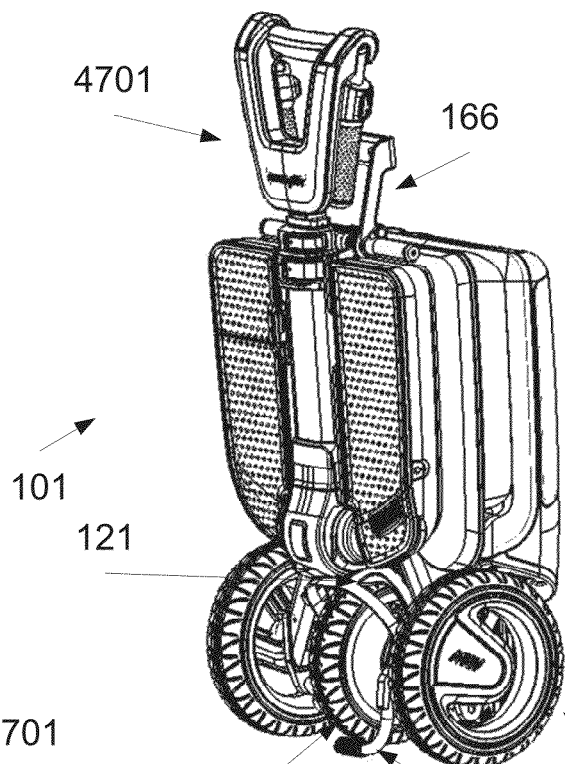
FIGS. 57A-57B are illustrations of different side views of folded configurations of a motorized vehicle supported by a supporting leg of a stabilizing mechanism and a upper chassis beam, according to some embodiments of the present invention.
Figure 57B:
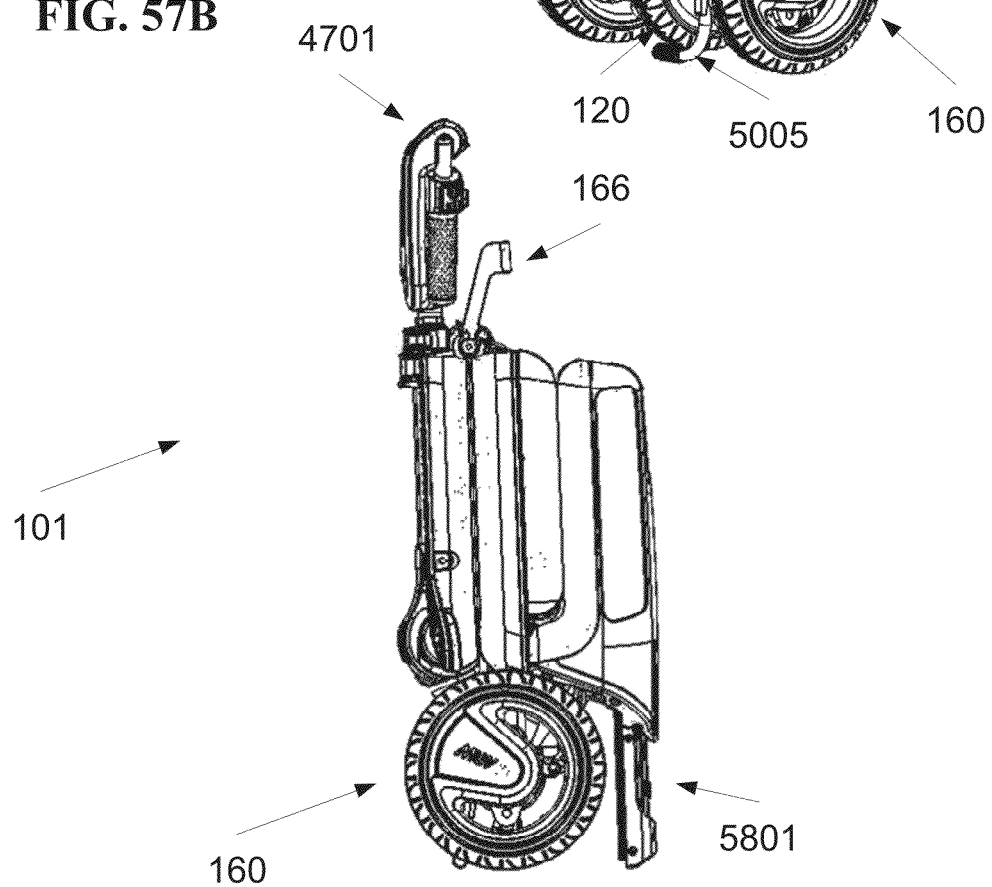

To transform the motorized vehicle 101 from a folded configuration to an operative configuration while stabilizing the intermediate configurations, an operating user moves the handle 166. According to some embodiments of the present invention, the handle 166 movement is pulling the handle 166 by a user. Optionally, the pulling may be a single continuous movement. Optionally, the handle 166 movement is a single continuous movement in a single direction. Optionally, the handle 166 movement is a single type of movement including pulling, pushing, rotating, pressing etc. When the handle 166 is pulled, the pitchfork 5030 moves against the handle axle 165. The pitchfork's movement may be as illustrated in FIG. 55. In FIG. 55 the pitchfork moves from location A to location B as illustrated by the location of the end of the first segment 5135A, 5135B the end of the second segment 5136A, 5136B and the aperture 5038A, aperture 5038B respectively. The location of the handle axle 165 is unchanged while the pitchfork 5030 moves against the handle pivot 167. The pitchfork's 5030 movement against the handle axle 165 may be performed by movement along an axle aperture 5037. When the handle pivot 167 travels along the first segment 5031 of the pitchfork aperture 5034, the mechanical connection transfers the movement of the handle 1532 to said supporting leg 5005. When the handle reaches about 30 degrees from its resting position (i.e. its position prior to moving) the handle pivot 167 reaches the end 5035 of the first segment 5031 of the pitchfork aperture 5034. Optionally, the end 5035 of the first segment 5031 is shaped to drive the handle pivot 167 into the second segment 5032 of the pitchfork aperture 5034. The mechanical connection may be, for example, a cable 5020 and a set of connecting arms 5010. Optionally, the mechanical connection comprises a rod and a set of arms connected to the supporting leg 5005. The cable 5020 is connected to an aperture 5038 in the pitchfork 5030. When the pitchfork is pulled by the handle 1532, the cable 5020 is pulled and moves the connecting arms 5010. The supporting leg 5005 is released from the front wheel fork 121. Optionally, the supporting leg 5005 is connected to the front wheel fork 121 by a knuckle joint. When the handle is pulled as part of folding the motorized vehicle 101, the supporting leg 5005 may be lowered to support the motorized vehicle during part of the folding process. The configuration of the motorized vehicle 101 at the time the supporting leg 5005 is lowered to the ground may be as illustrated in FIG. 56. Optionally, the supporting leg 5005 is lowered to the ground. When the handle pivot 167 travels along the second segment 5032 of the pitchfork aperture 5034, the cable 5020 is released. The end of the second segment 5032 of the pitchfork aperture 5034 may be shaped to transfer handle pivot 167 into the third segment 5033. The handle 1532 is about between about 150 degrees and 170 degrees from its starting position when the handle pivot 167 reaches the end of the second segment 5032. A spring (not shown) which is connected to the connecting arms 5010 pulls the connecting arms 5010 towards one another, thereby folding the supporting leg 5005 into the front wheel fork 121. The configuration of the motorized vehicle 101 at the time the supporting leg 5005 unfolded and the handle pivot 167 is at the second segment 5032 may be as illustrated in FIG. 57. Optionally, the supporting leg is unfolded when the motorized vehicle is in a folded configuration, thereby supporting it as a trolley. Optionally, pressure applied to the motorized vehicle 101 in a folded is absorbed by the set of connecting arms 5010 and is not transferred to the cable 5020, thereby providing longer operational period for this easily to tare element. Optionally, if the cable 5020 breaks the supporting leg 5005 is pulled by the spring and the set of connecting arms 5010, enabling driving the motorized vehicle 101 in an operational configuration.

Figure 58A:
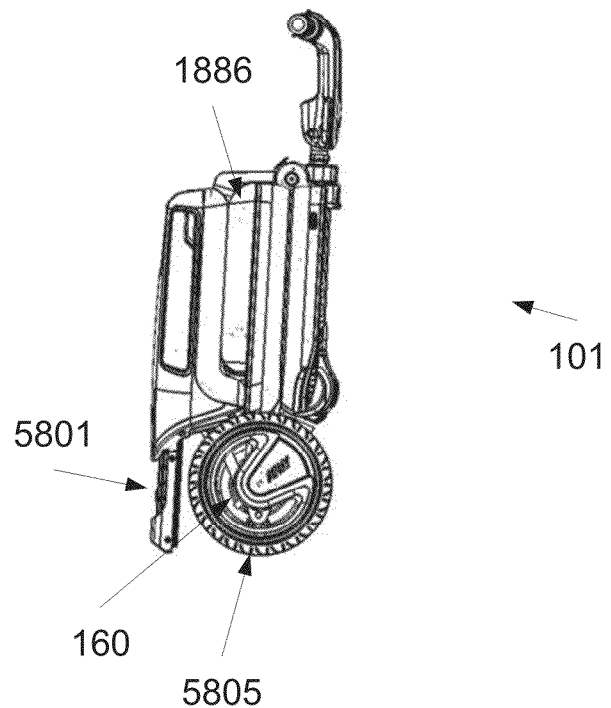
FIGS. 58A-58B are illustrations of a motorized vehicle transferring from a folded configuration to a trolley configuration, according to some embodiments of the present invention.
Figure 58B:
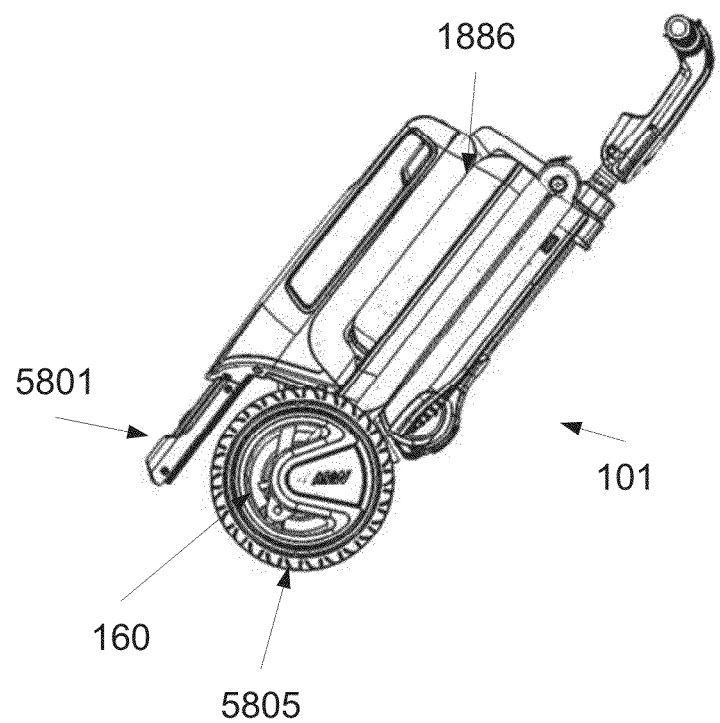
Figure 59:
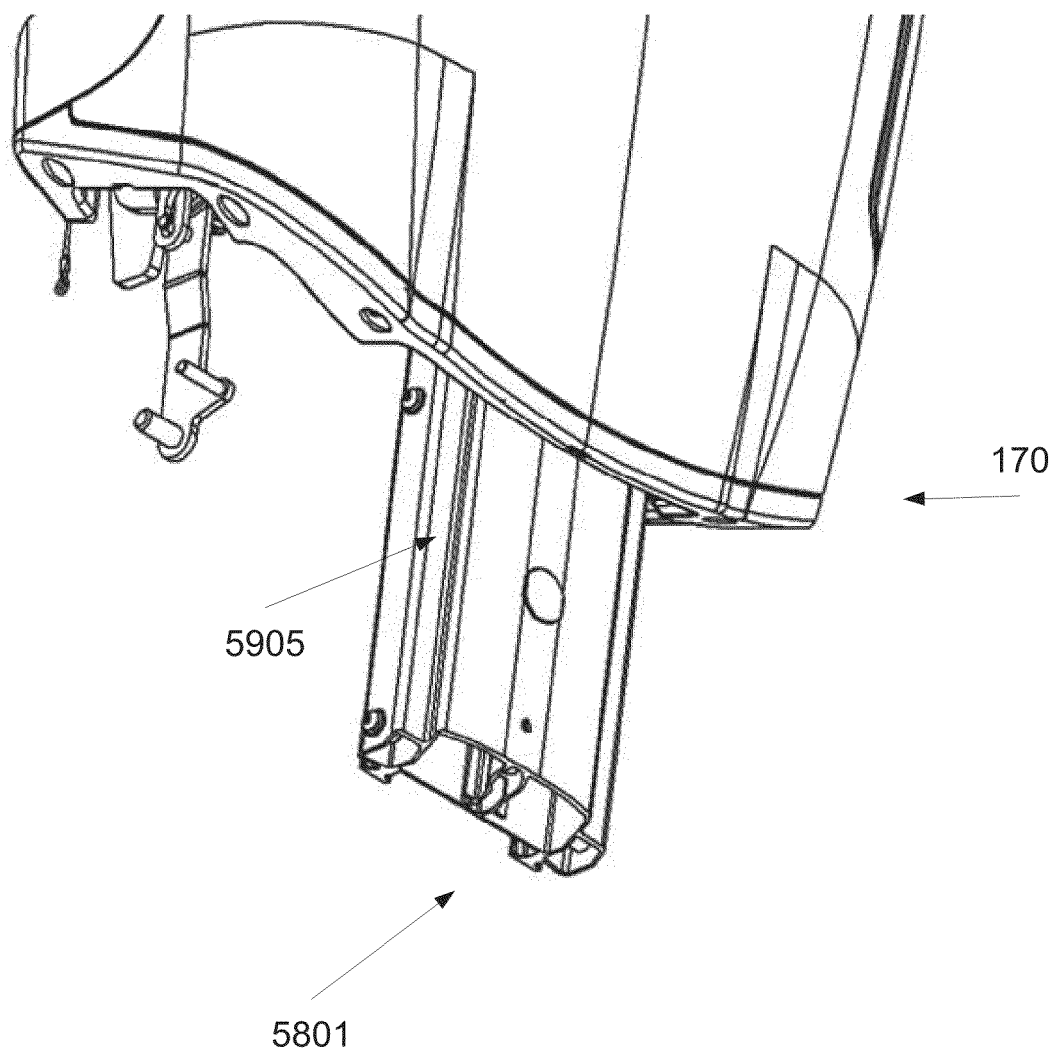
FIG. 59 is an illustration of an upper chassis beam, according to some embodiments of the present invention.
Figure 60:
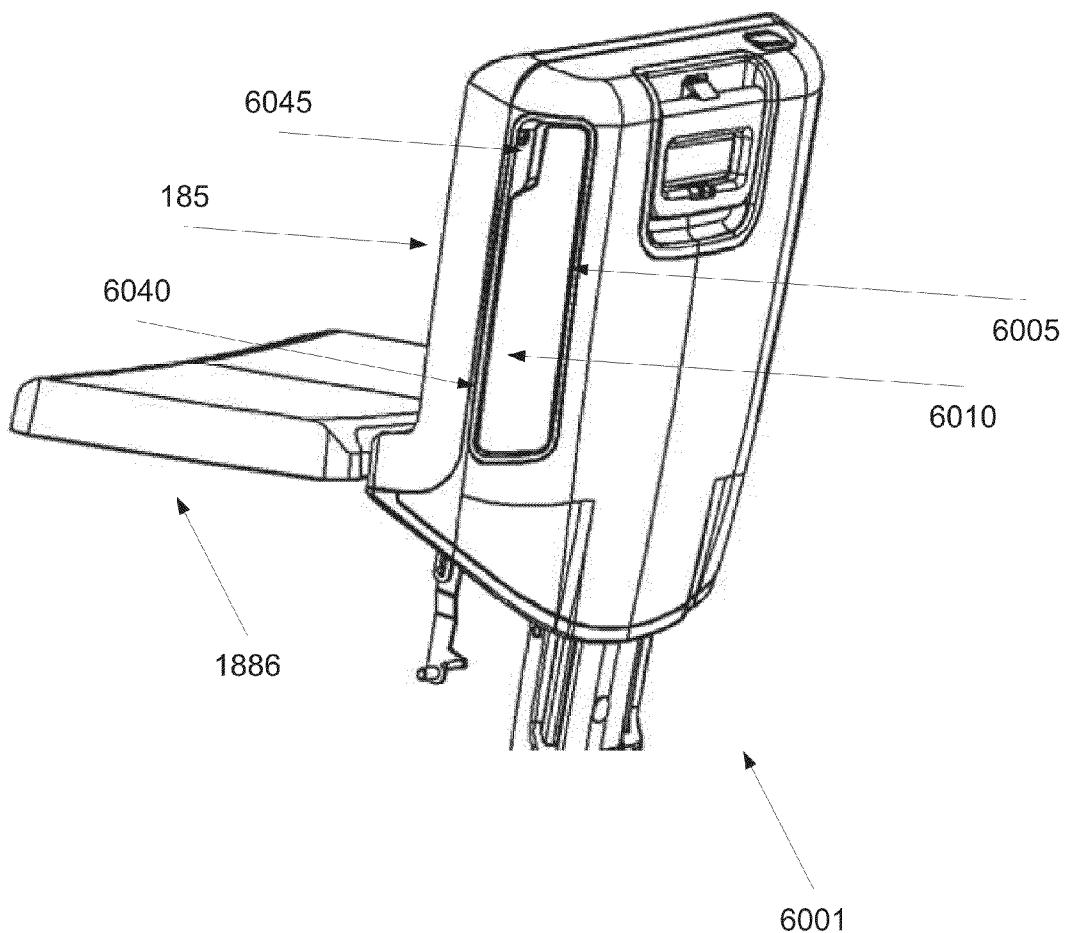
FIG. 60 is an illustration of an armrest folding and unfolding mechanism hidden in a seat backrest, according to some embodiments of the present invention.

Reference is now made to FIGS. 58-59 illustrating an upper chassis beam 5801 in a motorized vehicle 101, according to some embodiments of the present invention. The upper chassis 170 has an upper chassis beam 5801. The upper chassis beam 5801 stabilizes the folded configuration of the motorized vehicle 101. The stabilization is performed by alignment of the upper chassis beam 5801 with the back wheels 160. When the motorized vehicle 101, in a folded configuration, rests on a flat surface (i.e. a plane)—both the rear wheels 160 and the upper chassis beam 5801 touch the flat surface, thereby providing three points of support to the folded motorized vehicle 101. Such support may prevent the folded motorized vehicle 101 from tipping over. Optionally, the upper chassis beam 5801 bears one (or more) bearing track(s) 5905. The bearing track 5905 may be mounted and/or embedded along an elongated dimension of the upper chassis 170. The bearing track(s) 5905 may enable lowering the seat 1886 along the upper chassis beam 5801. Optionally, the bearing track(s) 5905 have retraction track cogs (not shown) for meshing into a cogwheel.

Figure 61:
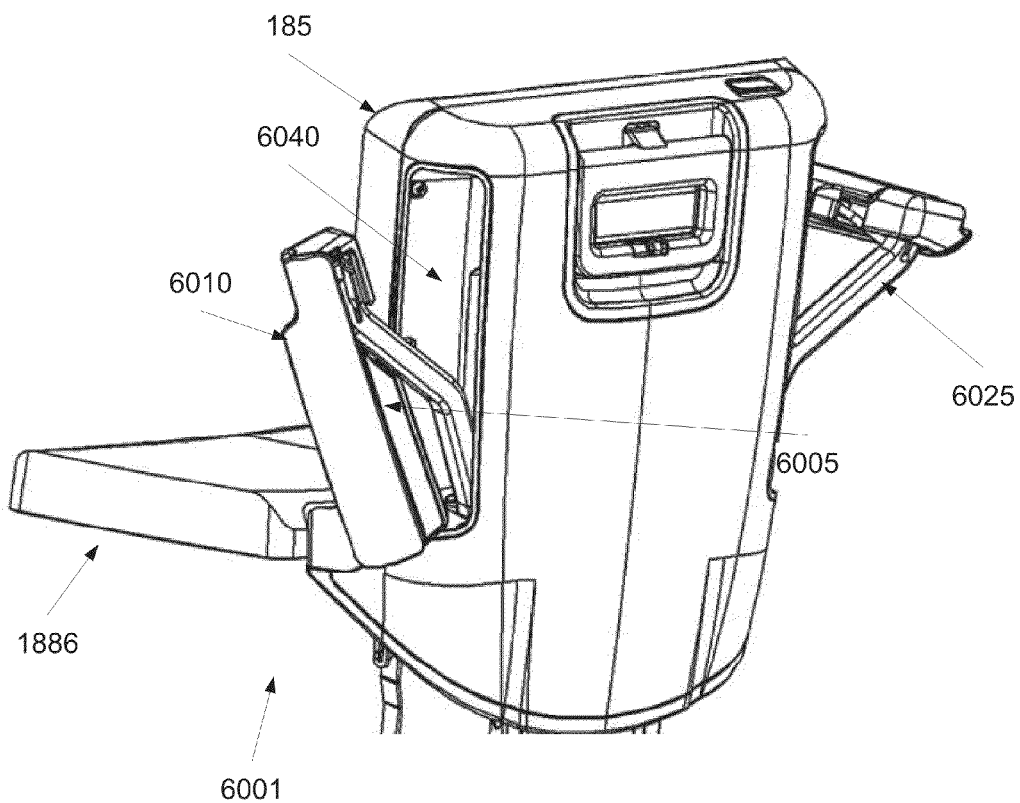
FIG. 61 is an illustration of an armrest transforming from an armrest folded configuration to an armrest operational configuration, according to some embodiments of the present invention.
Figure 62:
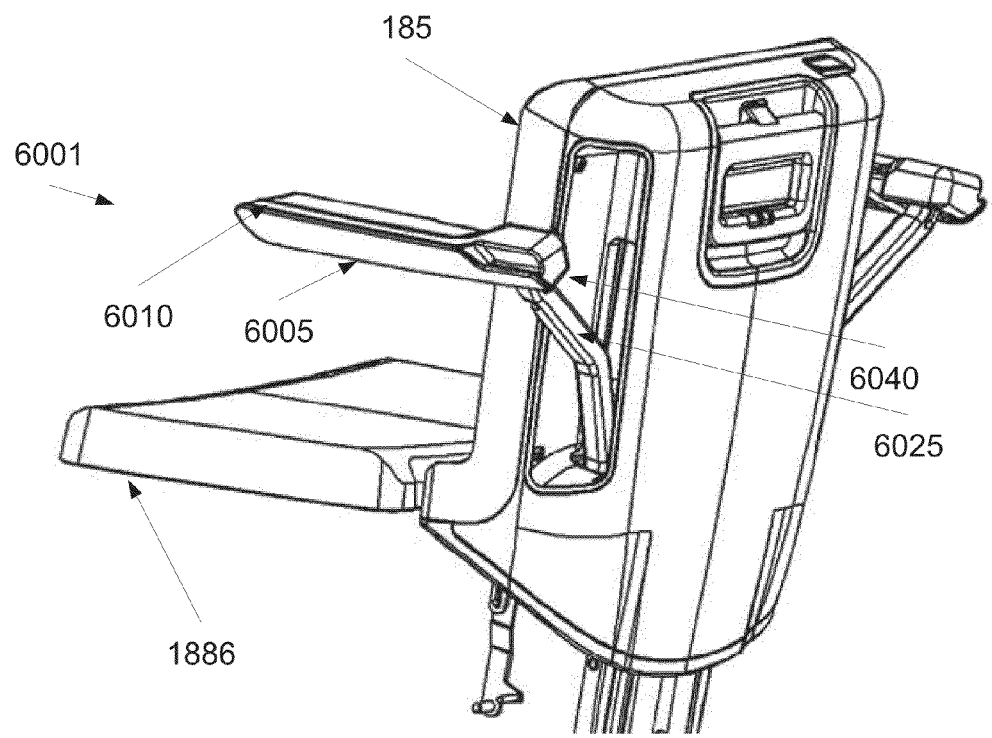
FIG. 62 is an illustration of an armrest in an operational configuration, according to some embodiments of the present invention.
Figure 63:
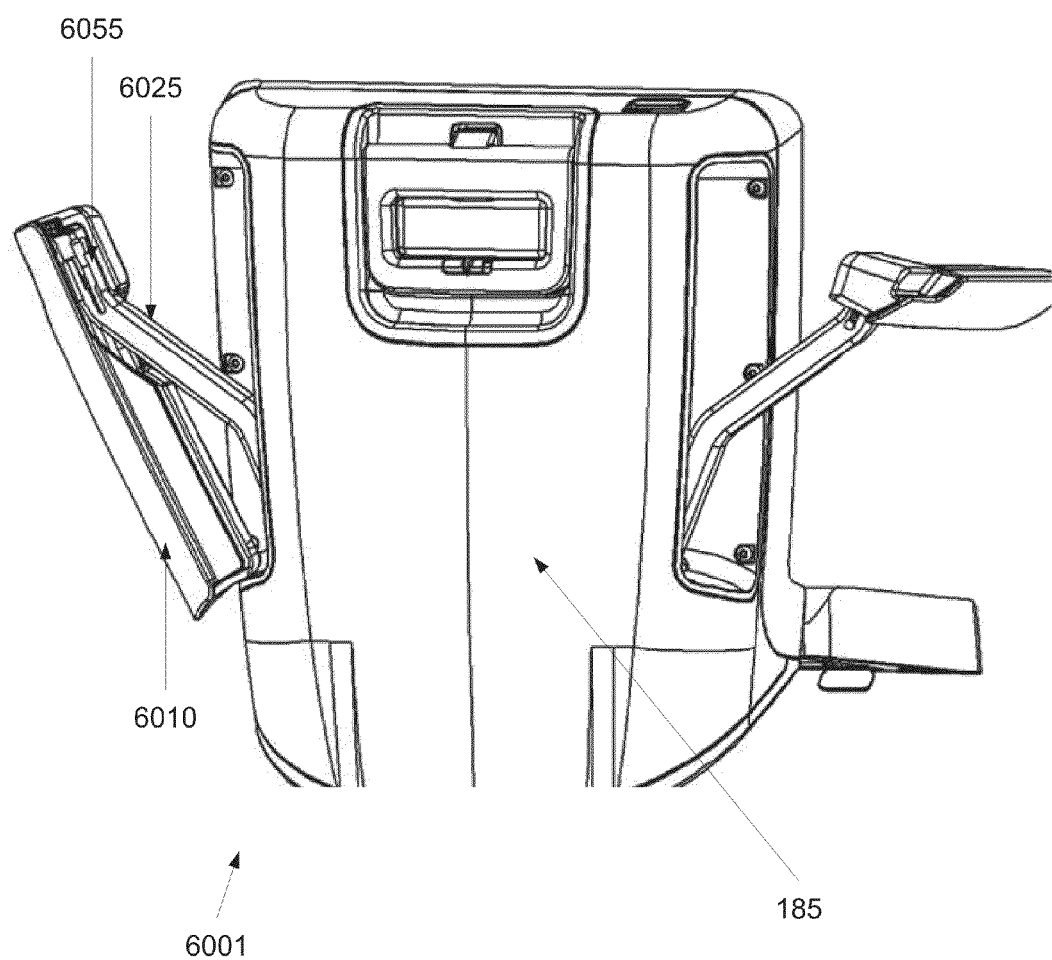
FIG. 63 is an illustration of a rear view of an armrest carried by an armrest carrier into an armrest groove, according to some embodiments of the present invention.
Figure 64A:
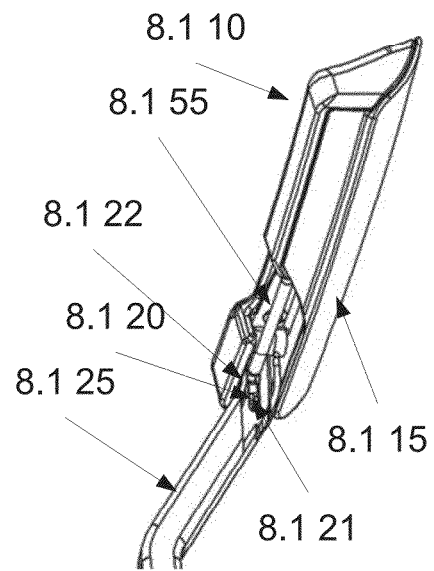
FIGS. 64A-64B are illustrations of an armrest rod inserting a rod groove, according to some embodiments of the present invention.
Figure 64B:
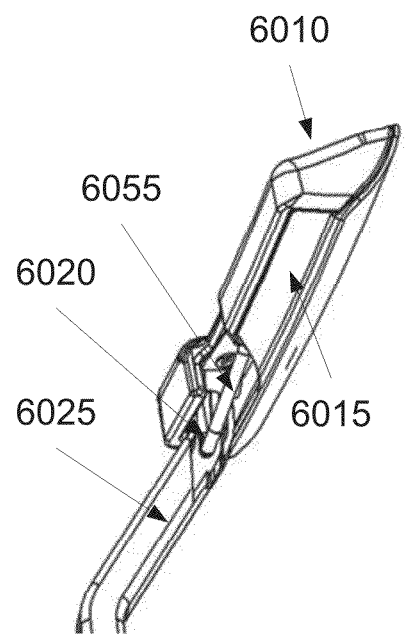
Figure 65:
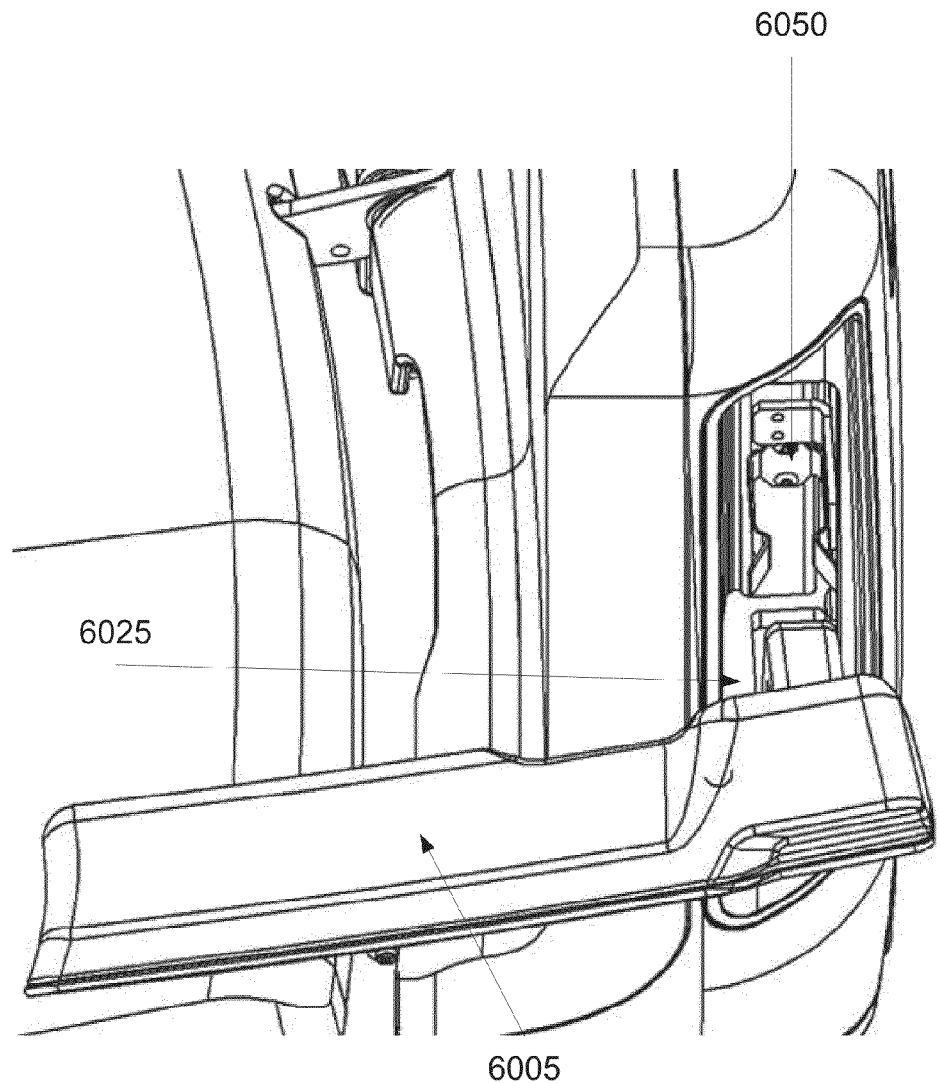
FIG. 65 is an illustration of an armrest carrier snap mounted inside an armrest groove, according to some embodiments of the present invention.

Reference is now made to FIGS. 60-65 illustrating an armrest folding and unfolding mechanism 6001 hidden in a seat backrest 185, according to some embodiments of the present invention. In an armrest folded configuration, illustrated in FIG. 60, an arm rest 6005 along with its arm rest carrier 6025 fold into an arm rest groove 6040 in the back rest 185. An ejection groove 6045 is left in the arm rest groove 6040 when it is filled with the arm rest 6005. To open an armrest 6005, a user reaches into the ejection groove 6045 and pulls the arm rest 6005, as illustrated in FIG. 61. The arm rest 6005, which is mechanically connected to the arm rest carrier 6025, pulls the arm rest carrier 6025 along with it. The arm rest carrier 6025 is snapped out of an arm rest carrier snap 6050 in the arm rest groove 6040, as illustrated in FIG. 65. The arm rest 6005 is moved to the side of the motorized vehicle 101. Then the arm rest 6005 is pulled upwards to a position supporting the arm of a user seating in the seat 1886. Optionally, this operational configuration is supported and/or locked. For example, when the arm rest 6005 is pulled upwards the arm rest rod 6055 falls into a rod groove 6020, as illustrated in FIG. 64. The rod groove 6020 may be positioned, for example, in the arm rest carrier 6025. Positioning the arm rest rod 6055 in a rod groove 6045 maintains the arm rest 6005 in its operational configuration.

A user folds an arm rest 6005 by releasing the armrest 6005 from a locking and/or support if exists. Releasing the arm rest 6005 may be performed by pulling the arm rest rod 6055 from a narrow section 6021 to a wider section 6022 of the rod groove 6020. The arm rest rod 6055 is able to move essentially along the arm rest 6005, thereby enabling it to fold down towards its carrier 6025. The arm rest carrier 6025, along with the arm rest 6005, is pushed towards the arm rest groove 6049 until the arm rest carrier 6025 is snapped by the arm rest carrier snap 6050. The arm rest 6005 and the arm rest carrier 6025 are hidden in the arm rest groove 6040. In this folded form the arm rest 6005 and the arm rest carrier 6025 complete the back rest 185 shape and do not protrude out of the arm rest 6005 plane.

It is expected that during the life of a patent maturing from this application many relevant motorized vehicles, steering rods, chassis and/or locking mechanisms will be developed and the scope of the term a motorized vehicle, a steering rod, a wheel motor, a chassis and/or locking mechanism is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

What is claimed is:

1. A motorized vehicle having a wheel retraction apparatus, comprising:
    a plurality of rear wheels and at least one front wheel;
    a lower chassis having a longitudinal axis and a foot surface mounted thereon; and
    a wheel retraction apparatus which is mechanically connected to said lower chassis and set to extract and retract said plurality of rear wheels from and towards said lower chassis by moving said plurality of rear wheels along diagonals which converge towards a point on said longitudinal axis, said wheel retraction apparatus is configured to fix said plurality of rear wheels in a plurality of different widths from one another;
    an upper chassis for supporting a seat;
    at least one of lever; and
    a bearing which mechanically connects between said upper chassis and said lower chassis and at least one lever;
    wherein a distance between an axis passing through the centers of said plurality of rear wheels and said at least one front wheel does not increase when said plurality of rear wheels are retracted towards said lower chassis;
    wherein each said at least one lever mechanically connect between said upper chassis and said wheel retraction apparatus and the bringing of said upper chassis towards said lower chassis pulls the lever and induces a retraction of said plurality of rear wheels by said wheel retraction apparatus.

2. The motorized vehicle of claim 1, further comprising an upper chassis, wherein said upper chassis is connected to said lower chassis.

3. The motorized vehicle of claim 1, wherein said lower chassis has a longitudinal axis and a distance between each said rear wheel and said longitudinal axis is reduced by said retraction.

4. The motorized vehicle of claim 3, wherein said lower chassis has a longitudinal axis, a distance between each said rear wheel and said longitudinal latitudinal axis and between each said rear wheel and said longitudinal axis is simultaneously reduced by said retraction.

5. The motorized vehicle of claim 1, wherein said wheel retraction apparatus comprises:
- a plurality of wheel arms each connected to another of said plurality of rear wheels; and
- at least one actuator, each having at least one retraction link which are connected to said plurality of wheel arms;
- wherein said lower chassis has a longitudinal axis, where a linear pulling of said at least one retraction links induces a simultaneous diagonal movement of said plurality of rear wheels in relation to said longitudinal axis.

6. The motorized vehicle of claim 5, wherein said at least one of retraction links are spread in at least one of a V shaped arrangement and a Y shaped arrangement.

7. The motorized vehicle of claim 1, wherein said plurality of rear wheels remain essentially parallel to one another during said retraction.

8. The motorized vehicle of claim 1, wherein said seat comprises: a seat base, a backrest and a seat bearing connecting between said seat base and said backrest.

9. The motorized vehicle of claim 8, wherein said lever is a non linear lever having an angle between 100 degrees and 170 degrees.

10. The motorized vehicle of claim 8, further comprising an arm which mechanically connects between said backrest and said lever.

11. The motorized vehicle of claim 10, wherein a mechanical connection of said arm comprises a multiplicity of arms connected by a multiplicity of hinges.

12. The motorized vehicle of claim 10, wherein said wheel retraction apparatus comprises an actuator having a tunnel and upon folding of said seat said lever moves along said tunnel and said actuator moves along said lower chassis thereby lowering said seat.

13. The upper chassis of claim 8, further comprising a lock between said back rest and said seat base and a release button in said back rest, wherein said release button allows said seat base and said back rest to fold toward each other and said lock is re-engaged when said back rest and said seat base are parallel in a folded position.

14. The motorized vehicle of claim 1 further comprising a backrest, wherein said upper chassis has at least one upper chassis road and said backrest has at least one backrest channel which encircles said at least one upper chassis road and a folding action pulls said back rest to glide on said upper chassis road to essentially cover said upper chassis road.

15. The upper chassis of claim 1, further comprising an upper chassis lock between said upper chassis and said lower chassis; wherein a position of said upper chassis relative to the position of said lower chassis is statically maintained when said upper chassis lock is locked.

16. The lock of claim 15, further comprising an actuator and a thread which connects between said seat and said actuator, wherein moving said thread does at least one of locking and unlocking said upper chassis lock.

17. The lock of claim 15, further comprising an actuator, wherein said rear lower chassis further comprises a plurality of rear lower chassis apertures and said upper chassis lock comprises a disc having at least one pin and said disc is mounted on said actuator and said at least one pin fits into said plurality of rear lower chassis apertures.

18. The motorized vehicle of claim 1, wherein said lower chassis has a front lower chassis and a rear lower chassis and a lower chassis bearing connects said front lower chassis with said rear lower chassis.

19. A motorized vehicle having a wheel retraction apparatus, comprising:
- a plurality of rear wheels and at least one front wheel;
- a lower chassis having a longitudinal axis and a foot surface mounted thereon; and
- a wheel retraction apparatus which is mechanically connected to said lower chassis and set to extract and retract said plurality of rear wheels from and towards said lower chassis by moving said plurality of rear wheels along diagonals which converge towards a point on said longitudinal axis said wheel retraction apparatus is configured to fix said plurality of rear wheels in a plurality of different widths from one another;

wherein a distance between an axis passing through the centers of said plurality of rear wheels and said at least one front wheel does not increase when said plurality of rear wheels are retracted towards said lower chassis;
- wherein said wheel retraction apparatus comprises:
- a plurality of wheel arms each connected to another of said plurality of rear wheels; and
- at least one actuator, each having at least one retraction link which are connected to said plurality of wheel arms;
- wherein said lower chassis has a longitudinal axis, where a linear pulling of said at least one retraction links induces a simultaneous diagonal movement of said plurality of rear wheels in relation to said longitudinal axis;
- wherein the movement of said at least one of retraction links is limited by a Y shaped track.

20. A motorized vehicle having a wheel retraction apparatus, comprising:
- a plurality of rear wheels and at least one front wheel;
- a lower chassis having a longitudinal axis and a foot surface mounted thereon; and
- a wheel retraction apparatus which is mechanically connected to said lower chassis and set to extract and retract said plurality of rear wheels from and towards said lower chassis by moving said plurality of rear wheels along diagonals which converge towards a point on said longitudinal axis, said wheel retraction apparatus is configured to fix said plurality of rear wheels in a plurality of different widths from one another;

wherein a distance between an axis passing through the centers of said plurality of rear wheels and said at least one front wheel does not increase when said plurality of rear wheels are retracted towards said lower chassis;
- wherein said wheel retraction apparatus comprises:
- a plurality of wheel arms each connected to another of said plurality of rear wheels; and
- at least one actuator, each having at least one retraction link which are connected to said plurality of wheel arms;
- wherein said lower chassis has a longitudinal axis, where a linear pulling of said at least one retraction links induces a simultaneous diagonal movement of said plurality of rear wheels in relation to said longitudinal axis; wherein said at least one of retraction links position is at least one of exterior to said lower chassis, interior to said lower chassis and integral within said lower chassis.

* * * * *